(12) United States Patent
Wong

(10) Patent No.: US 9,759,440 B2
(45) Date of Patent: Sep. 12, 2017

(54) AIR CONDITIONING SYSTEM WITH MULTIPLE-EFFECT EVAPORATIVE CONDENSER

(71) Applicant: Lee Wa Wong, Pico Rivera, CA (US)

(72) Inventor: Lee Wa Wong, Pico Rivera, CA (US)

( * ) Notice: Subject to any disclaimer, the term of this patent is extended or adjusted under 35 U.S.C. 154(b) by 207 days.

(21) Appl. No.: 14/679,780

(22) Filed: Apr. 6, 2015

(65) Prior Publication Data
US 2015/0285520 A1 Oct. 8, 2015

Related U.S. Application Data

(62) Division of application No. 13/506,462, filed on Apr. 21, 2012, now Pat. No. 9,097,465.

(51) Int. Cl.
| | |
|---|---|
| F25D 23/12 | (2006.01) |
| F24F 5/00 | (2006.01) |
| F28F 25/04 | (2006.01) |
| F28D 5/02 | (2006.01) |
| F25B 39/04 | (2006.01) |
| F25B 1/00 | (2006.01) |
| F28F 1/12 | (2006.01) |
| F28B 1/02 | (2006.01) |
| F28B 9/04 | (2006.01) |
| F28C 1/14 | (2006.01) |
| F24F 13/22 | (2006.01) |

(52) U.S. Cl.
CPC ............ *F24F 5/0007* (2013.01); *F25B 1/005* (2013.01); *F25B 39/04* (2013.01); *F28B 1/02* (2013.01); *F28B 9/04* (2013.01); *F28C 1/14* (2013.01); *F28D 5/02* (2013.01); *F28F 1/12* (2013.01); *F28F 25/04* (2013.01); *F24F 2013/225* (2013.01); *F25B 2339/041* (2013.01)

(58) Field of Classification Search
CPC ...... F24F 5/0035; Y02B 30/545; F25B 40/00; F25B 2400/13
USPC ........ 62/259.4, 324.1, 513, 527; 165/104.13, 165/133, 179
See application file for complete search history.

(56) References Cited

U.S. PATENT DOCUMENTS

| | | | | |
|---|---|---|---|---|
| 3,012,416 A | * | 12/1961 | Dart | F28B 1/06 261/109 |
| 3,365,909 A | * | 1/1968 | Brainard | F28D 5/02 137/268 |
| 4,819,717 A | * | 4/1989 | Ishikawa | C01B 3/0005 165/104.12 |
| 5,222,551 A | * | 6/1993 | Hasegawa | F25B 40/00 165/166 |
| 5,578,422 A | * | 11/1996 | Mizuno | G03F 1/26 430/311 |
| 5,678,422 A | * | 10/1997 | Yoshii | F25B 39/022 165/153 |

* cited by examiner

*Primary Examiner* — Melvin Jones
(74) *Attorney, Agent, or Firm* — Novoclaims Patent Services LLC; Mei Lin Wong

(57) ABSTRACT

An air conditioning system includes a multiple effect evaporative condenser, at least one compressor, at least one heat exchanger, an expansion valve, and at least one multiple-effect evaporative condensers. The multiple effect evaporative condenser and the heat exchanger utilize a highly efficient heat exchanging pipe for performing heat exchange between water and refrigerant.

18 Claims, 61 Drawing Sheets

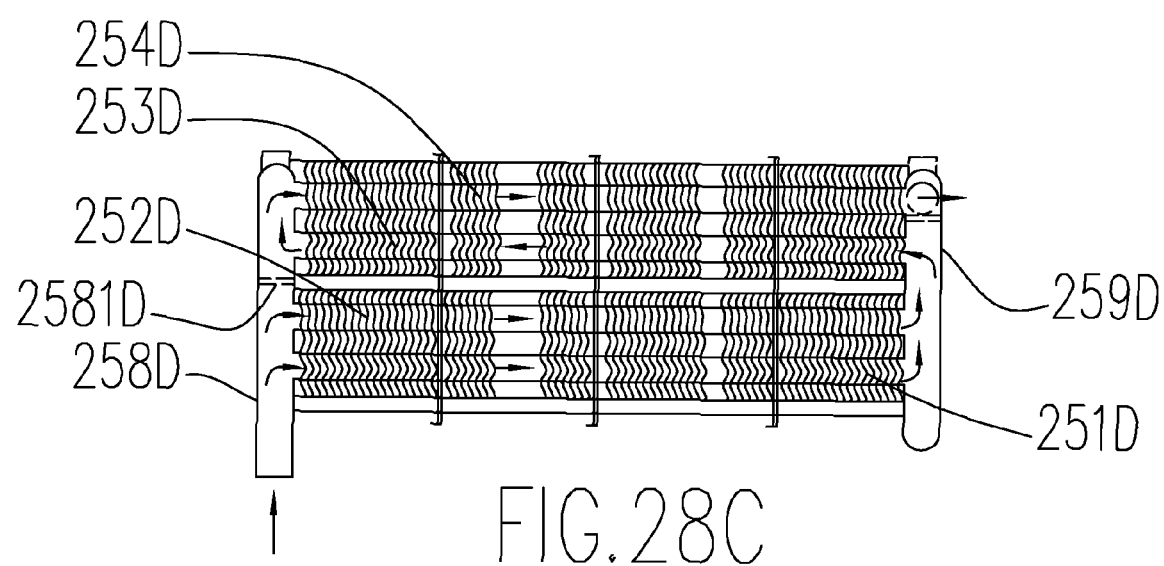

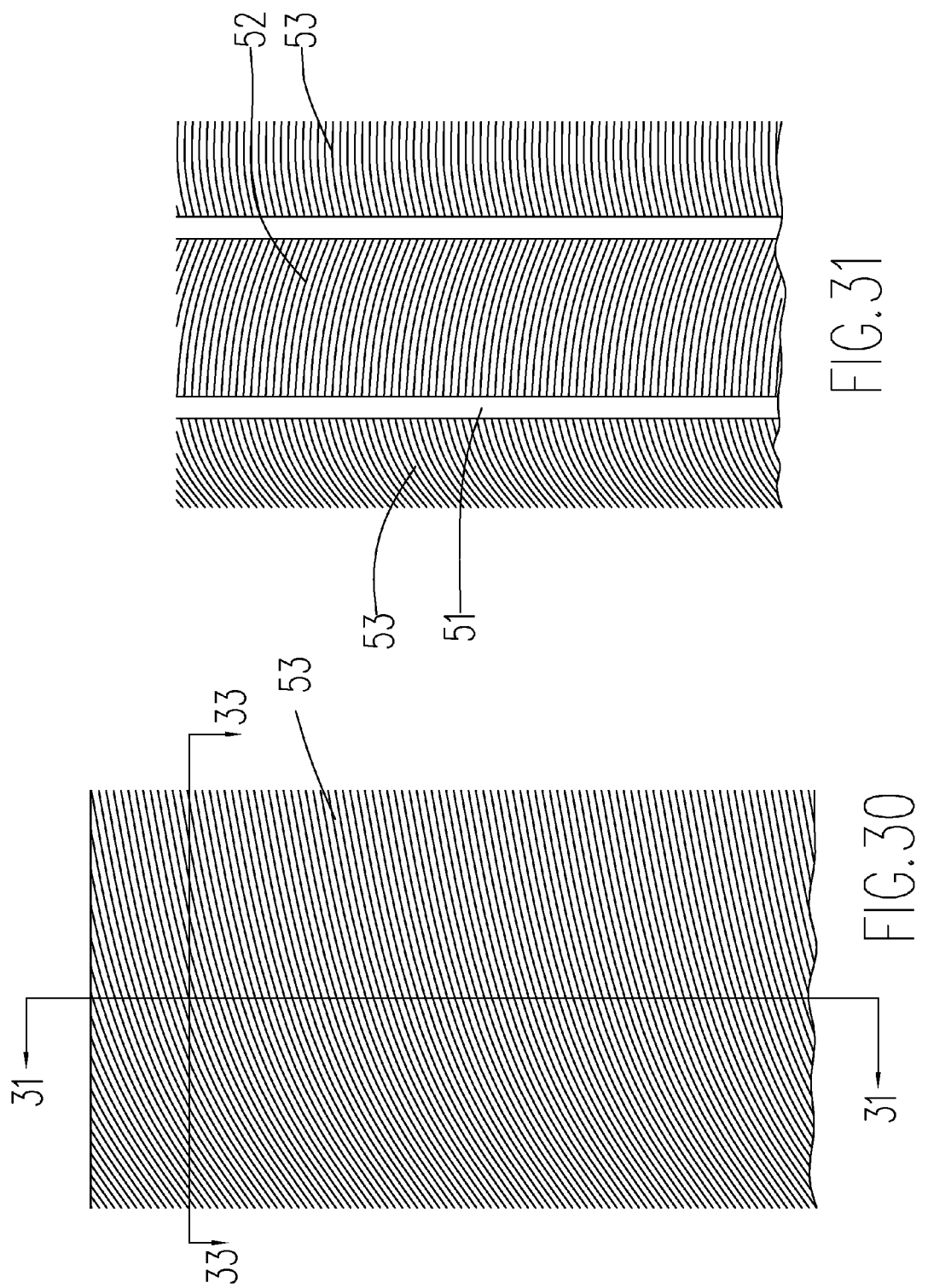

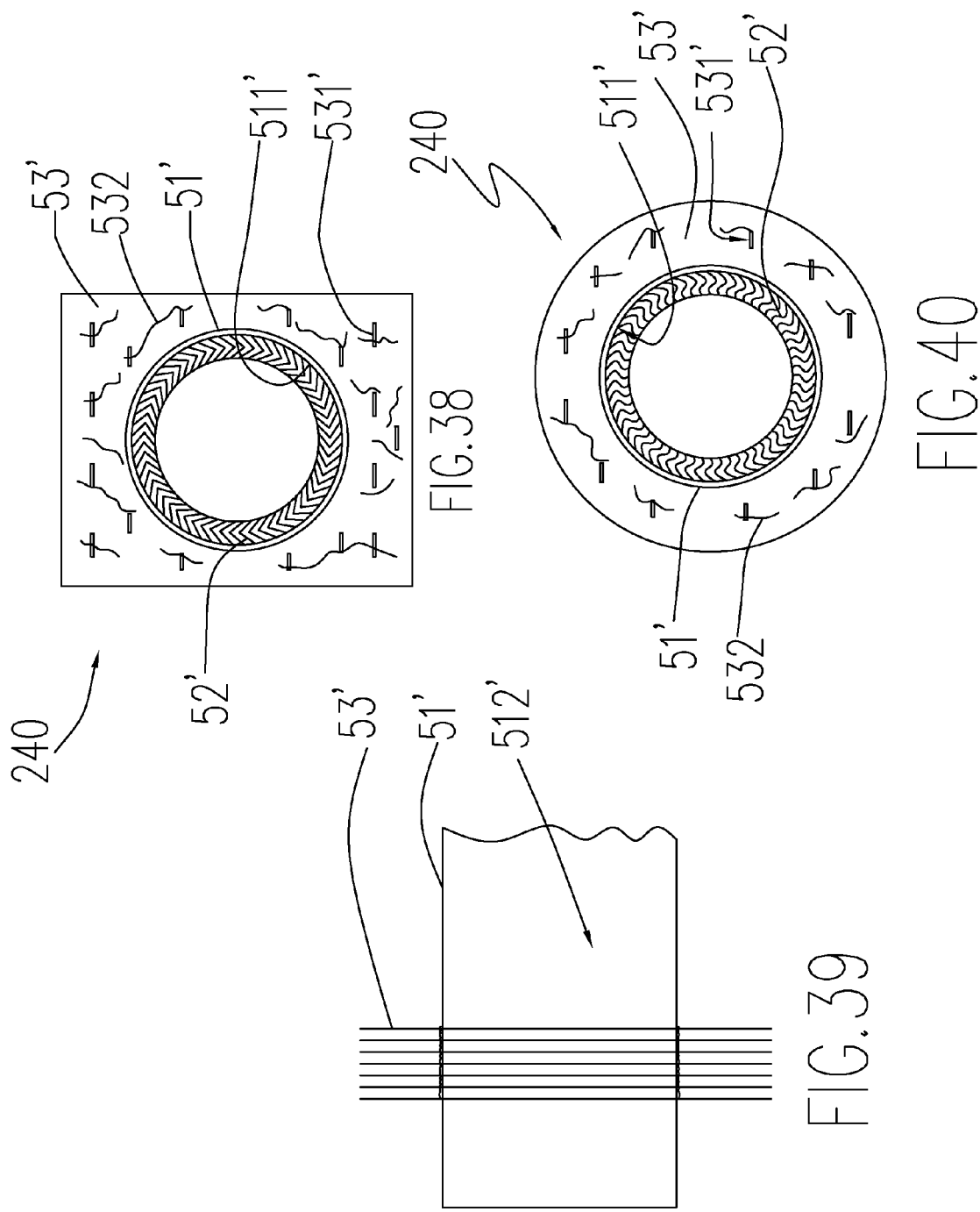

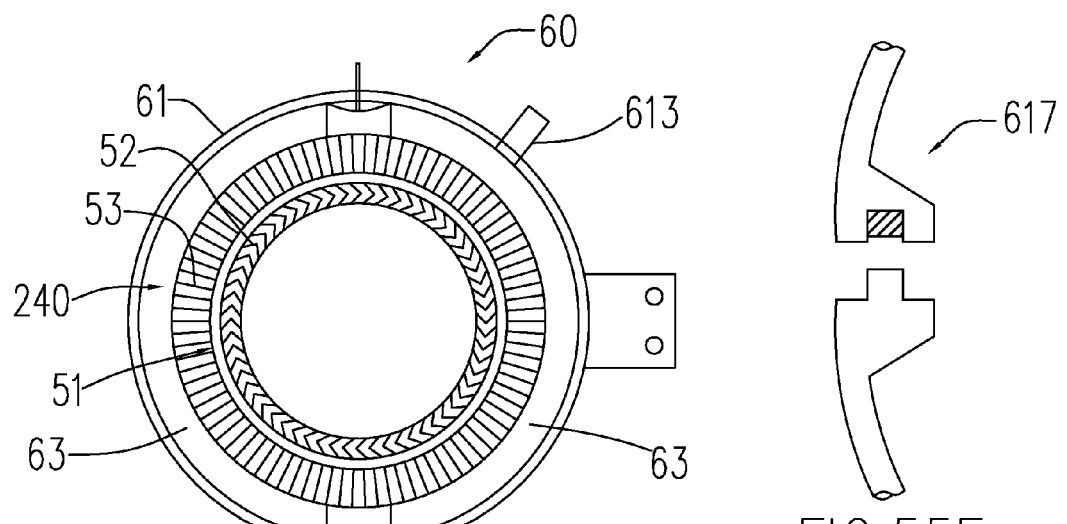
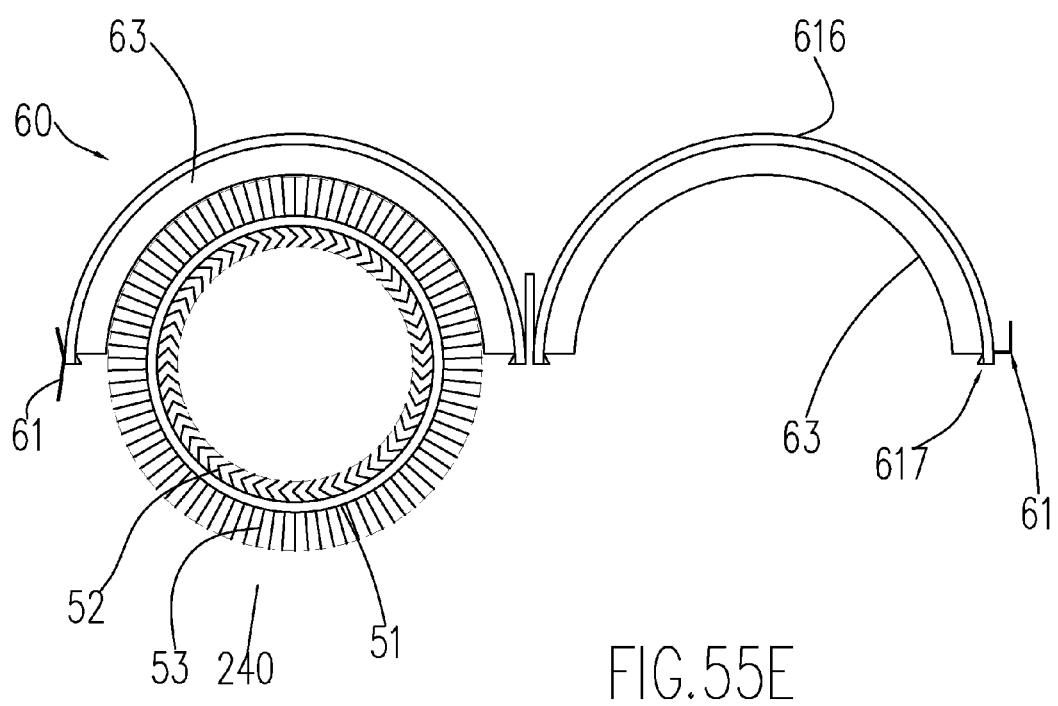

AIR CONDITIONING SYSTEM WITH MULTIPLE-EFFECT EVAPORATIVE CONDENSER

CROSS REFERENCES TO RELATED APPLICATIONS

This is a divisional application of a non-provisional application having an application Ser. No. 13/506,462 and a filing date of Apr. 21, 2012. The contents of this specifications, including any intervening amendments thereto, are incorporated herein by reference.

BACKGROUND OF THE PRESENT INVENTION

Field of Invention

The present invention relates to an air conditioning system, and more particularly to an air conditioning system utilizing a multiple effect evaporative condenser for effectively and efficiently cooling refrigerant.

Description of Related Arts

Referring to FIG. 1 to FIG. 2 of the drawings, a conventional condenser 1002P and a conventional cooling tower 1001P for a central air conditioning system is illustrated. The conventional cooling tower 1001P and the conventional condenser 1002P are connected through water pipes 931P, 923P in which cooling water 924P is pumped by a pumping device 932P to circulate between the cooling tower 1001P and the condenser 1002 through the water pipes 931P, 923P. The cooling tower 1001P is usually installed on an exterior of a building, such as on the roof of the building.

Vaporous refrigerant (coming from a compressor of the central air conditioning system) having an elevated temperature enters the condenser 1002P and is arranged to perform heat exchange with the cooling water 924P coming from the cooling tower 1001P. After the heat exchange process, the vaporous refrigerant will be cooled down and transformed into liquid state. The liquid refrigerant 935P is arranged to leave the condenser 1002P and go back to the evaporator for another compression cycle.

The cooling water 924P circulates between the cooling tower 1001P and the condenser 1002P. While in the condenser 1002P, the cooling water 924P absorbs heat from the vaporous refrigerant and the temperature of the cooling water 924P thereby increases. After absorbing heat, the cooling water 924P is pumped backed to the cooling tower 1001P through the water pipe 923P for being cooled down by the cooling tower 1001P. The cooling water 924P having a lower temperature then circulates back to the condenser 1002P through the water pipe 931P for another cycle of heat exchange with the vaporous refrigerant. Conventionally, the temperature of the cooling water 924P leaving the cooling tower 1001P is approximately 32° C., while the temperature of the cooling water 924P leaving the condenser 1002P (i.e. after absorbing heat from the vaporous refrigerant) is approximately 37° C.

The cooling water 924P leaving the condenser 1002P is collected at a top water collection basin 925P. The cooling tower 1001P comprises a tower housing having a receiving cavity, an air inlet 929P and an air outlet 930P both communicated with the receiving cavity, wherein the top water collection basin 925P is provided on top of the tower housing. The cooling tower 1001P further comprises a bottom water collection basin 928P, and a predetermined amount of fill material 926P received in the receiving cavity. The cooling water 924P collected in the top water collection basin 925P is guided (by gravity) to flow into the receiving cavity and in physical contact with the fill material 926P to form a water film. Ambient air is sucked into the receiving cavity through the air inlet 929P and is arranged to perform heat exchange with the cooling water 924P passing through the fill material 926P. After the heat exchange, the air is arranged to exit the cooling tower 1001 through the air outlet 929P while the cooling water 924P is collected at the bottom water collection basin 928P, which is connected to the condenser 1002P.

There exist a number of disadvantages in association with the above-mentioned air conditioning system. First, for the condenser 1002P as described above, the lower the temperature for the cooling water 924P coming into the condenser 1002P, the better the performance of cooling the vaporous refrigerant, and the lower the temperature of the cooling water 924P coming out of the condenser 1002P. For the cooling tower 1001P, however, the higher the temperature of the cooling water 924P collected in the top water collection basin 925P, the more effective the heat exchange between the air and the cooling water 924P flowing through the fill material 926P. In other words, there is a relative relationship between the temperature requirement of the cooling water 924P of the condenser 1002P and the cooling tower 1001P.

Second, referring to FIG. 2 of the drawings, the cooling tower 1001P is filled with the fill material 926P for guiding the water film to perform heat exchange with ambient air flowing through the fill material 926P. Water flowing into the top water collection basin 925P is guided to flow through the fill material (in the form of a thin water film) along a longitudinal direction of the water tower 1001P. Yet from a practical perspective, there is a gradual increase of air temperature between the air inlet 929P and the air outlet 930P because air is drawn from the air inlet 929P to the air outlet 930P. On the other hand, there exists a gradual decrease in heat exchange performance along a transverse direction of the cooling tower 1001P. As shown in FIG. 2 of the drawings, if the cooling tower 1001P is hypothetically divided into four sections, namely $W_1$, $W_2$, $W_3$, and $W_4$, the heat exchange performance in these four sections are different because of their differing air temperature. As a result, the cooling water 924P coming out from these four sections are of differing temperature, yet they are all collected at the bottom water collection basin 928P. Hence, the overall temperature of the cooling water 924P leaving the cooling tower 1001P through the water pipe 931P is actually the resulting temperature of the cooling water 924P after mixing from the four different sections of the fill material 926P (as shown in FIG. 1).

Third, as shown in FIG. 1, the conventional cooling tower air conditioning system requires the use of very long pipes (such as the water pipes 923P, 931P) for connecting the various components thereof. For example, when the air conditioning system and the cooling tower 1001P are installed in different locations, the length of the pipes which connect the cooling tower 1001P and the condenser 1002P must be very long, such that the cooling tower 1001P is typically located at the roof of the building while the condenser 1002P is located somewhere within the building. Such an extensive piping system requires cumbersome maintenance procedures and constitutes substantial waste of raw materials. Moreover, since the ducts connecting the cooling tower 1001P and the condenser 1002P are very long in length, very great resistance will be developed within the ducts so that the energy needed to pump the cooling water circulating between the cooling tower 1001P and the condenser 1002P is necessarily wasted. This substantially reduces the efficiency of the entire cooling tower air conditioning system.

SUMMARY OF THE PRESENT INVENTION

The invention is advantageous in that it provides a multiple-effect evaporative condenser, wherein heat exchange within the multiple-effect evaporative condenser is optimally carried out for facilitating effective and efficient rejection of heat from the refrigerant.

Another advantage of the invention is to provide a multiple-effect evaporative condenser, which eliminates the need to have many and extensive piping and components between conventional cooling towers and condensers for conventional central air conditioning systems.

Another advantage of the invention is to provide a multiple-effect evaporative condenser which utilizes a plurality of highly efficient heat exchanging pipes providing a relatively large area of heating exchanging surfaces for performing heat exchange between cooling water and refrigerant.

Another advantage of the invention is to provide a multiple-effect evaporative condenser which comprises a plurality of heat exchanging units adapted for performing heat exchange between ambient air, cooing water and refrigerant in a multi-staged manner (i.e. in temperature gradients), so as to resolve the inconsistent and unsatisfactory heat exchange problems in conventional cooling towers mentioned above.

Another advantage of the invention is to a provide a multiple-effect evaporative condenser which is capable of increasing saturated air temperature at the air outlet so as to enhance the heat exchange performance of the multiple-effect evaporative condenser.

Another advantage of the invention is to provide a heat exchanger, which is capable of efficiently facilitating heat exchange between refrigerant and water by using highly efficient heat exchanging pipe.

Another advantage of the invention is to provide a highly efficient heat exchanging pipe which comprises a plurality of inner heat exchanging fins providing relatively large contact surface area and a plurality of outer heat exchanging fins for forming large heat exchanging surface area. More specifically, the highly efficient heat exchanging pipe is capable of achieving critical heat flux density for a given material of the highly efficient heat exchanging pipe.

Additional advantages and features of the invention will become apparent from the description which follows, and may be realized by means of the instrumentalities and combinations particular point out in the appended claims.

According to the present invention, the foregoing and other objects and advantages are attained by providing a multiple-effect evaporative condenser for cooling a predetermined amount of refrigerant by a predetermined amount of cooling water, comprising: a pumping device adapted for pumping said cooling water at a predetermined flow rate; a tower housing having an air inlet and an air outlet, wherein an air draft is drawn between said air inlet and said air outlet; a first water collection basin mounted in said tower housing for collecting said cooling water pumped from said pumping device; a first cooling unit comprising a plurality of heat exchanging pipes and a first fill material unit provided underneath said heat exchanging pipes, wherein said cooling water collected in said first water collection basin is arranged to flow through exterior surfaces of said heat exchanging pipes and said first fill material unit; and a bottom water collection basin positioned underneath said first cooling unit for collecting said cooling water flowing from said first cooling unit, wherein said cooling water collected in said bottom water collection basin is arranged to be pumped back to said first water collection basin by said pumping device, wherein said refrigerant flows through said heat exchanging pipes of said first cooling unit, in such a manner that said refrigerant is arranged to perform highly efficient heat exchanging process with said cooling water for lowering a temperature of said refrigerant, wherein said predetermined amount of air is drawn into said tower housing through said air inlet for performing heat exchange with said cooling water flowing through said first fill material for lowering a temperature of said cooling water, wherein said air having absorbed said heat from said cooling water is discharged out of said tower housing through said air outlet.

In accordance with another aspect of the invention, the present invention provides a high efficiency heat exchanging pipe, comprising: a pipe body; a plurality of inner heat exchanging fins, capable of having various shapes, spacedly and protrudedly extended along an inner surface of the pipe body in a spiral manner for enhancing heat exchange surface area of the corresponding heat exchanging pipe, and for guiding a fluid flow on the inner surface of the corresponding heat exchange pipe along the spiral path of the inner heat exchanging fins; and a plurality of outer heat exchanging fins, capable of having various shapes, spacedly and protrudedly extended along an outer surface of the pipe body for enhancing heat exchange surface area of the corresponding heat exchanging pipe and for guiding a fluid flow on the outer surface of the corresponding heat exchange pipe along the outer heat exchanging fins.

In accordance with another aspect of the invention, the present invention provides a heat exchanger, comprising: a heat exchanger housing having a water inlet, a water outlet, a refrigerant inlet, a refrigerant outlet, and a cover detachably provided on the heat exchanger housing; an upper water chamber provided on an upper portion of the heat exchanger housing, and is communicated with the water outlet; a lower water chamber provided on a lower portion of the heat exchanger housing, and is communicated with the water inlet; and at least one heat exchanging pipes extended between the upper water chamber and the lower water chamber, wherein water having a relatively low temperature is arranged to enter the heat exchanger through the water inlet and temporarily store in the lower water chamber, wherein the water is pumped up the heat exchanger housing through the heat exchanging pipes and temporarily stored in the upper water chamber, and leaves the heat exchanger through the water outlet, wherein the heat exchanging pipe comprises a pipe body, a plurality of inner heat exchanging fins inwardly extended from the pipe body, and a plurality of outer heat exchanging fins outwardly extended from the pipe body, wherein the refrigerant is guided to enter the heat exchanger through the refrigerant inlet and flow through an exterior of outer heat exchanging fins of the heat exchanging pipes for performing heat exchange with the water flowing through the corresponding inner heat exchanging fins of the heat exchanging pipes, wherein heat is absorbed by the refrigerant which becomes evaporated, wherein vapor of the refrigerant is then guided to leave the heat exchanger through the refrigerant outlet.

Still further objects and advantages will become apparent from a consideration of the ensuing description and drawings. These and other objectives, features, and advantages of the present invention will become apparent from the following detailed description, the accompanying drawings, and the appended claims.

BRIEF DESCRIPTION OF THE DRAWINGS

FIG. 28A to FIG. 28C schematic diagrams of the multiple-effect evaporative condenser according to the sixth alternative mode of the above preferred embodiment of the present invention, illustrating the flow path of the refrigerant.

FIG. 30 is a side view of the heat exchanging pipe according to the above preferred embodiment of the present invention.

FIG. 31 is a sectional side view of the heat exchanging pipe according to the above preferred embodiment of the present invention, illustrating the sectional side view alone plane 2-2 of FIG. 30.

FIG. 38 is a sectional front view of the alternative mode of the heat exchanging pipe according to the above preferred embodiment of the present invention.

FIG. 39 is a side view of the alternative mode of the heat exchanging pipe according to the above preferred embodiment of the present invention.

FIG. 40 is a side view of the alternative mode of the heat exchanging pipe according to the above preferred embodiment of the present invention, illustrating that the outer heat exchanging fin has a circular cross section.

FIG. 55A to FIG. 55F are schematic diagrams of an additional cooling device according to the above preferred embodiment of the present invention.

DETAILED DESCRIPTION OF THE PREFERRED EMBODIMENT

Figure 8:
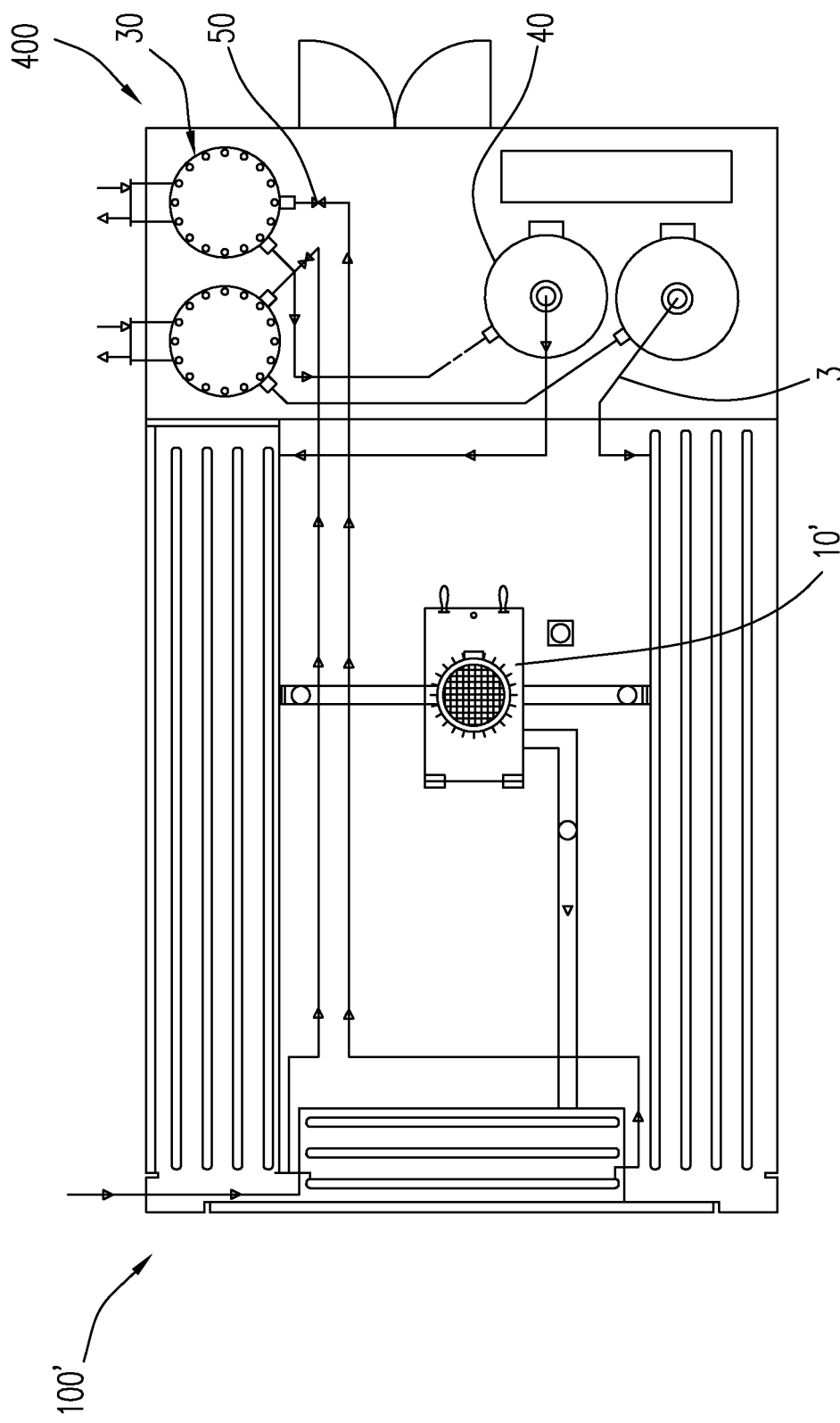
FIG. 8 is a first alternative mode of the multiple-effect evaporative condenser according to the above preferred embodiment of the present invention, illustrating that the multiple-effect evaporative condenser is part of a central air conditioning system.

Referring to Referring to FIG. 3 to FIG. 6 of the drawings, a multiple-effect evaporative condenser 100 for an air conditioning system according to a preferred embodiment of the present invention is illustrated. The air conditioning system is for cooling a predetermined space, such as a particular space within a building, by using a predetermined amount of cooling water 1 and refrigerant 3 (as shown in FIG. 8). The components of the air conditioning system will be discussed one by one below. However, it is worth noting that some of the components are by themselves patentably distinctive and may be used in applications other than air conditioning systems.

The multiple-effect evaporative condenser 100 comprises a pumping device 10 adapted for pumping the cooling water 1 at a predetermined flow rate, a tower housing 200 having an air inlet 201 and an air outlet 202, wherein an air draft is drawn between the air inlet 201 and the air outlet 202.

The multiple-effect evaporative condenser 100 further comprises a first water collection basin 21 mounted in the tower housing 200 for collecting the cooling water 1 pumped from the pumping device 10.

The multiple-effect evaporative condenser 100 further comprises a first cooling unit 24 comprising a plurality of heat exchanging pipes 241-244 and a first fill material unit 245 provided underneath the heat exchanging pipes 241-244, wherein the cooling water 1 collected in the first water collection basin 21 is arranged to flow through exterior surfaces of the heat exchanging pipes 241-244 and then through the first fill material unit 245.

The multiple-effect evaporative condenser 100 further comprises a second water collection basin 22 positioned underneath the first cooling unit 24 for collecting the cooling water 1 flowing from the first cooling unit 24, wherein the cooling water 1 collected in the second water collection basin 22 is arranged to be pumped back to the first water collection basin 21 by the pumping device 10, wherein the refrigerant 3 flows through the heat exchanging pipes 241-244 of the first cooling unit 24 in such a manner that the refrigerant 3 is arranged to flow through at least one heat exchanging route for perform highly efficient heat exchanging process with the cooling water 1 for lowering a temperature of the refrigerant 3, wherein the predetermined amount of air is drawn into the tower housing 200 through the air inlet 201 for performing heat exchange with the cooling water 1 flowing through the first fill material unit 245 for lowering a temperature of the cooling water 1, wherein the air having absorbed the heat from the cooling water 1 is discharged out of the tower housing 200 through the air outlet 202.

According to the preferred embodiment of the present invention, the multiple-effect evaporative condenser 100 further comprises a second cooling unit 25 provided underneath the second water collection basin 22 for allowing the cooling water to undergo a second cycle of heating by the refrigerant and cooling by flowing through a second fill material unit 255.

The second water collection basin 22 is arranged for collecting the cooling water 1 flowing from the first cooling unit 24. The second cooling unit 25 comprises a plurality of heat exchanging pipes 251-254, and a predetermined amount of second fill material unit 255, wherein the cooling water 1 collected in the second water collection basin 22 is arranged to flow through exterior surfaces of the heat exchanging pipes 251-254 of the second cooling unit 25 and the second fill material unit 255.

The refrigerant 3 is arranged to follow at least one heat exchanging route formed by the heat exchanging pipes 241-244 of the first cooling unit 24 and the second cooling unit 25.

In this preferred embodiment, the multiple-effect evaporative condenser 100 further comprises a third water collection basin 23 positioned underneath the second cooling unit 25 for collecting the cooling water 1 flowing from the second cooling unit 25, wherein the cooling water 1 collected in the third water collection basin 23 is arranged to be pumped back to the first water collection basin 21 by the pumping device 10, wherein the refrigerant 3 flows through the heat exchanging pipes 241-244 in such a manner and flow sequent that the refrigerant 3 is arranged to perform heat exchange with the cooling water 1 flowing through the multiple-effect evaporative condenser 100 for lowering a temperature of the refrigerant 3, wherein the predetermined amount of air is sucked into the tower housing 200 through the air inlet 201 for performing heat exchange with the cooling water 1 flowing through the first cooling unit 24 and the second cooling unit 25 for lowering a temperature of the cooling water 1, wherein the air having absorbed the heat from the cooling water 1 is discharged out of the multiple-effect evaporative condenser 100 through the air outlet 202.

It is important to mention at this stage that the multiple-effect evaporative 10 condenser 100 is "multiple-layer" and "multiple-effective" in the sense that when the cooling water 1 is undergoing multiple heat exchange processes between the cooling water and the refrigerant. Every time the cooling water 1 passes through the cooling unit 24 (25), it is heated up by the refrigerant and subsequently cooled down by flowing through the corresponding fill material unit 245 (255). Thus, take FIG. 4 as an example, the cooling water 1 is arranged to pass through the first cooling unit 24 to undergo a heat exchange process between the cooling water 1 and the refrigerant for once (the cooling water 1 is heated up by the refrigerant and then cooled down by flowing through the first fill material unit 245), and then to flow to the second cooling unit 25 for undergoing another heat exchange process between the cooling water 1 and the refrigerant (the cooling water 1 is heated up by the refrigerant and then cooled down by flowing through the second fill material unit 255 once again). In other words, one unit of cooling water 1 will be utilized for at least one time for each cycle of heating and cooling processing.

After the cooling water 1 has passed through the first cooling unit 24 and the second cooling unit 25, the pumping device 10 is provided in the tower housing 200 and 25 is arranged pump the cooling water 1 from the third water collection basin 23 up to the first water collection basin 21. In this preferred embodiment, a vertical distance (i.e. height) between the first water collection basin 21 and the third water collection basin 23 is embodied as generally not more than 4.5 m. Only when the multiple-effect evaporative condenser comprises three cooling units that the overall height of it exceeds 4.5 m.

There exists a plurality of heat exchanging pipes 241-244 extending between the first cooling unit 24 and the second cooling unit 25. The exact number of heat exchanging pipes 241-244, 251-255 and the manner in which the refrigerant 3 circulates is determined by the application circumstances of the present invention and the number of cooling units in the multiple-effect evaporative condenser 100.

The first water collection basin 21 has a first bottom tank panel 211, a first side tank panel 212, a plurality of through first passage holes 213 formed on the bottom tank panel 211, wherein the cooling water 1 is arranged to be pumped into the first water collection basin 21 by the pumping device 10 and reaches the first cooling unit 24 through the first passage holes 213. More specifically, the first cooling unit 24 further comprises a first supporting tray 246 having a first tray partition member 2463 upwardly extended from a bottom surface thereof for dividing the first supporting tray 246 into a first tray section 2461 and a second tray section 2462. According to the present preferred embodiment, it is embodied to have two of the first heat exchanging pipes 241, 242 (i.e. the first the first heat exchanging pipe 241 and the second heat exchanging pipe 242) spacedly supported in the first tray section 2461 and another two of the heat exchanging pipes 243, 244 (i.e. the third heat exchanging pipe 243 and the fourth heat exchanging pipe 244) spacedly supported in the second tray section 2462.

Furthermore, the first water collection basin 21 further has a plurality of first dividers 214 spacedly and downwardly extended from the bottom tank panel 211 to define a plurality of first trapping cavities 215 between each two corresponding adjacent first dividers 214, wherein each of the first through fourth heat exchanging pipes 241, 242, 243, 244 are supported within each of the first trapping cavities 215 respectively so that when the cooling water 1 falls into the first trapping cavities 215 through the corresponding first passage hole 213, the cooling water 1 is guided to substantially embed the corresponding heat exchanging pipes 240 for ensuring efficient and effective heat exchange between the heat exchanging pipes 240 and the cooling water 1.

The first supporting tray 246 further has a plurality of first through passing holes 2467 formed thereon wherein the cooling water 1 collected at the first supporting tray 246 is allowed to flow into the first fill material unit 245.

The first fill material unit 245 comprises a first fill material pack 2451 and a second fill material pack 2452 spacedly supported in the tower housing 200, wherein the cooling water 1 corning from the first tray section 2461 is arranged to drop into the first fill material pack 2451, while the cooling water 1 corning from the second tray section 2462 is arranged to drop into the second fill material pack 2452. As mentioned below, since the temperature of the refrigerant 3 flowing through the first heat exchanging pipe 241 and the second heat exchanging pipe 242 is different from that of the refrigerant 3 flowing through the third heat exchanging pipe 243 and the fourth heat exchanging pipe 244, the temperature of the cooling water 1 entering the first fill material pack 2451 and the temperature of the cooling water 1 entering the second fill material pack 2452 are also different. This has a substantial difference in heat exchange performance in the first fill material pack 2451 and the second fill material pack 2452.

On the other hand, the second water collection basin 22 has a second bottom tank panel 221, a second side tank panel 222, a plurality of second passage holes 223 formed on the second bottom tank panel 221, wherein the cooling water 1 dripping from the first fill material unit 245 is arranged to be collected at the second water collection basin 22 and reaches the second cooling unit 25 through the second passage holes 223.

Figure 4:
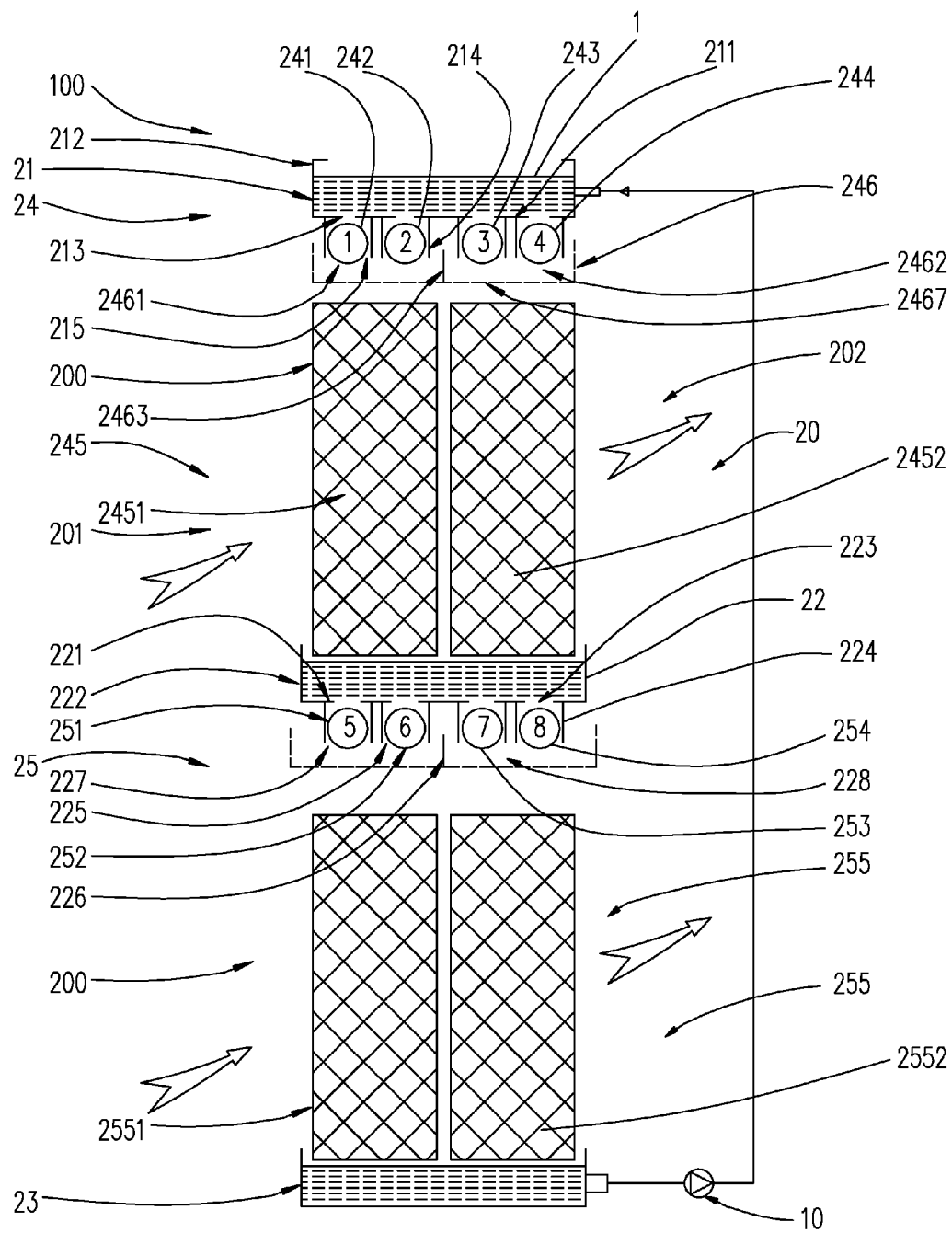
FIG. 4 is a schematic diagram of the multiple-effect evaporative condenser according to the above preferred embodiment of the present invention.
Figure 5:
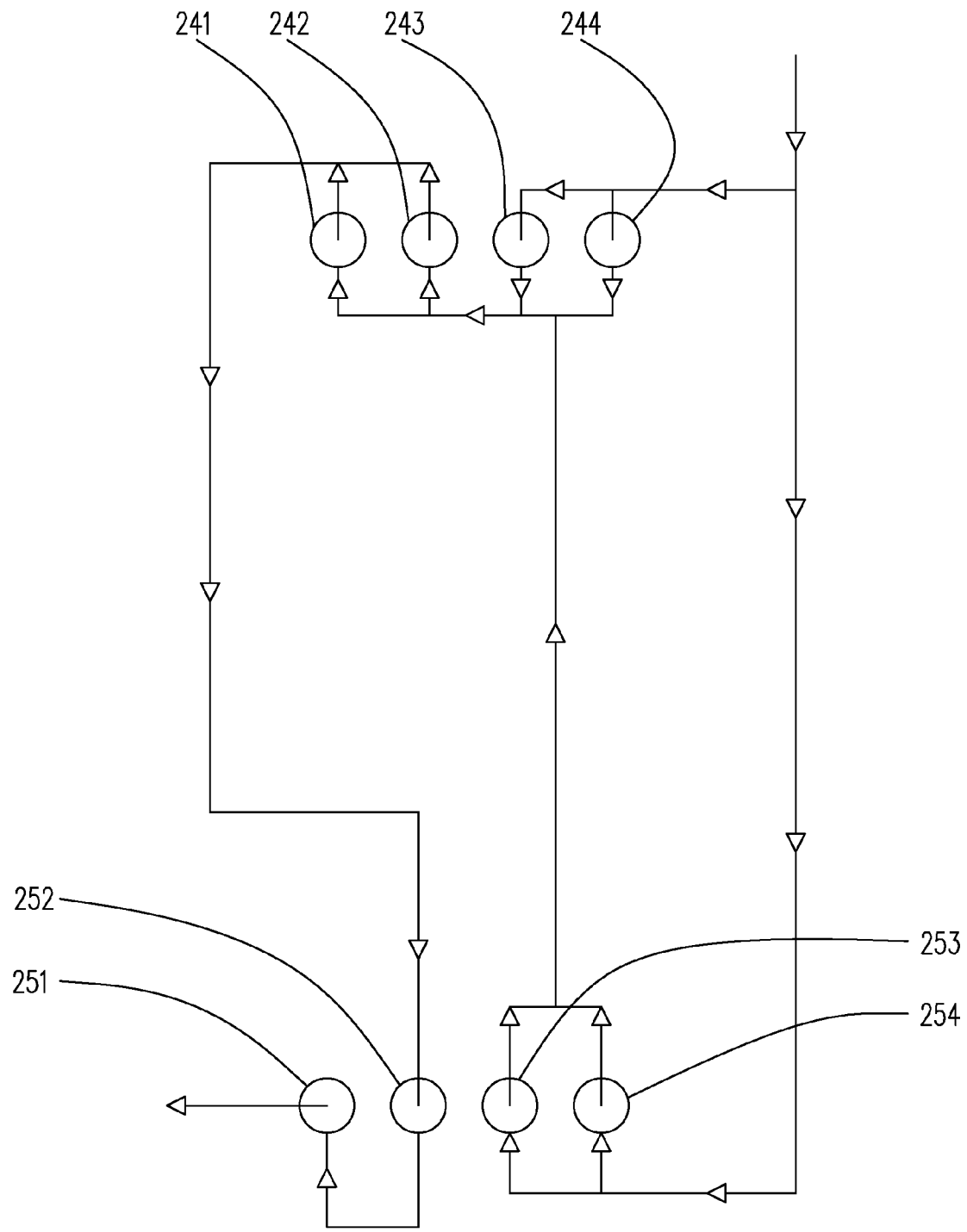
FIG. 5 is a schematic diagram of the multiple-effect evaporative condenser according to the above preferred embodiment of the present invention, illustrating the flow path of the refrigerant.
Figure 6:
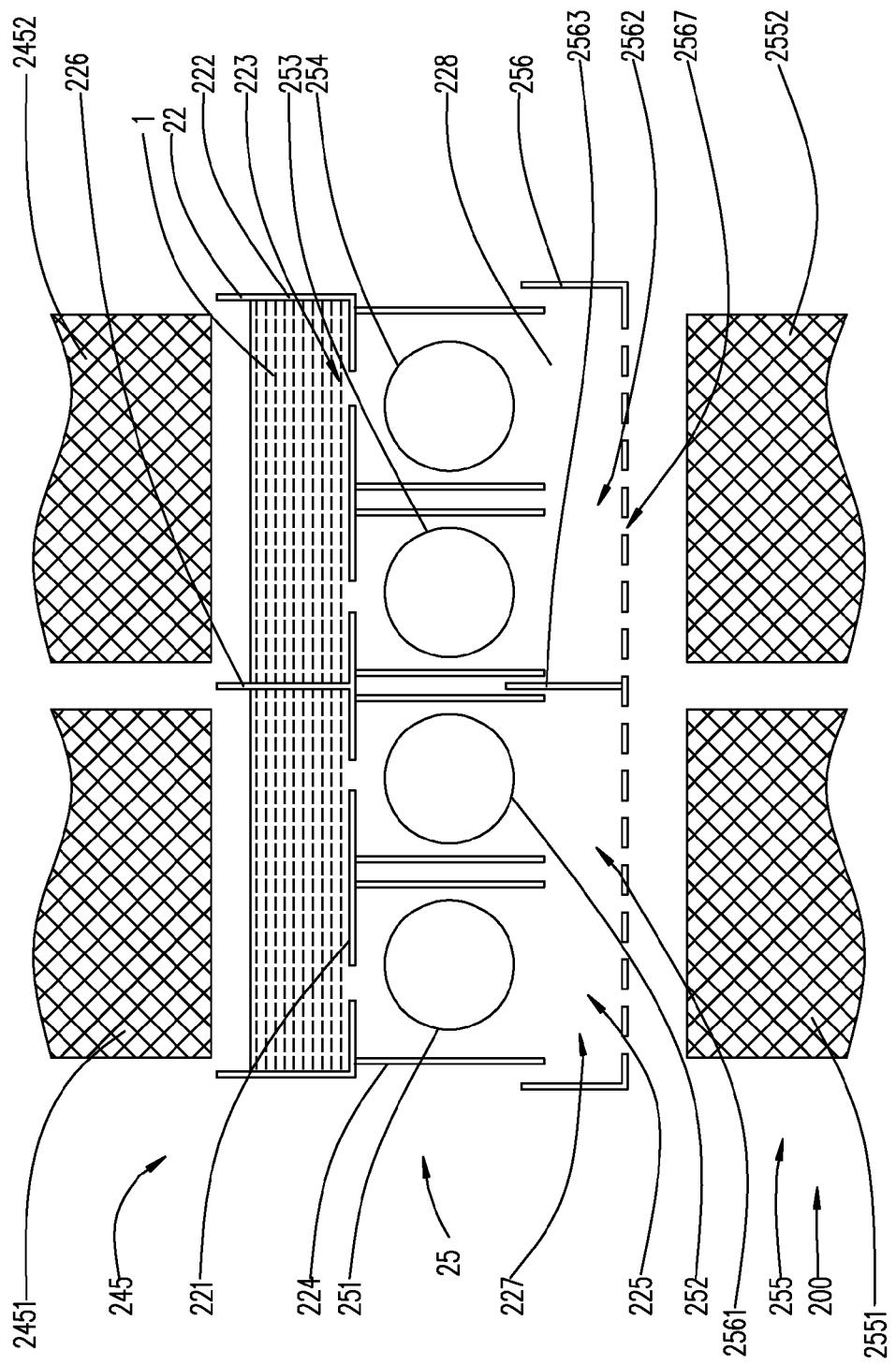
FIG. 6 is a schematic diagram of the multiple-effect evaporative condenser according to the above preferred embodiment of the present invention, illustrating one of the cooling units and the heat exchanging pipes.

Referring to FIG. 4 and FIG. 6 of the drawings, the second water collection basin 22 further comprises a separation member 226 upwardly extended from the second bottom tank panel 221 to separate the second water collection basin 22 into a first collection chamber 227 and a second collection chamber 228, wherein the cooling water 1 coming from the first fill material pack 2451 is collected at the first collection chamber 227, while the cooling water 1 coming from the second fill material pack 2452 is collected at the second collection chamber 228.

A shown in FIGS. 4 and 6, the second cooling unit 25 further comprises a second supporting tray 256 having a second tray partition member 2563 upwardly extended from a bottom surface thereof for dividing the second supporting tray 256 into a third tray section 2561 and a fourth tray section 2562, wherein two of the heat exchanging pipes 251, 252 (i.e. the fifth heat exchanging pipes 251 and the sixth heat exchanging pipe 252) are spacedly supported in the third tray section 2561 and two of the heat exchanging pipes 253,254 (i.e. the seventh heat exchanging pipe 253 and the eighth heat exchanging pipe 254) are spacedly supported in the fourth tray section 2562.

Furthermore, the second water collection basin 22 further has a plurality of second dividers 224 spacedly and downwardly extended from the second bottom tank panel 221 to define a corresponding number of second trapping cavities 225 between each two corresponding second dividers 224. According to the present preferred embodiment, there are four heat exchanging pipes 251, 252, 253, 254 supported within the four second trapping cavities 225 respectively so that when the cooling water 1 falls into the second trapping cavities 225 through the corresponding second passage holes 223, the cooling water 1 is guided to substantially embed the corresponding fifth through eighth heat exchanging pipes 251, 252, 253, 254 for ensuring efficient and effective heat exchange between the fifth through eighth heat exchanging pipes 251, 252, 253, 254 and the cooling water 1.

The second supporting tray 256 further has a plurality of second through passing holes 2567 formed therein wherein the cooling water 1 collected at the second supporting tray 256 is allowed to flow into the second fill material unit 255.

The second fill material unit 255 comprises a third fill material pack 2551 and a fourth fill material pack 2552 spacedly supported in the tower housing 200, wherein the cooling water 1 coming from the first tray section 2561 is arranged to drop into the third fill material pack 2551, while the cooling water 1 coming from the second lower tray section 2562 is arranged to drop into the fourth fill material pack 2552. Again, since the temperature of the refrigerant 3 flowing through the fifth heat exchanging pipe 251 and the sixth heat exchanging pipe 252 is different from that of the refrigerant 3 flowing through the seventh heat exchanging pipe 253 and the eighth heat exchanging pipe 254, the temperature of the cooling water 1 entering the third fill material pack 2551 and the temperature of the cooling water 1 entering the fourth fill material pack 2552 are also different. Finally, the cooling water 1 is collected at the third water collection basin 23 and is pumped back to the first water collection basin 21 for another cycle of heat exchange.

Note that the air is arranged to pass through the first fill material unit 245 and the second fill material unit 255 for transferring the heat from the cooling water 1 through conductive heat transfer. Thus, the cooling water 1 absorbs heat from the refrigerant 3, while the heat absorbed is then carried away by the air flowing through the multiple-effect evaporative condenser 100.

It is worth mentioning that one of the objects of the present invention is to enhance a heat transfer performance of the multiple-effect evaporative condenser 100 and to save energy, and one of the methods to achieve this is to increase the saturated air temperature at the air outlet 202. However, this cannot be accompanied by conventional evaporative condenser 100 because of the problems mentioned in the "Background" section above. However, one skilled in the art would appreciate that the multi-effect evaporative condenser 100 is capable of accomplishing multi heat exchange procedures between the cooling water 1, the refrigerant 3, and the heat exchanging pipes 241-244 and 251-254.

More specifically, according to the present preferred embodiment, the cooling water 1 has performed two heat exchange cycles when going through from the first water collection basin 21 to the third water collection basin 23. The cooling water 1 perform heat exchange with the refrigerant 3 first (thereby increasing its temperature) and then with the incoming air every time it passes through the relevant cooling unit 24 (25) (thereby decreasing its temperature). At the same time, the refrigerant 3 performs heat exchange with the cooling water 1 through the corresponding heat exchanging pipes 241-244 and 251-254 and heat is extracted to the cooling water 1 which is then cooled by the air flowing between the air inlet 201 and the air outlet 202.

Referring to FIG. 3 to FIG. 6 of the drawings, the refrigerant 3 entering the multiple-effect evaporative condenser 100 is first guided to flow through the third heat exchanging pipe 243, the fourth heat exchanging pipe 244, the seventh heat exchanging pipe 253 and the eighth heat exchanging pipe 254. After passing through these heat exchanging pipes 243, 244, 253, 254, the refrigerant 3 is cooled down by a first temperature gradient. The refrigerant 3 is then guided to flow through the first heat exchanging pipe 241 and the second heat exchanging pipe 242, and is further cooled down by a second temperature gradient. The refrigerant 3 is then guided to flow through the fifth heat exchanging pipe 251 and the sixth heat exchanging pipe 252, and thus is further cooled down by a third temperature gradient.

Figure 7:
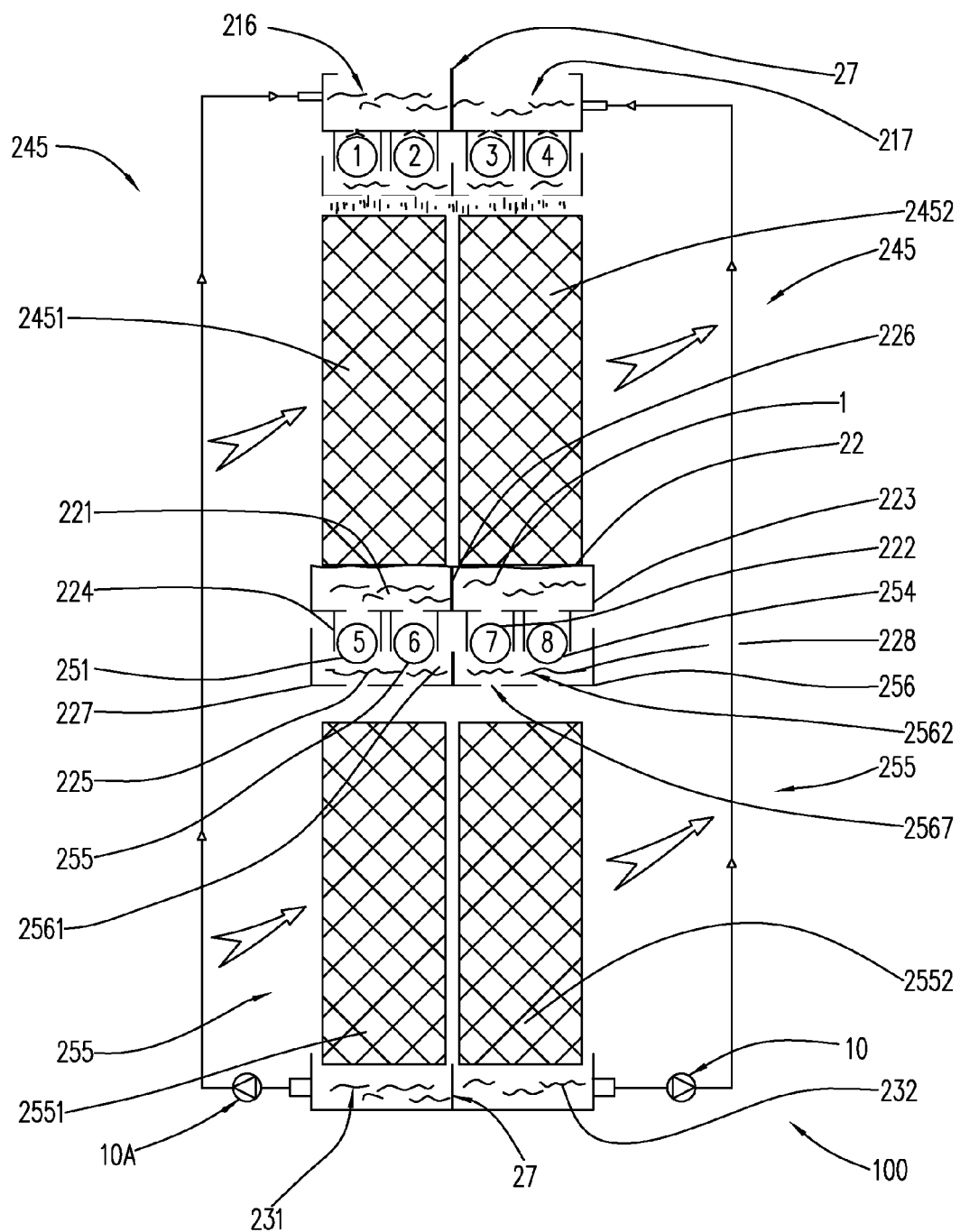
FIG. 7 is another schematic diagram of the multiple-effect evaporative condenser according to the above preferred embodiment of the present invention, illustrating that the first water collection basin is equipped with a basin partitioning plate.

Referring to FIG. 7 of the drawings, a first alternative mode of the multiple effect evaporative condenser 100 of the present invention is illustrated, in which the multiple-effect evaporative condenser 100 further comprises a second pumping device 10A, and a plurality of basin partitioning plates 27 provided on the first water collection basin 21 and the third water collection basin 23. The basin partitioning plate 27 provided on the first water collection basin 21 divides the first water collection basin 21 into a first water collection compartment 216 and a second water collection compartment 217. Similarly, the basin partitioning plate 27 provided on the first water collection basin 23 divides the third water collection basin 23 into a third water collection compartment 231 and a fourth water collection compartment 232. The cooling water 1 coming from the third fill material pack 2551 and the fourth fill material pack 2552 are separately collected at the third water collection compartment 231 and the fourth water collection compartment 232 and are separately pumped (by the pumping devices 10) to the first water collection compartment 216 and the second water collection compartment 217 of the first water collection basin 21 respectively.

The purpose of the basin partitioning plates 27 is to prevent substantial heat transfer of the cooling water 1 in the first water collection basin 21 and the third water collection basin 23 so as to minimize interference of heat exchange performance at each side of the multiple-effect evaporative condenser 100.

Referring to FIG. 8 of the drawings, a central air conditioning system is illustrated, in which the central air conditioning system comprises a first alternative mode of the multiple-effect evaporative condenser 100 described above. FIG. 8 illustrates that the multiple-effect evaporator condenser 100' in its first alternative mode (or in its preferred embodiment as described above) may be used in the central air conditioning system. Thus, the central air conditioning system as shown in FIG. 8 comprises a plurality of compressors 40, a plurality of heat exchangers 30 connected to the compressors 40 through a plurality of expansion valves 50 respectively, and a plurality of the multiple-effect evaporative condensers 100' connected to the compressors 40 so that refrigerant 3 is guided and pumped to flow through the heat exchanging pipes 241-244 and 251-254. The two multiple-effect evaporative condensers 100' are served by one single water pump 10'.

Moreover, the refrigerant 3 is circulated between the multiple-effect evaporative condensers 100' and the heat exchanger 30 through a plurality of expansion valves 50. The refrigerant 3 in its vaporous state is compressed to enter the multiple-effect evaporative condensers 100' for heat exchange with the cooling water 1. After heat exchange with the cooling water 1, the refrigerant is converted into liquid state and is guided to leave the multiple-effect evaporative condensers 100' and enter the heat exchanger 30. In the heat exchanger 30, the refrigerant 3 absorbs heat and becomes saturated vapor (i.e. vaporous state). The refrigerant 3 is then compressed to flow back to the multiple-effect evaporative condensers 100' for another cycle of heat exchange with the cooling water 1.

Figure 9:
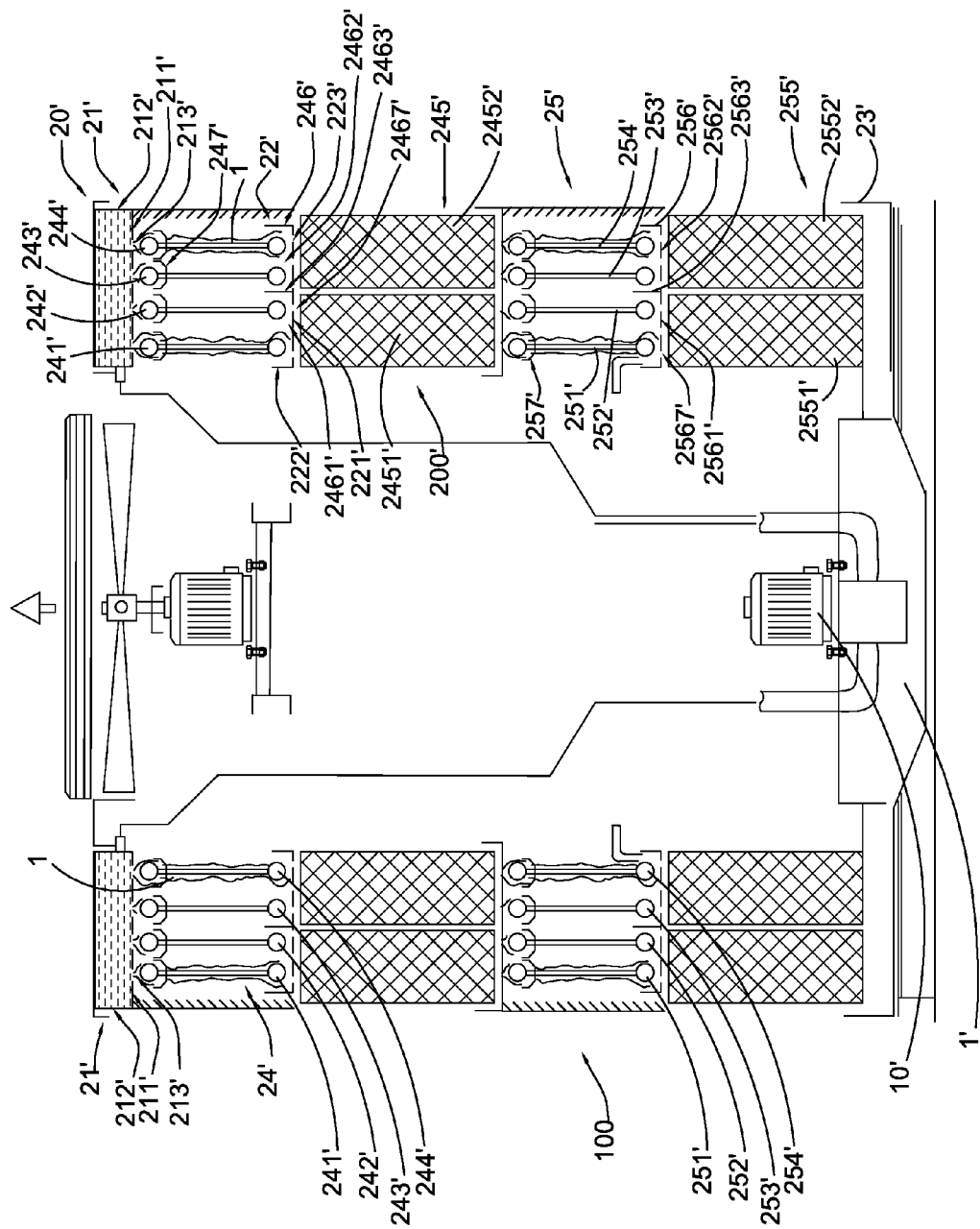
FIG. 9 is a first alternative mode of the multiple-effect evaporative condenser according to the above preferred embodiment of the present invention, illustrating a sectional side view of the multiple-effect evaporative condenser shown in FIG. 8.

Referring to FIG. 9 of the drawings, which is a sectional view of the multiple-effect evaporative condensers 100' served by one pumping device 10' for pumping the cooling water 1 circulating in the multiple-effect evaporative condensers 100'. For each of the multiple-effect evaporative condensers 100', the pumping device 10' is communicated between the third water collection basin 23' and the corresponding first water collection basin 21'.

For each of the multiple-effect evaporative condensers 100', the first water collection basin 21' has a first bottom tank panel 211', a first side tank panel 212', a plurality of through first passage holes 213' formed on the bottom tank panel 211', wherein the cooling water 1 is arranged to be pumped into the first water collection basin 21' and reach the first cooling unit 24' through the first passage holes 213'. The first cooling unit 24' comprises a first supporting tray 246' having a tray partition member 2463' upwardly extended from a bottom surface thereof for dividing the first supporting tray 246' into a first tray section 2461' and a second tray section 2462', wherein two of the heat exchanging pipes 241', 242' (i.e. the first heat exchanging pipe 241' and the second heat exchanging pipe 242') are spacedly supported in the first tray section 2461' and two of the heat exchanging pipes 243', 244' (i.e. the third heat exchanging pipe 243' and the fourth heat exchanging pipe 244') are spacedly supported in the second tray section 2462'.

The first fill material unit 245' comprises a first fill material pack 2451' and a second fill material pack 2452' spacedly supported in the tower housing 200', wherein the cooling water 1 coming from the first tray section 2461' is arranged to drop into the first fill material pack 2451', while the cooling water 1 coming from the second tray section 2462' is arranged to drop into the second fill material pack 2452'.

On the other hand, the second water collection basin 22' has a second bottom tank panel 221', a second side tank panel 222', a plurality of second passage holes 223' formed on the second bottom tank panel 221', wherein the cooling water 1 dropping from the first fill material unit 245' is arranged to be collected at the second water collection basin 22' and reaches the second cooling unit 25' through the second passage holes 223'.

The second cooling unit 25' further comprises a second supporting tray 256' having a second tray partition member 2563' upwardly extended from a bottom surface thereof for dividing the second supporting tray 256' into a third tray section 2561' and a fourth tray section 2562', wherein two of the heat exchanging pipes 251',252' (i.e. the fifth heat exchanging pipe 251' and the sixth heat exchanging pipe 252') are spacedly supported in the third tray section 2561' and two of the heat exchanging pipes 253', 254' (i.e. the seventh heat exchanging pipe 253' and the eighth heat exchanging pipe 254') are spacedly supported in the fourth tray section 2562'.

The second fill material unit 255' comprises a third fill material pack 2551' and a fourth fill material pack 2552' spacedly supported in the tower housing 200', wherein the cooling water 1 coming from the first tray section 2461' is arranged to drop into the third fill material pack 2551', while the cooling water 1 coming from the second lower tray section 2562' is arranged to drop into the fourth fill material pack 2552'.

In this alternative mode, the air is arranged to pass through the first fill material unit 245' and the second fill material unit 255' and the first through eighth heat exchanging pipes 241', 242', 243', 244', 251', 252', 253', 254' for transferring the heat from the cooling water 1 to the air flowing through the multiple effect evaporative condenser 100'.

Moreover, the first cooling unit 24' further comprises a plurality of first water film distributors 247' provided with the first through fourth heat exchanging pipes 241', 242', 243', 244' respectively for guiding the cooling water 1 flowing through the first through fourth heat exchanging pipes 241', 242', 243', 244' in form of thin water film there along. The cooling water 1 in the thin water film state is arranged to perform heat exchange with the refrigerant 3 flowing through the first through fourth heat exchanging pipes 241', 242', 243', 244'.

The cooling water 1 is then collected at the first supporting tray 246' which further has a plurality of through first passing holes 2467' formed thereon wherein the cooling water 1 collected at the first supporting tray 246' is allowed to flow into the first fill material unit 245'. Similarly, the second supporting tray 256' further has a plurality of second lower passing holes 2567' formed thereon wherein the cooling water 1 collected at the second supporting tray 256' is allowed to flow into the second fill material unit 255'.

Moreover, the second cooling unit 25' further comprises a plurality of second water film distributors 257' provided with the fifth through eighth heat exchanging pipes 251', 252', 253', 254' respectively for guiding the cooling water 1 flowing through the fifth through eighth heat exchanging pipes 251', 252', 253', 254' in thin water film therealong. The cooling water 1 in the thin water film state is arranged to perform heat exchange with the refrigerant 3 flowing through the fifth through eighth heat exchanging pipes 251',252',253',254'.

Figure 10:
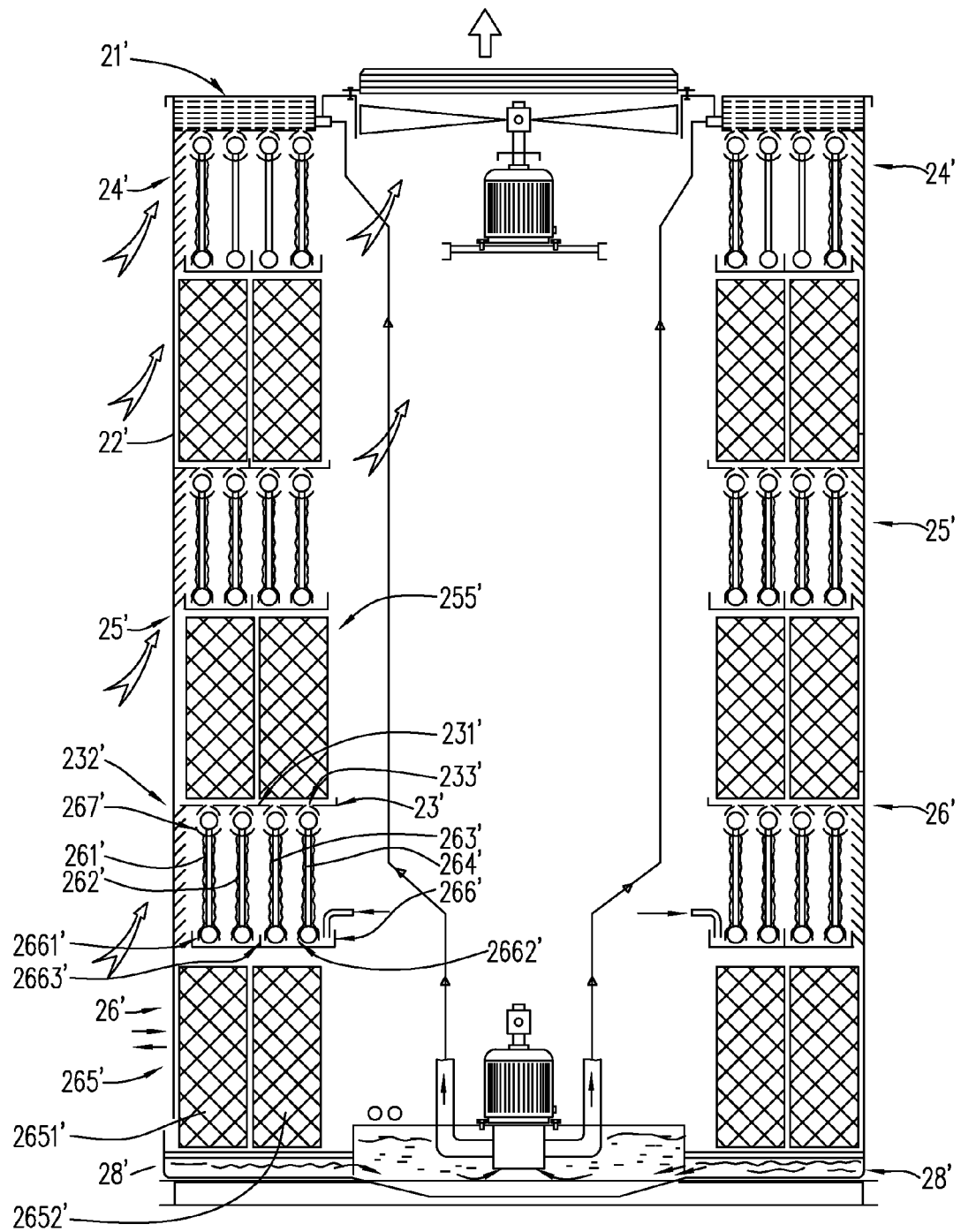
FIG. 10 is a first alternative mode of the multiple-effect evaporative condenser according to the above preferred embodiment of the present invention, illustrating that the multiple-effect evaporative condenser has first through third cooling unit.
Figure 11:
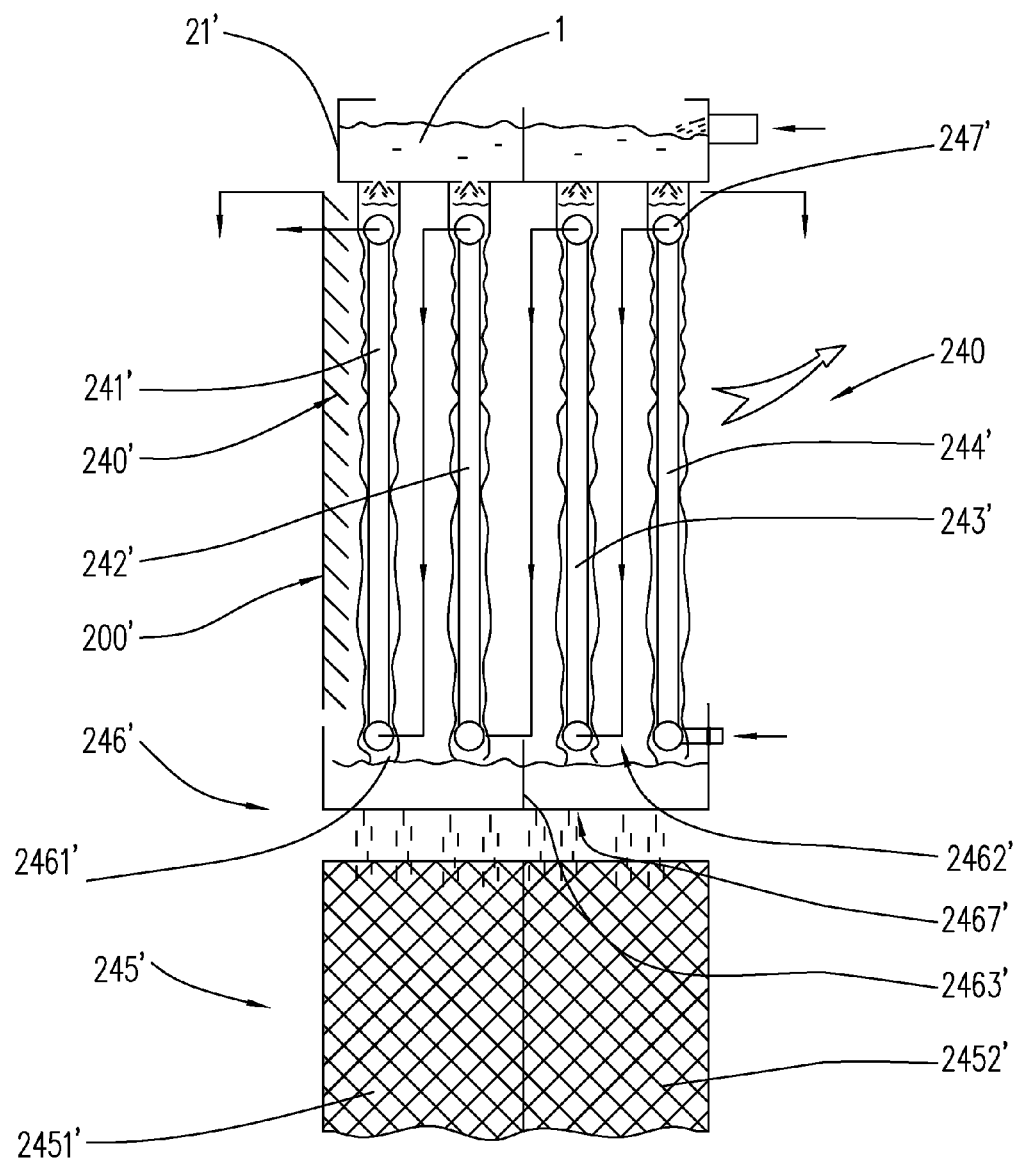
FIG. 11 is a zoom-in diagram of the multiple-effect evaporative condenser according to the first alternative mode of the above preferred embodiment of the present invention.

FIG. 10 to FIG. 11 illustrate that each of the multiple-effect evaporative condensers 100' comprises an addition (i.e. third) cooling unit 26' which is provided underneath the second cooling unit 25' and is structurally identical to the first cooling unit 24' and the second cooling unit 25'. Thus, each of the multiple-effect evaporative condensers 100' comprises a fourth water collection basin 28' provided underneath the third cooling unit 26' for collecting the cooling water 1 coming from the third cooling unit 26'.

The third cooling unit 26' comprises a third supporting tray 266' having a tray partition member 2663' upwardly extended from a bottom surface thereof for dividing the third supporting tray 266' into a fifth tray section 2661' and a sixth tray section 2662', wherein two of the heat exchanging pipes 261', 262' (i.e. the ninth heat exchanging pipe 261' and the tenth heat exchanging pipe 262') are spacedly supported in the fifth tray section 2661' and two of the heat exchanging pipes 263', 264' (i.e. the eleventh heat exchanging pipe 263' and the twelfth heat exchanging pipe 264') are spacedly supported in the sixth tray section 2662'.

The third cooling unit 26' further comprises a third fill material unit 265' which comprises a fifth fill material pack 2651' and a sixth fill material pack 2652' spacedly supported in the tower housing 200', wherein the cooling water 1 coming from the fifth tray section 2661' is arranged to drop into the fifth fill material pack 2651', while the cooling water 1 coming from the sixth tray section 2662' is arranged to drop into the sixth fill material pack 2652'.

Moreover, the third cooling unit 26' further comprises a plurality of third water film distributors 267' provided with the ninth through twelfth heat exchanging pipes 261', 262', 263', 264' respectively for guiding the cooling water 1 flowing through the ninth through twelfth heat exchanging pipes 261', 262', 263', 264' in thin water film therealong. The cooling water 1 in the thin water film state is arranged to perform heat exchange with the refrigerant 3 flowing through the ninth through twelfth heat exchanging pipes 261', 262', 263', 264'.

On the other hand, the third water collection basin 23' has a third bottom tank panel 231', a second side tank: panel 232', a plurality of through third passage holes 233' formed on the third bottom tank: panel 231', wherein the cooling water 1 dropping from the second fill material unit 255' is arranged to be collected at the third water collection basin 23' and reaches the third cooling unit 26' through the third passage holes 233'. The cooling water 1 passing through the third cooling unit 26' is arranged to be collected in the fourth water collection basin 28' and is pumped back to the first water collection basin 1' for another cycle of heat exchange with the refrigerant 3.

Figure 12:
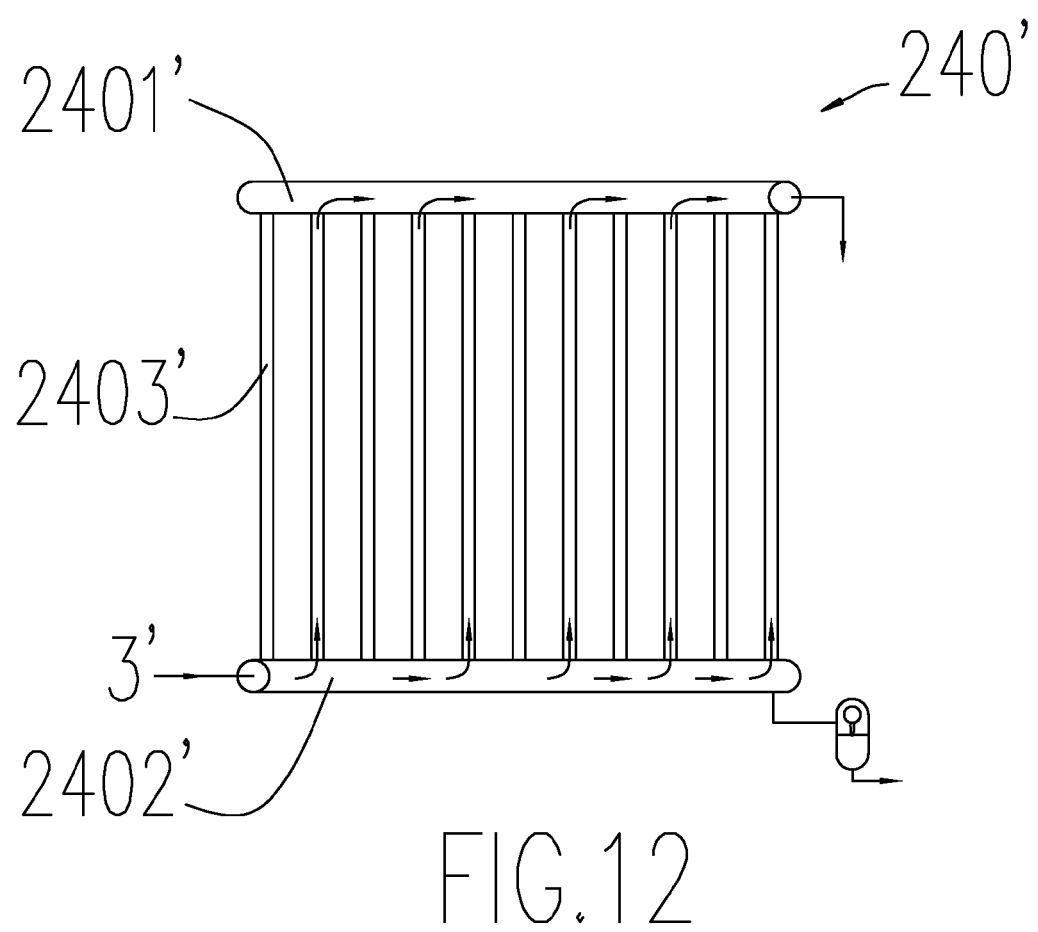
FIG. 12 is a side view of the multiple-effect evaporative condenser according to the first alternative mode of the above preferred embodiment of the present invention, illustrating the side view of the heat exchanging pipes shown in FIG. 10 and FIG. 11.
Figure 13:
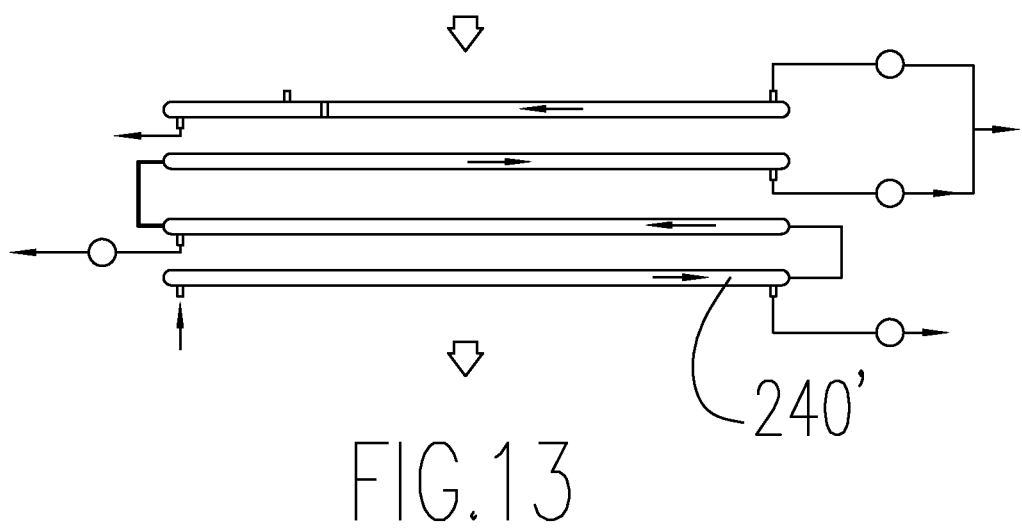
FIG. 13 is a plan sectional view of the multiple-effect evaporative condenser according to the first alternative mode of the above preferred embodiment of the present invention, illustrating the heat exchanging pipes as shown from the top of the multiple-effect evaporative condenser depicted in FIG. 10 and FIG. 11 along the plane 13-13.

As shown in FIG. 11 to FIG. 13 of the drawings, each of the heat exchanging pipes 240' (241'-244') is embodied to be manufactured to form a three-dimensional pipe array extending in the multiple effect evaporative condenser 100'. Thus, each of the heat exchanging pipes 241'-244' comprises a first horizontal section 2401' horizontally extending in the tower housing 200', a second horizontal section 2402' horizontally extending in the tower housing 200' at a position underneath the first horizontal section 2401', and a plurality of vertical sections 2403' extended between the first horizontal section 2401' and the second horizontal section 2402', wherein the refrigerant 3 is arranged to flow from the second horizontal section 2402' to the first horizontal section 2401' through the vertical sections 2403'. The refrigerant 3 flowing through the second horizontal section 2402' of one particular heat exchanging pipe 240' is then guided to flow into the second horizontal section 2402' of an adjacent heat exchanging pipe 240'.

Figure 14:
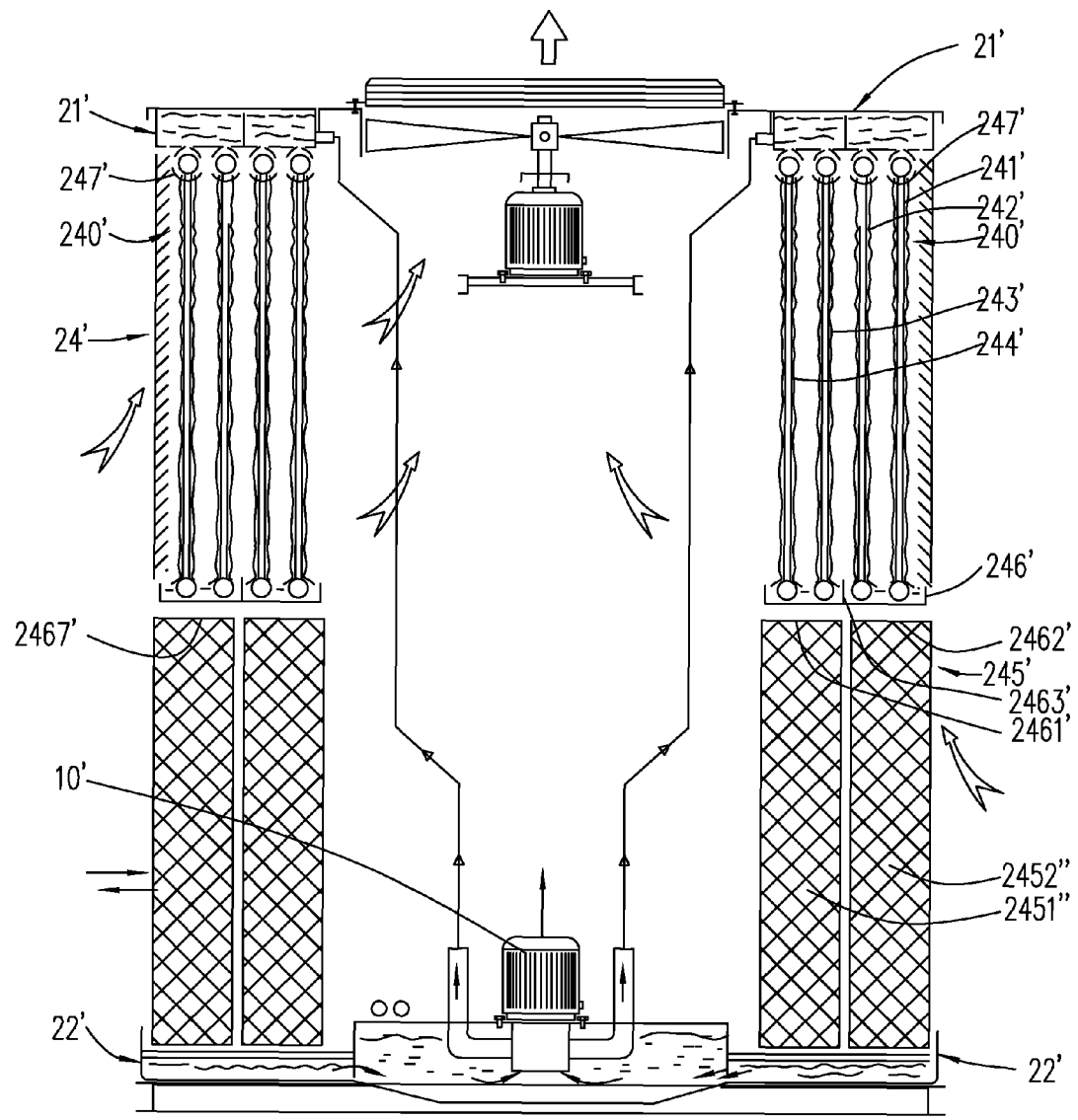
FIG. 14 is a first alternative mode of the multiple-effect evaporative condenser according to the above preferred embodiment of the present invention, illustrating that the multiple-effect evaporative condenser has only one cooling unit.

As shown in FIG. 14 of the drawings, each of the multiple effect evaporative condenser 100' comprises only the first cooling unit 24' so that the cooling water 1 coming from the first fill material unit 245' is collected at the second water collection basin 22' and is pumped back to the first water collection basin 21'.

Figure 15A:
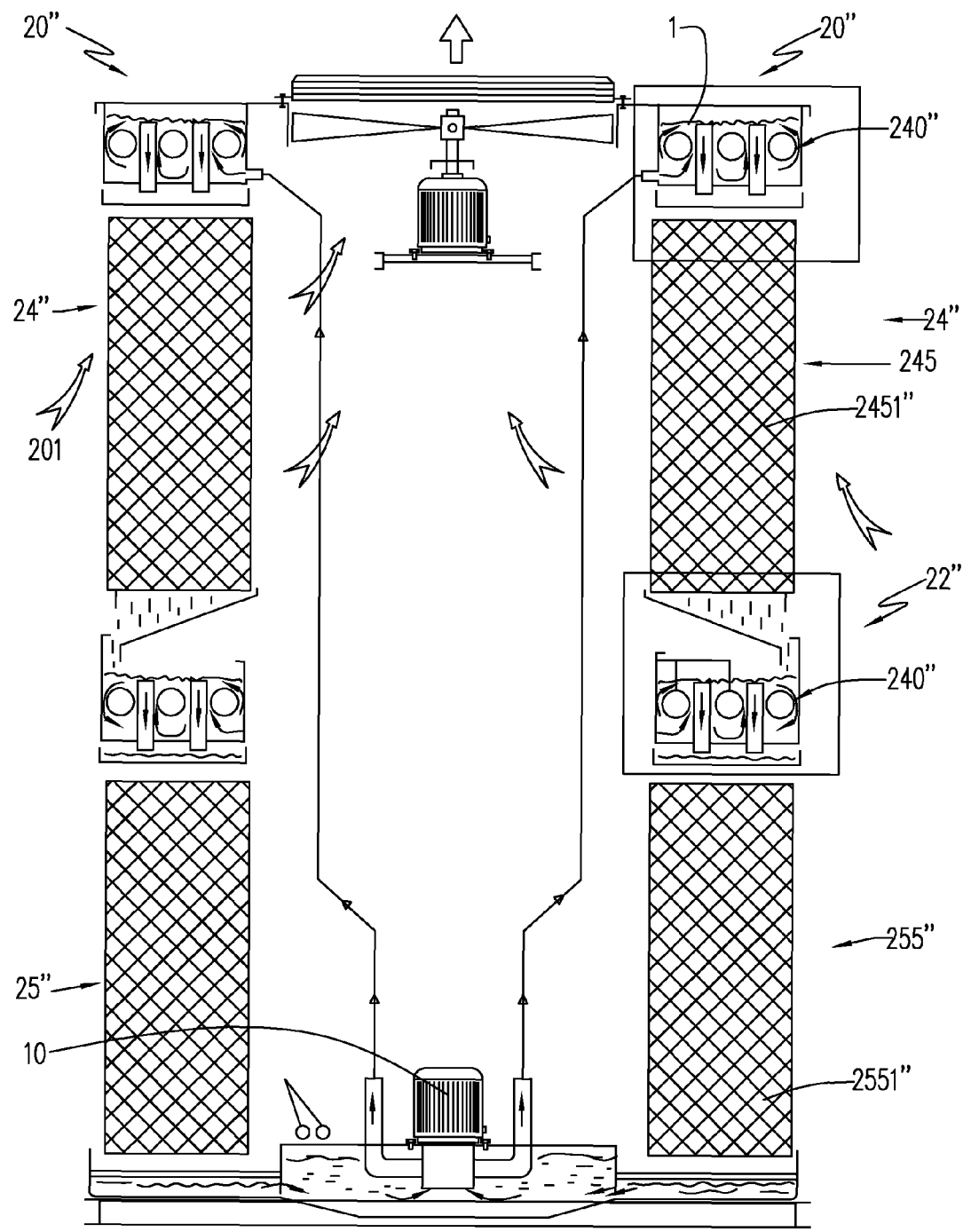
FIG. 15A to FIG. 15C are schematic diagrams of a second alternative mode of the multiple-effect evaporative condenser according to the above preferred embodiment of the present invention.
Figure 15B:
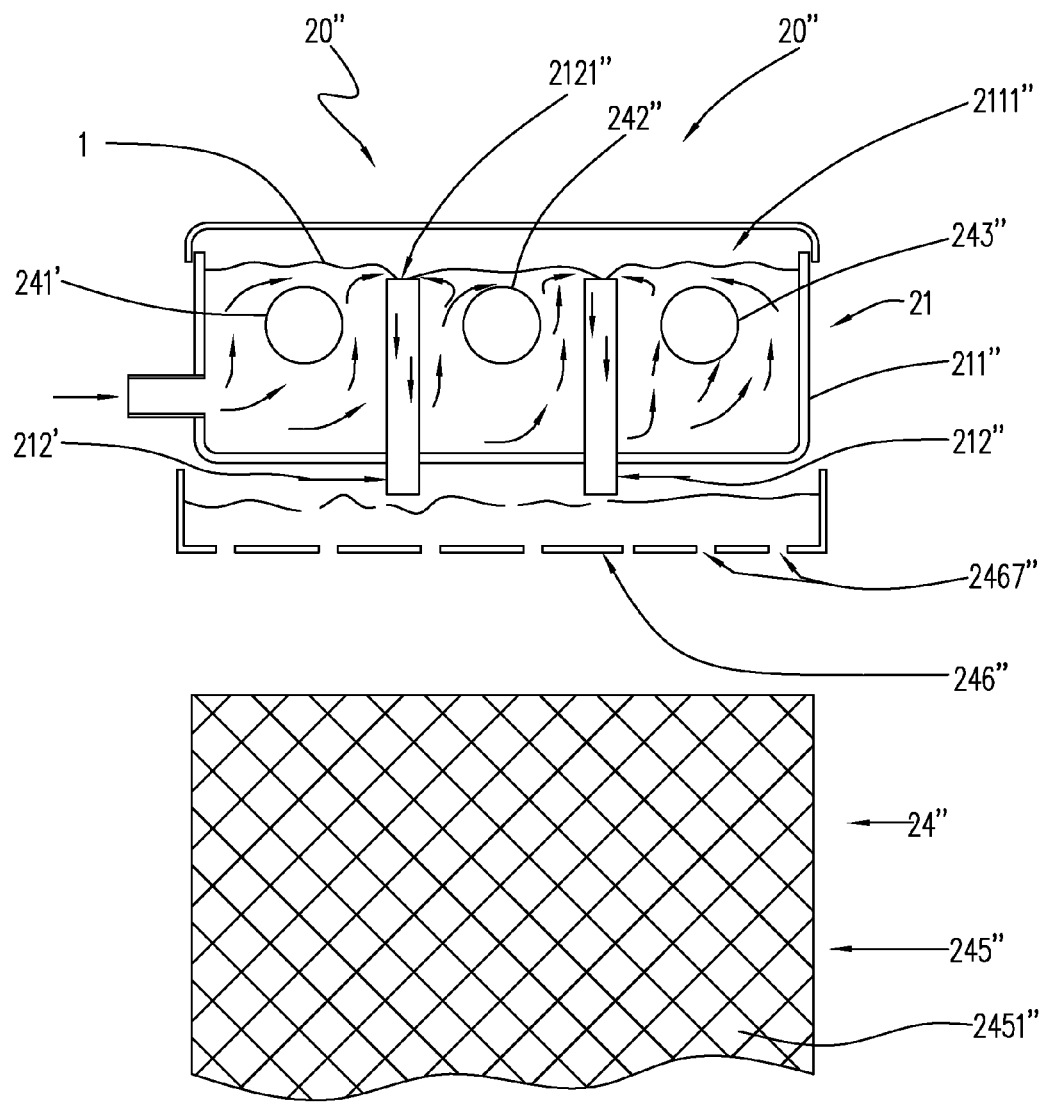
Figure 15C:
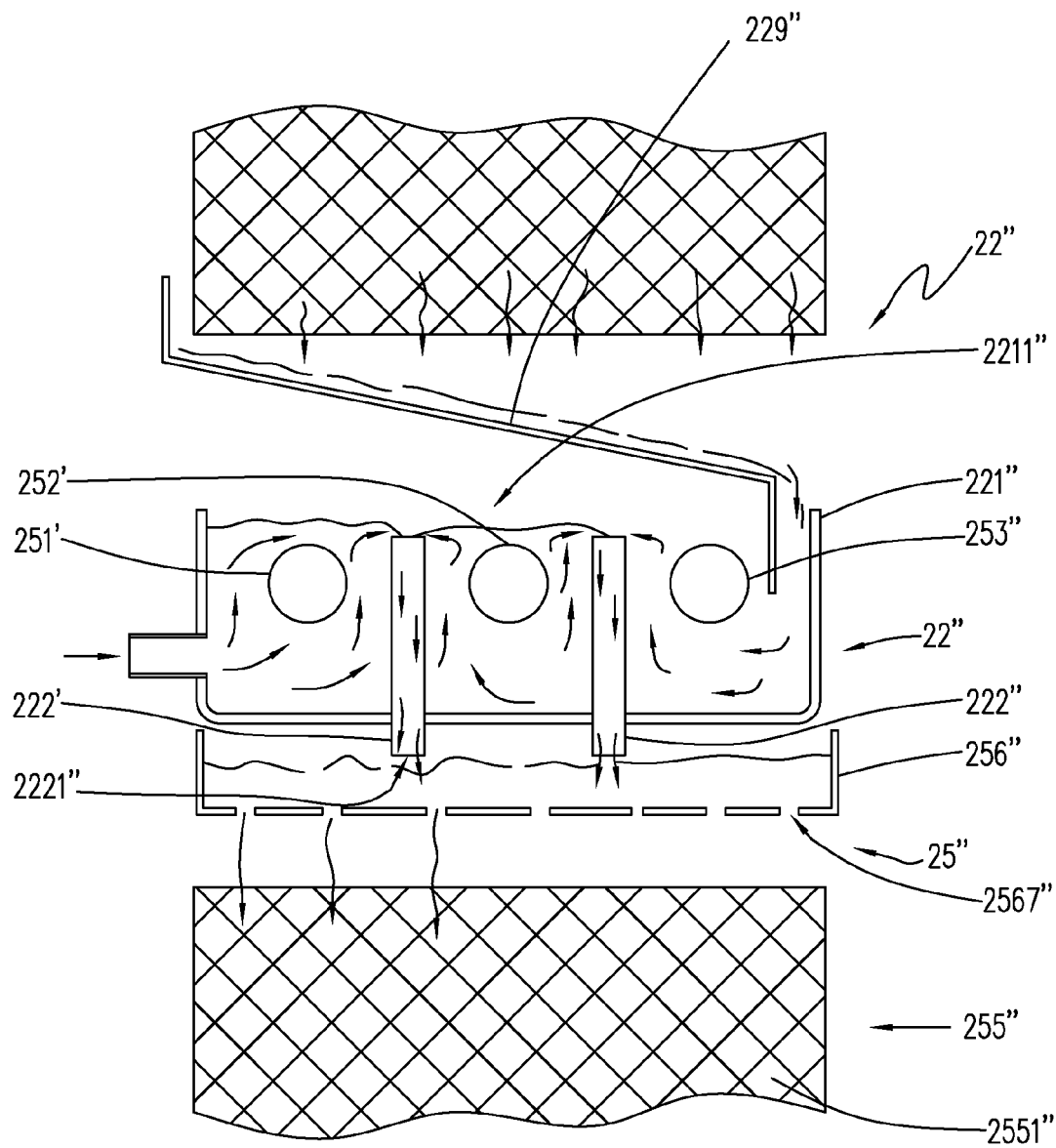

Referring to FIG. 15A to FIG. 15C of the drawings, a second alternative mode of the multiple-effect evaporative condenser 100" is illustrated. FIG. 15 illustrates that the multiple-effect evaporator condenser 100' in its second alternative mode and comprises a first cooling unit 24" and a second cooling unit 25". The second alternative mode of the multiple-effect evaporative condenser 100" is similar to the above alternative modes of the preferred embodiment except the cooling units 24" (25"). In this second alternative mode, the first cooling unit 24" comprises three of the heat exchanging pipes 240" (i.e. the first through third heat exchanging pipes 241", 242", 243") while the second cooling unit 25" comprises another three of the heat exchanging pipes 240" (i.e. the fourth through sixth heat exchanging pipes 251", 252", 253").

The first through third heat exchanging pipes 241", 242", 243" are immersed into the first water collection basin 21" which is communicated with the pumping device 10" so that cooling water 1 is first pumped into the first water collection basin 21" for performing heat exchange with the refrigerant 3 flowing through the first through third heat exchanging pipes 241", 242", 243". The cooling water 1 flowing through the first through the first through third heat exchanging pipes 241", 242", 243" are arranged to flow through the upper fill material unit 245" which comprises a first fill material pack 2451" for performing heat exchange with the air drawn from the air inlet 201.

Furthermore, the fourth through sixth heat exchanging pipes 251", 252", 253" are immersed into the second water collection basin 22" so that cooling water 1" coming from the first cooling unit 24" is arranged to perform heat exchange with the refrigerant 3 flowing through the fourth through sixth heat exchanging pipes 251",252",253".

In this second alternative mode of the multiple effect evaporative condenser of the present invention, the first cooling unit 24" further comprises a first supporting tray 246", and the first water collection basin 21" comprises a first tank body 211" defining a first tank cavity 2111" for receiving the cooling water 1, and a plurality of first water tubes 212" spacedly formed in the first tank body 211" to define a plurality of first water channels 2121" within the first water tubes 212" respectively, The first water tubes 212" communicates the first tank cavity 2111" with the first fill material unit 245" through the first supporting tray 246" so that cooling water 1 is capable of flowing from the first water collection basin 21" to the first supporting tray 246" through the first water channels 2121".

The cooling water 1 is then collected at the first supporting tray 246" which further has a plurality of through first passing holes 2467" formed thereon wherein the cooling water 1 collected at the upper supporting tray 246" is allowed to flow into the first fill material unit 245" for performing heat exchange with the air drawn from the air inlet 201.

It is worth mentioning that each of the first water tubes 212" is mounted in the first water collection basin 21" in such a manner that a top opening of the first water tube 212" is higher than the first through third heat exchanging pipes 241", 242", 243". From simple physics, the cooling water 1 having higher temperature tends to go up in the first water collection basin 21" while the cooling water 1 having relatively lower temperature tends to go down in the first water collection basin 21", Thus, the cooling water 1 in the first water collection basin 21" is arranged to absorb heat from the first through third heat exchanging pipes 241", 242", 243", and after heat absorption, the cooling water 1 goes up in the first water collection basin 21" and flow into one of the first water tubes 212", Relatively cool cooling water 1 is retained in the lower portion of the first water collection basin 21" for heat absorption until the temperature increases to such an extent that the cooling water 1 goes up in the first water collection basin 21" and enters the first water tubes 212".

The second cooling unit 25" further comprises a second supporting tray 256", and the second water collection basin 22" comprises a second tank body 221" defining a second tank cavity 2211" for receiving the cooling water 1 coming from the first cooling unit 24", and a plurality of second water tubes 222" spacedly formed in the second tank body 221" to define a plurality of second water channels 2221" within the second water tubes 222" respectively, The second water tubes 222" communicate the second tank cavity 2211" with the second fill material pack 2551" of the lower fill material unit 255" so that cooling water 1 is capable of flowing from the second water collection basin 22" to the second supporting tray 256" through the second water channels 2221".

The cooling water 1 is then collected at the second supporting tray 256" which further has a plurality of through second passing holes 2567" formed thereon wherein the cooling water 1" collected at the second supporting tray 256" is allowed to flow into the second fill material pack 2551" of the second fill material unit 255" for performing heat exchange with the air drawn from the air inlet 202.

As in the case of the first water collection basin 21", each of the second water tubes 222" is mounted in the second water collection basin 22" in such a manner that a top opening of the second water tube 222" is higher than the fourth through sixth heat exchanging pipes 251", 252", 253", The cooling water 1 in the second water collection basin 22" is arranged to absorb heat from the fourth through sixth heat exchanging pipes 251", 252", 253", and after heat absorption, the cooling water 1 goes up in the second water collection basin 22" and flow into one of the second water tubes 222", Relatively cool cooling water 1 is retained in the lower portion of the second water collection basin 22" for heat absorption until the temperature increases to such an extent that the cooling water 1" goes up in the second water collection basin 22" and enters the second water tubes 222".

The second supporting tray 256" further has a plurality of through lower passing holes 2567" formed thereon wherein the cooling water 1 collected at the second supporting tray 256" is allowed to flow into the second fill material unit 255".

The second water collection basin 22" further comprises a water guider 229" inclinedly extended in the second tank cavity 2211" in such a manner that the cooling water 1 coming from the first cooling unit 24" is guided to flow into the second water collection basin 22" through the water guider 229" for performing heat exchange with the fourth through sixth heat exchanging pipes 251", 252", 253".

Figure 16:
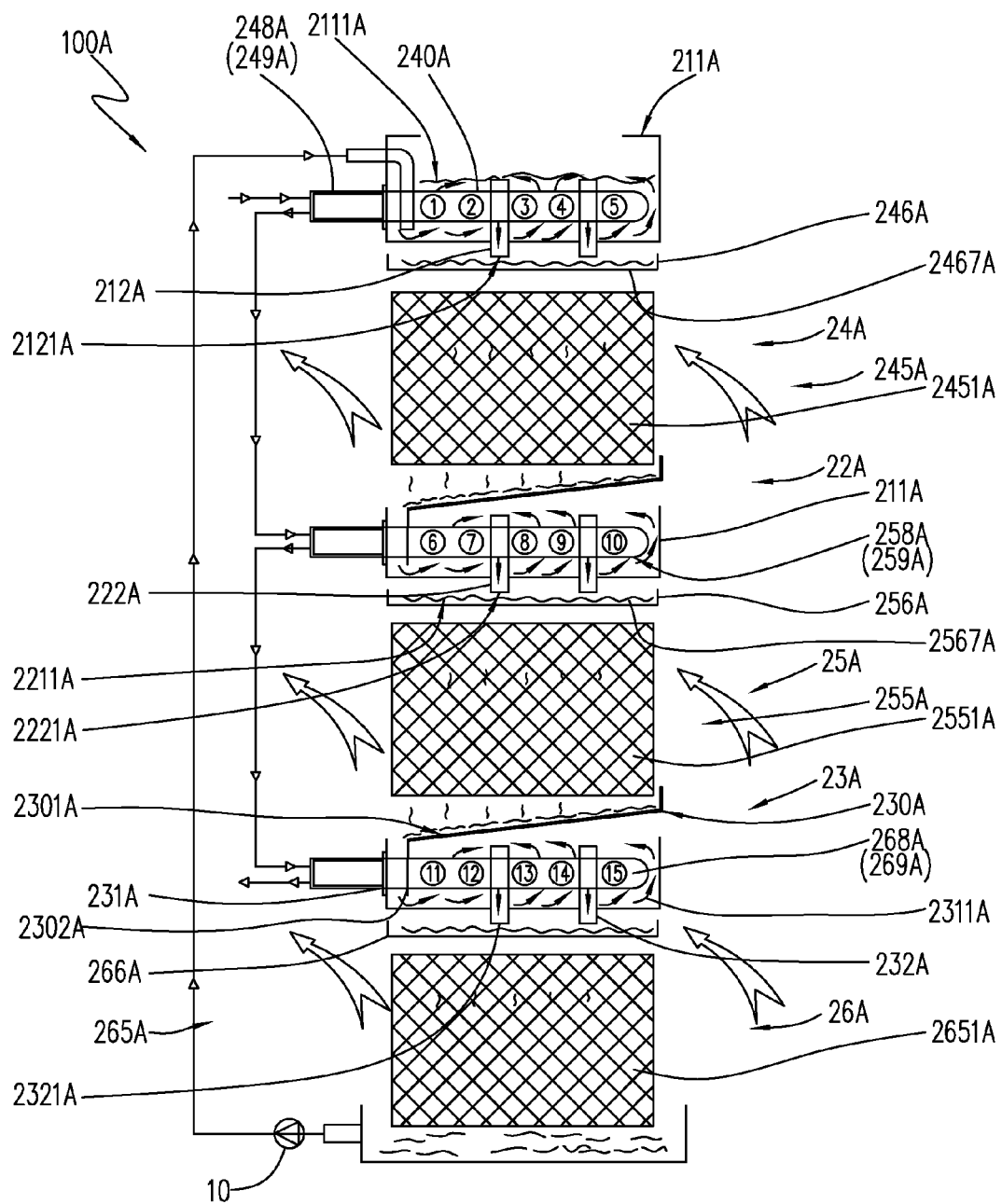
FIG. 16 is a third alternative mode of the multiple-effect evaporative condenser according to the above preferred embodiment of the present invention.
Figure 17A:
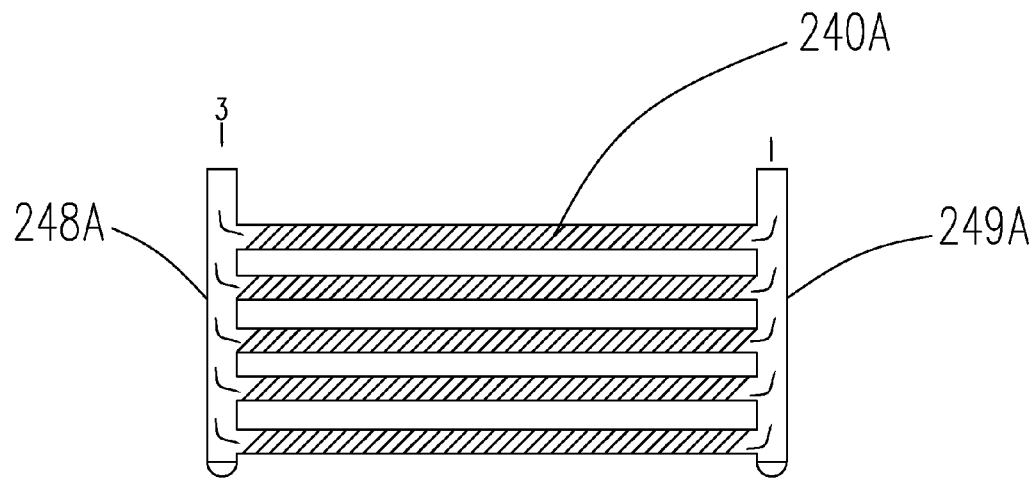
FIG. 17A to FIG. 17C are schematic diagrams of a third alternative mode of the multiple-effect evaporative condenser according to the above preferred embodiment of the present invention, illustrating the heat exchanging pipes and the flow of the refrigerant.

Referring to FIG. 16, FIG. 17A to FIG. 17C, FIG. 18A to FIG. 18C of the drawings, a third alternative mode of the above preferred embodiment of the multiple-effect evaporative condenser 100A of the present invention is illustrated. FIG. 16 illustrates that the multiple-effect evaporator condenser 100A in its third alternative mode and comprises a first cooling unit 24A, a second cooling unit 25A and a third cooling unit 26A. The third alternative mode of the multiple-effect evaporative condenser 100A is similar to the second alternative mode just described. In this third alternative mode, each of the first cooling unit 24A, the second cooling unit 25A and the third cooling unit 26A comprises five of the heat exchanging pipes 240A.

Moreover, the first cooling unit 24A further comprises a first refrigerant inlet pipe 248A connected to the heat exchanger 30, and a first refrigerant outlet pipe 249A, wherein the corresponding heat exchanging pipes 240A are extended between the first refrigerant inlet pipe 248A and the first refrigerant outlet pipe 249A. Similarly, the second cooling unit 25A further comprises a second refrigerant inlet pipe 258A connected to the first refrigerant outlet pipe 249A, and a second refrigerant outlet pipe 259A, wherein the corresponding heat exchanging pipes 240A are extended between the second refrigerant inlet pipe 258A and the second refrigerant outlet pipe 259A. Moreover, the third cooling unit 26A further comprises a third refrigerant inlet pipe 268A connected to the second refrigerant outlet pipe 259A, and a third refrigerant outlet pipe 269A connected to the heat exchanger 30, wherein the corresponding heat exchanging pipes 240A are extended between the third refrigerant inlet pipe 268A and the third refrigerant outlet pipe 259A. In other words, for each of the first cooling unit 24A through the third cooling unit 26A, the corresponding heat exchanging pipes 240A and the corresponding refrigerant inlet 248A (258A) (268A) and the corresponding refrigerant outlet pipe 249A (259A) (269A) form three array of pipes for transmitting the refrigerant 3 which is arranged to perform heat exchange with the cooling water 1 passing through the first cooling unit 24A to the third cooling unit 26A.

The refrigerant 3 entering the first refrigerant inlet pipe 248A is bifurcated to flow into the five heat exchanging pipes 240A in the first cooling unit 24A. The heat exchanging pipes 240A are immersed into the first water collection basin 21A which is communicated with the pumping device 10 so that cooling water 1 is first pumped into the first water collection basin 21A for performing heat exchange with the refrigerant 3 flowing through the heat exchanging pipes 240A. The cooling water 1 flowing through these heat exchanging pipes 240A are arranged to flow through the first fill material unit 245A which comprises a first fill material pack 2451A for performing heat exchange with the air drawn from the air inlet 201.

Note that the refrigerant 3 passing through the heat exchanging pipes 240A of the first cooling unit 24A is collected to flow into the first refrigerant outlet pipe 249A, which is connected to the second refrigerant inlet pipe 258A. The refrigerant 3 entering the second refrigerant inlet pipe 258A is bifurcated to flow into the five heat exchanging pipes 240A in the second cooling unit 25A.

Furthermore, the heat exchanging pipes 240A in the second cooling unit 25A are immersed into the second water collection basin 221A so that cooling water 1 coming from the first cooling unit 24A is arranged to perform heat exchange with the refrigerant 3 flowing through the heat exchanging pipes 240A of the second cooling unit 25A. The refrigerant 3 passing through the heat exchanging pipes 240A of the second cooling unit 25A is collected to flow into the second refrigerant outlet pipe 259A, which is connected to the third refrigerant inlet pipe 268A.

In this third alternative mode, the first cooling unit 24A further comprises a first supporting tray 246A, and the first water collection basin 21A comprises a first tank body 211A defining a first tank cavity 2111A for receiving the cooling water 1, and a plurality of first water tubes 212A spacedly formed in the first tank body 211A to define a plurality of first water channels 2121A within the first water tubes 212A respectively. The first water tubes 212A communicate the first tank cavity 2111A with the first fill material unit 245A so that cooling water 1 is capable of flowing from the first water collection basin 21A to the first supporting tray 246A through the first water channels 2121A.

The cooling water 1 then passes through the first supporting tray 246A which further has a plurality of through first passing holes 2467A formed thereon wherein the cooling water 1 reaching the first supporting tray 246A is allowed to flow into the first fill material unit 245A for performing heat exchange with the air drawn from the air inlet 201.

It is worth mentioning that each of the first water tubes 212A is mounted in the first water collection basin 21A in such a manner that a top opening of the first water tube 212A is higher than the corresponding heat exchanging pipes 240A. From simple physics, the cooling water 1 having higher temperature tends to go up in the first water collection basin 21A while the cooling water 1 having relatively lower temperature tends to go down in the first water collection basin 21A. Thus, the cooling water 1 in the first water collection basin 21A is arranged to absorb heat from the heat exchanging pipes 240A, and after heat absorption, the cooling water 1 goes up in the first water collection basin 21A and flow into one of the first water tubes 212A. Relatively cool cooling water 1 is retained in the lower portion of the first water collection basin 21A for heat absorption until the temperature increases to such an extent that the cooling water 1 goes up in the first water collection basin 21A and enters the first water tubes 212A.

The second cooling unit 25A further comprises a second supporting tray 256A, and the second water collection basin 22A comprises a second tank body 221A defining a second tank cavity 2211A for receiving the cooling water 1 coming from the first cooling unit 24A, and a plurality of second water tubes 222A spacedly formed in the second tank body 221A to define a plurality of second water channels 2221A within the second water tubes 222A respectively. The second water tubes 222A communicate the second tank cavity 2211A with the second fill material unit 255A which comprises a second fill material pack 2551A so that cooling water 1 is capable of flowing from the second water collection basin 22A to the second supporting tray 256A through the second water channels 2221A.

The cooling water 1 is then collected at the second supporting tray 256A which further has a plurality of through second passing holes 2567A formed thereon wherein the cooling water 1 collected at the second supporting tray 256A is allowed to flow into the second fill material pack 2551A of the second fill material unit 255A for performing heat exchange with the air drawn from the air inlet 202.

As in the case of the first water collection basin 21A, each of the second water tubes 222A is mounted in the second water collection basin 22A in such a manner that a top opening of the second water tube 222A is higher than the corresponding heat exchanging pipes 240A. The cooling water 1 in the second water collection basin 22A is arranged to absorb heat from the heat exchanging pipes 240A, and after heat absorption, the cooling water 1 goes up in the second water collection basin 22A and flow into one of the second water tubes 222A. Relatively cool cooling water 1 is retained in the lower portion of the second water collection basin 22A for heat absorption until the temperature increases to such an extent that the cooling water 1 goes up in the second water collection basin 22A and enters the second water tubes 222A.

The second water collection basin 22A further comprises a first water guider 229A inclinedly extended in the second tank cavity 2211A in such a manner that the cooling water 1 coming from the first cooling unit 24A is guided to flow into a lower portion of the second water collection basin 22A through the first water guider 229A for performing heat exchange with the heat exchanging pipes 240A. Note that the first water guider 229A is mounted above second water tubes 222A so that the cooling water 1 coming from the first cooling unit 24A is not mixed with the cooling water 1 which has absorbed heat from the heat exchanging pipes 240A.

Figure 18A:
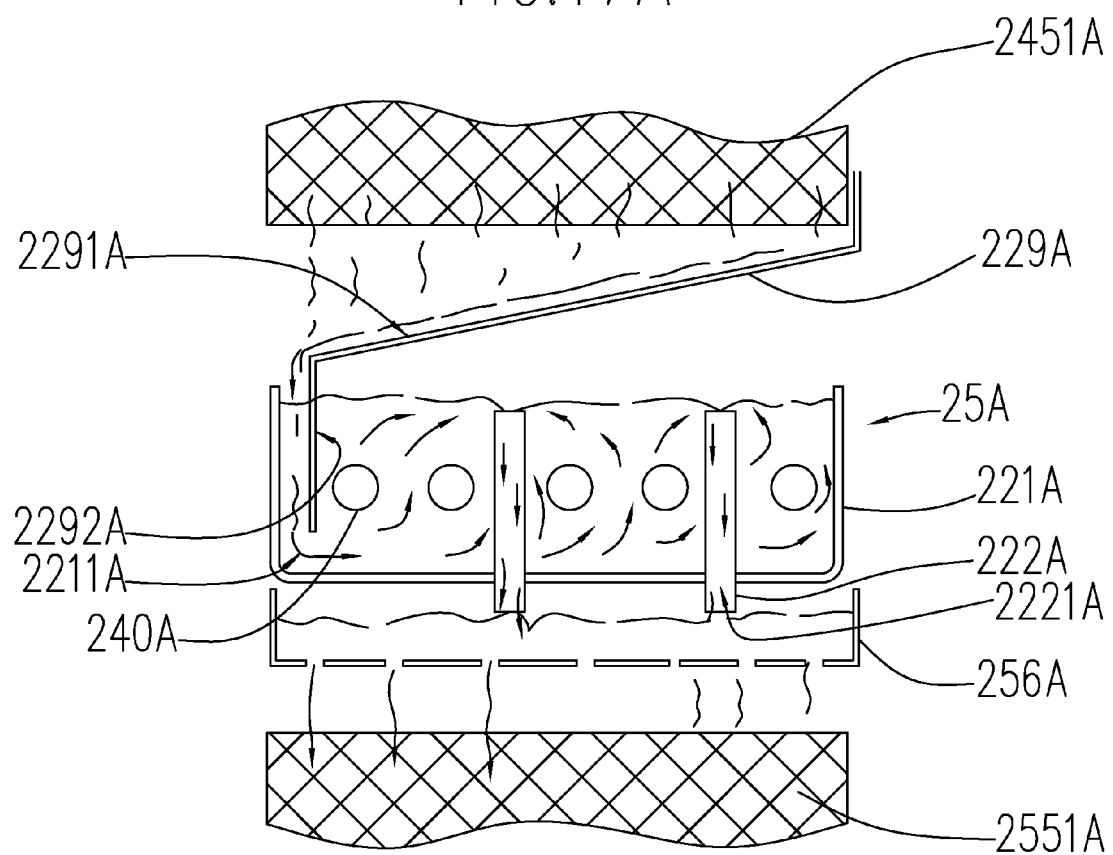
FIG. 18A to FIG. 18C are schematic diagrams of a third alternative mode of the multiple-effect evaporative condenser according to the above preferred embodiment of the present invention.
Figure 17B:
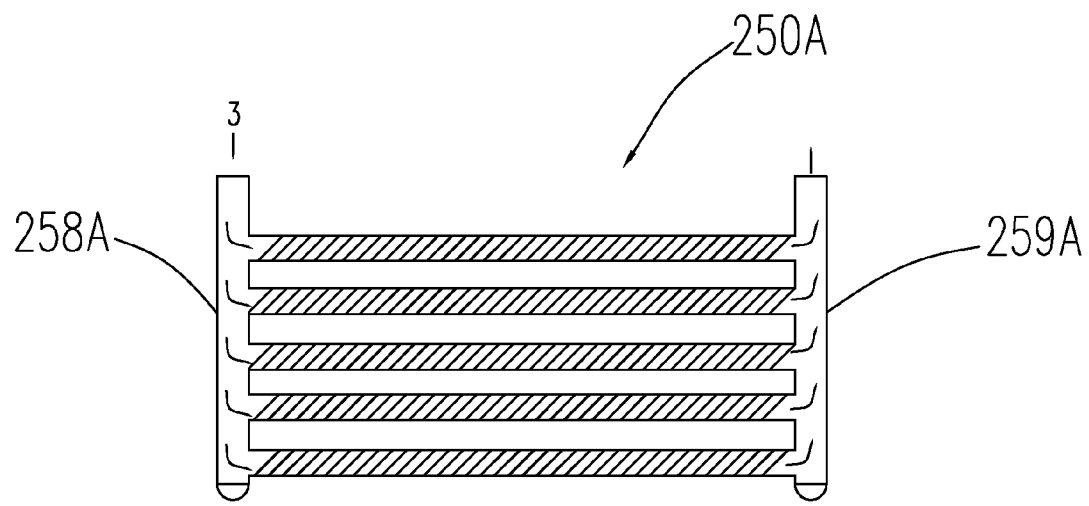
Figure 18B:
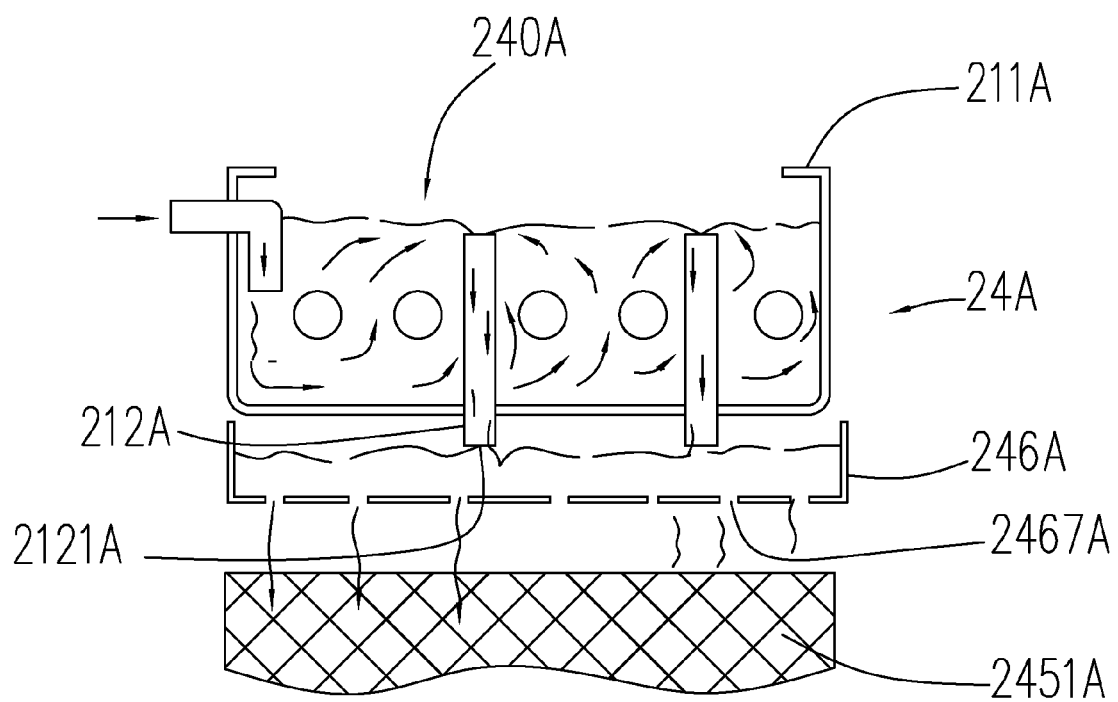
Figure 17C:
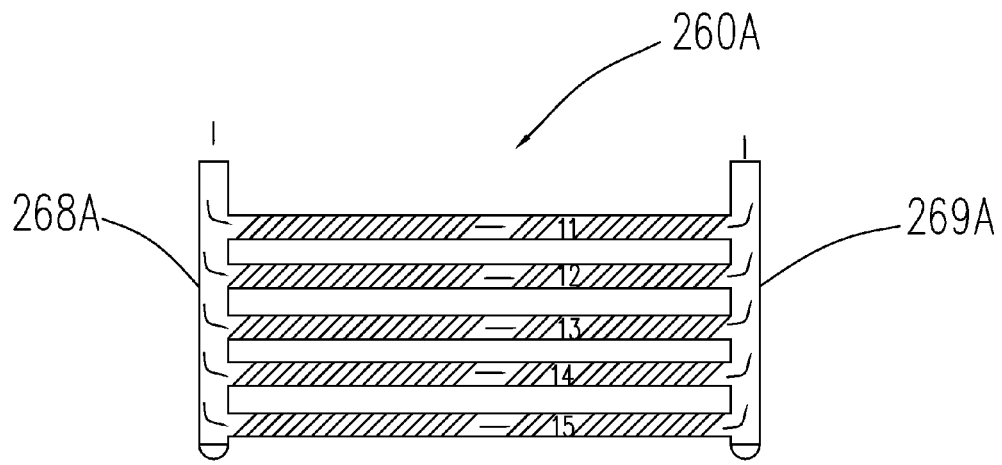
Figure 18C:
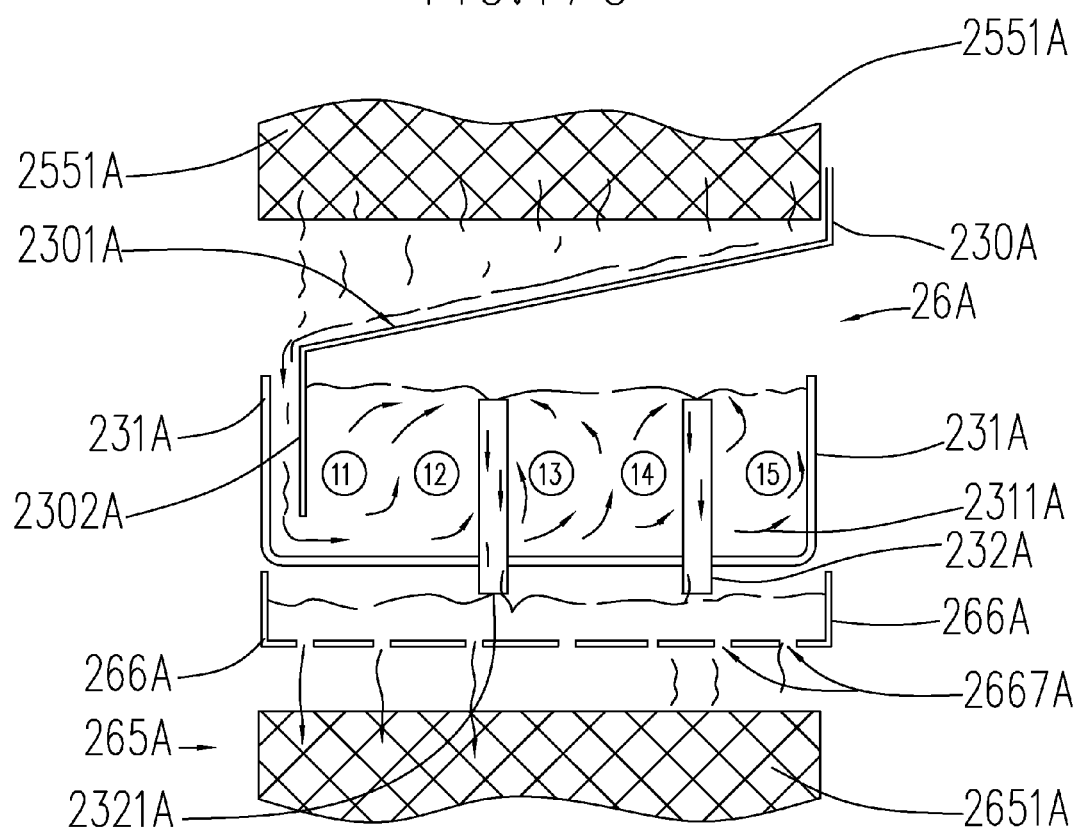

As shown in FIG. 18A to FIG. 18C of the drawings, the first water guider 229A has a first inclined portion 2291A inclinedly extended from the top side edge portion of the second water collection basin 22A to an opposite side portion of the second water collection basin 22A for guiding the cooling water 1 coming from the first fill material unit 245A to slide inclinedly on the first inclined portion 2291A, and a first guiding portion 2292A downwardly and substantially vertically extended from the first inclined portion 2291A to the second tank cavity 2211A so that the cooling water 1 sliding on the first inclined portion 2291A and having a relatively cool temperature is guided to flow into a lower portion of the second tank cavity 2211A and perform heat exchange with the heat exchanging pipes 240A.

The third cooling unit 26A further comprises a third supporting tray 266A, and the third water collection basin 23A comprises a third tank body 231A defining a third tank cavity 2311A for receiving the cooling water 1 coming from the second cooling unit 25A, and a plurality of third water tubes 232A spacedly formed in the third tank body 231A to define a plurality of third water channels 2321A within the third water tubes 232A respectively. The third water tubes 232A communicate the third tank cavity 2311A with the third fill material unit 265A which comprises a third fill material pack 2651A so that cooling water I is capable of flowing from the third water collection basin 23A to the third supporting tray 266A through the third water channels 2321A.

The cooling water 1 is then collected at the third supporting tray 266A which further has a plurality of through third passing holes 2667A formed thereon wherein the cooling water 1 collected at the third supporting tray 266A is allowed to flow into the third fill material pack 2651A of the third fill material unit 265A for performing heat exchange with the air drawn from the air inlet 202.

As in the case of the second water collection basin 22A, each of the third water tubes 232A is mounted in the third water collection basin 23A in such a manner that a top opening of the third water tube 232A is higher than the corresponding heat exchanging pipes 240A. The cooling water 1 in the third water collection basin 23A is arranged to absorb heat from the heat exchanging pipes 240A, and after heat absorption, the cooling water 1 goes up in the third water collection basin 23A and flow into one of the third water tubes 232A. Relatively cool cooling water 1 is retained in the lower portion of the third water collection basin 23A for heat absorption until the temperature increases to such an extent that the cooling water 1 goes up in the third water collection basin 23A and enters the third water tubes 232A.

The third collection basin 23A further comprises a second water guider 230A inclinedly extended in the third tank cavity 2311A in such a manner that the cooling water 1 coming from the second cooling unit 25A is guided to flow into a lower portion of the third water collection basin 23A through the second water guider 230A for performing heat exchange with the heat exchanging pipes 240A. Note that the second water guider 230A is mounted above third water tubes 232A so that the cooling water 1 coming from the second cooling unit 25A is not mixed with the cooling water 1 which has absorbed heat from the heat exchanging pipes 240A.

The second water guider 230A has a second inclined portion 2301A inclinedly extended from the top side edge portion of the third water collection basin 23A to an opposite side portion of the third water collection basin 23A for guiding the cooling water 1 coming from the second fill material unit 255A to slide inclinedly on the second inclined portion 2301A, and a second guiding portion 2302A downwardly and substantially vertically extended from the second inclined portion 2301A to the third tank cavity 2311A so that the cooling water 1 sliding on the second inclined portion 2301A and having a relatively cool temperature is guided to flow into a lower portion of the third tank cavity 2311A and perform heat exchange with the heat exchanging pipes 240A.

Figure 19:
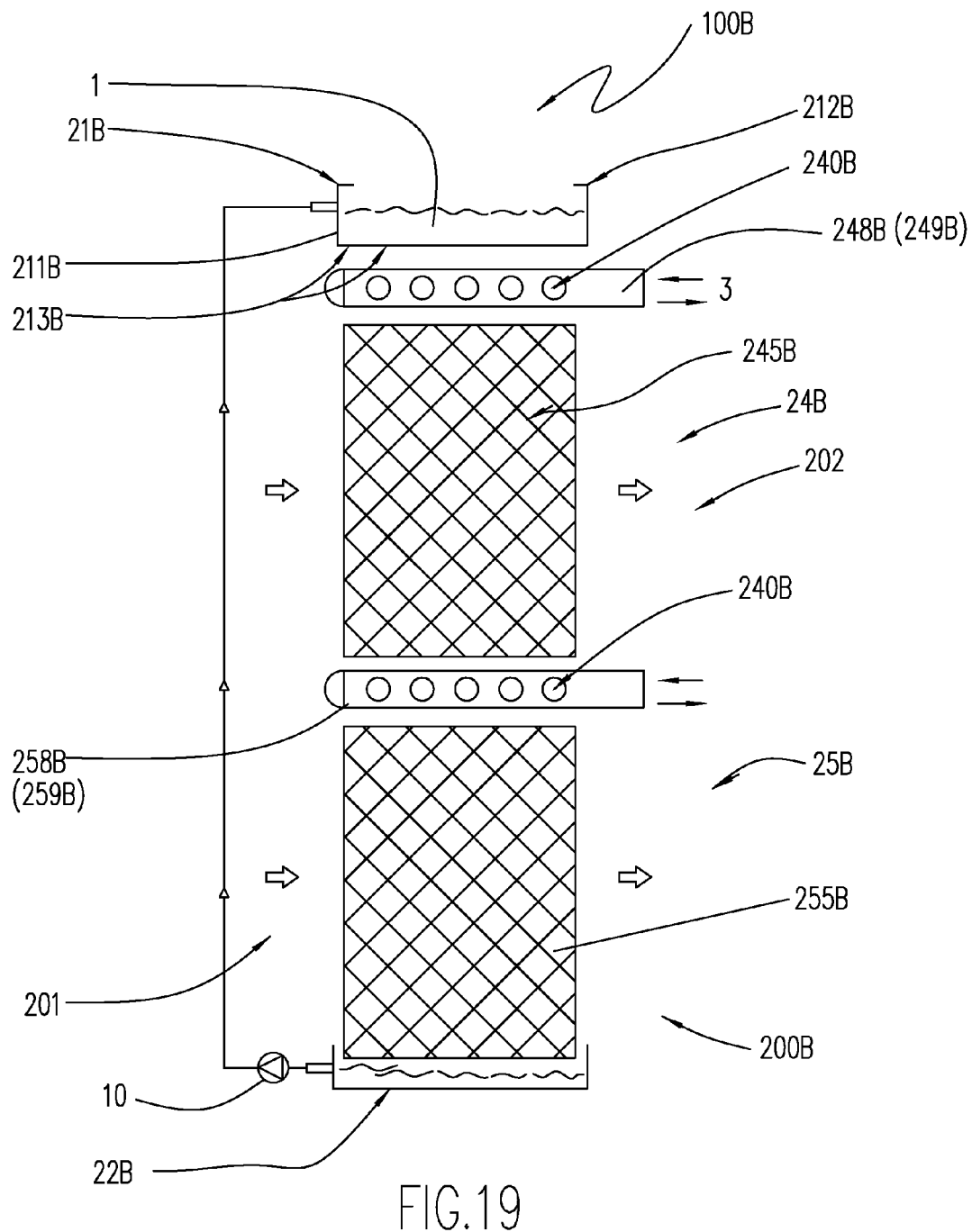
FIG. 19 is a fourth alternative mode of the multiple-effect evaporative condenser according to the above preferred embodiment of the present invention.
Figure 20:
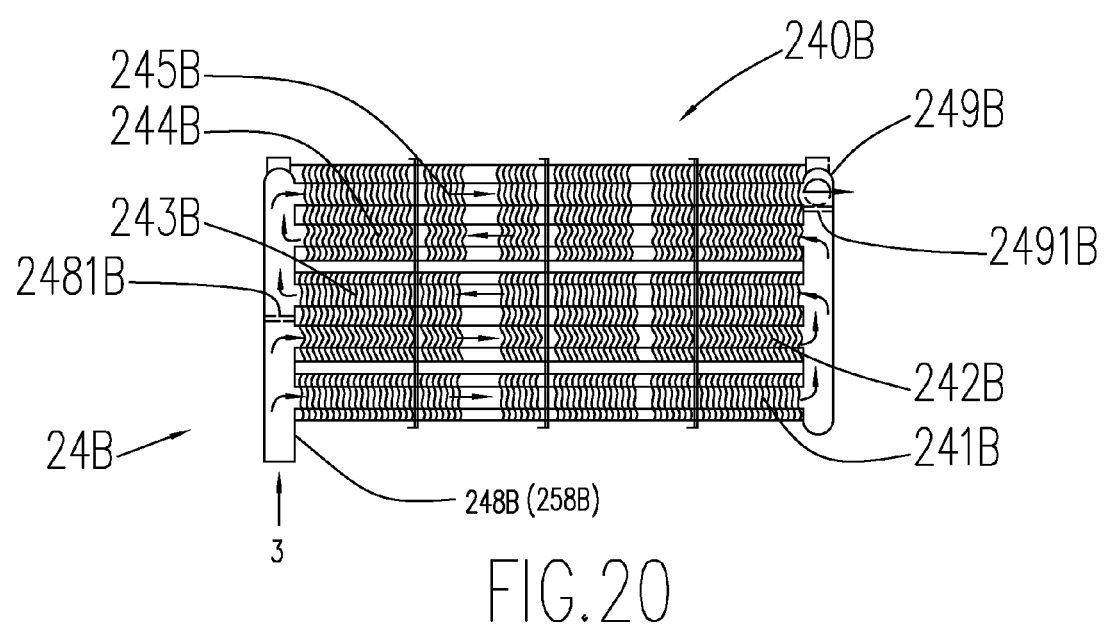
FIG. 20 is a fourth alternative mode of the multiple-effect evaporative condenser according to the above preferred embodiment of the present invention, illustrating the flow path of the refrigerant in the first cooling unit.
Figure 21:
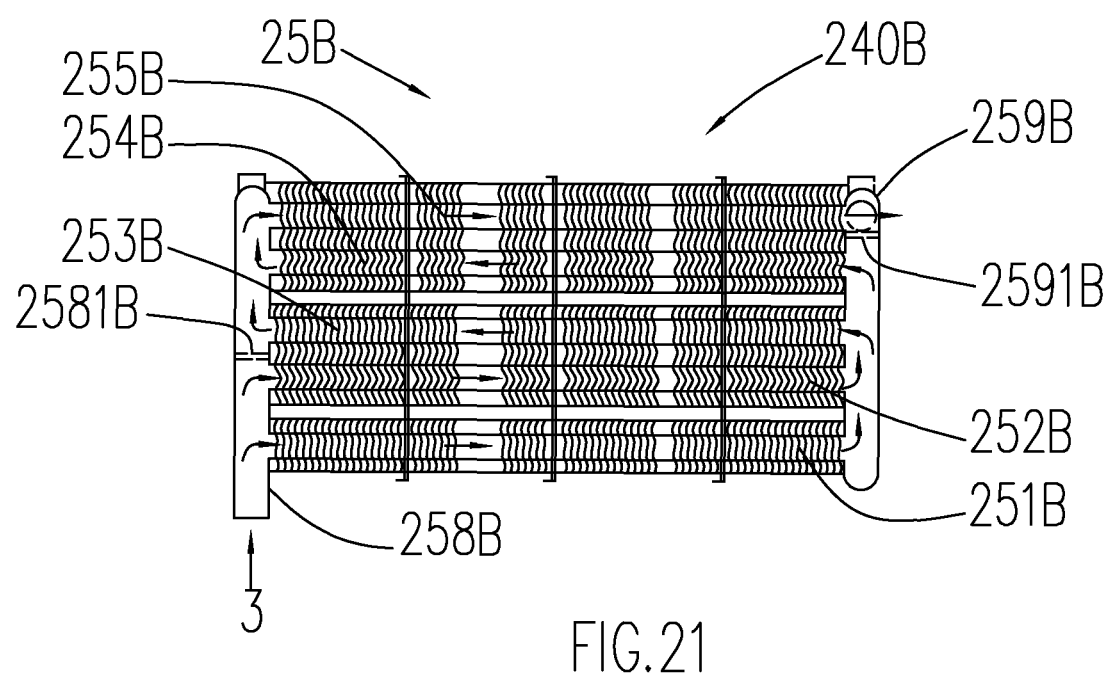
FIG. 21 is a fourth alternative mode of the multiple-effect evaporative condenser according to the above preferred embodiment of the present invention, illustrating the flow path of the refrigerant the second cooling unit.

Referring to FIG. 19 to FIG. 20 of the drawings, a fourth alternative mode of the multiple effect evaporative condenser according to the preferred embodiment of the present invention is illustrated. The fourth alternative mode is similar to the above described alternative modes. According to the fourth alternative mode, the multiple effect evaporative condenser 100B also comprises a tower housing 200 (as shown in FIG. 3) having an air inlet 201 and an air outlet 202, a first water collection basin 21B, a first cooling unit 24B, a second cooling unit 25B, and a second water collection basin 22B provided underneath the second cooling unit 25B.

Figure 2:
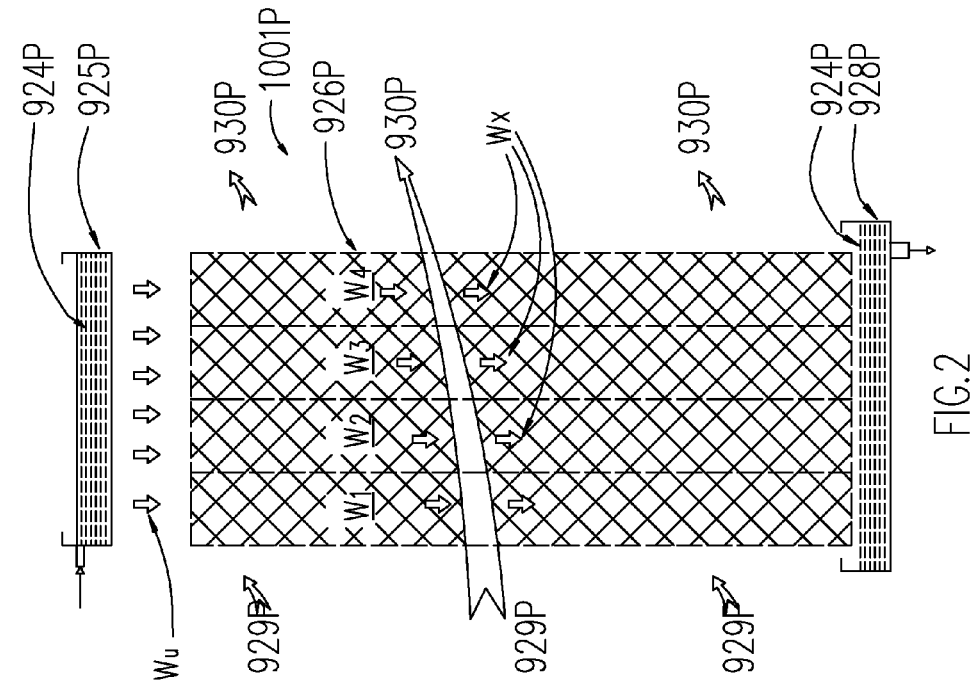
FIG. 2 is a schematic diagram of a cooling tower of the conventional air conditioning system.
Figure 1:
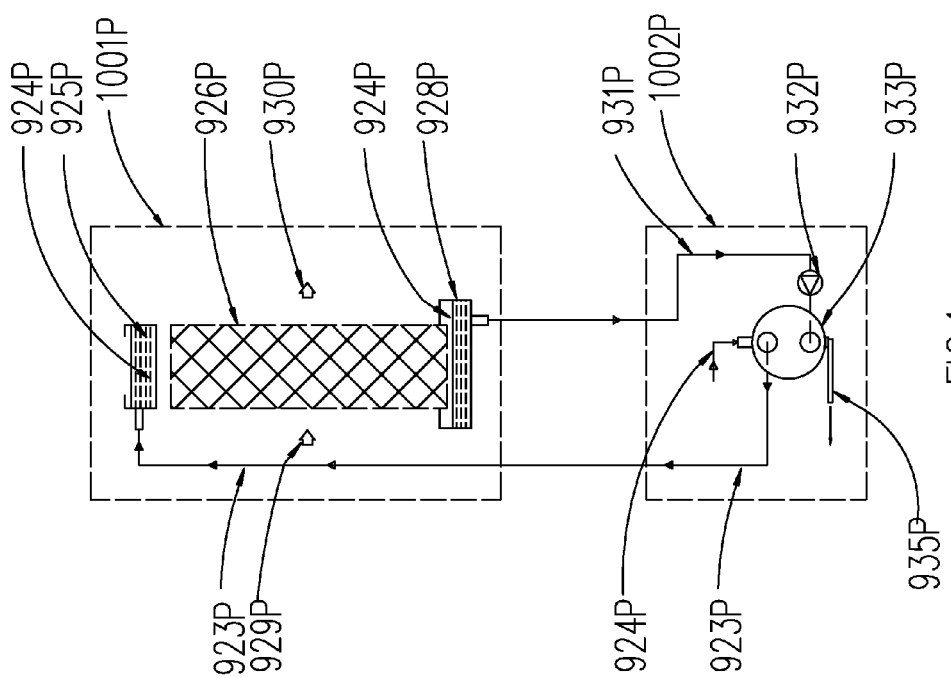
FIG. 1 is a schematic diagram of a conventional cooling tower and a conventional condenser of a central air conditioning system.
Figure 3:
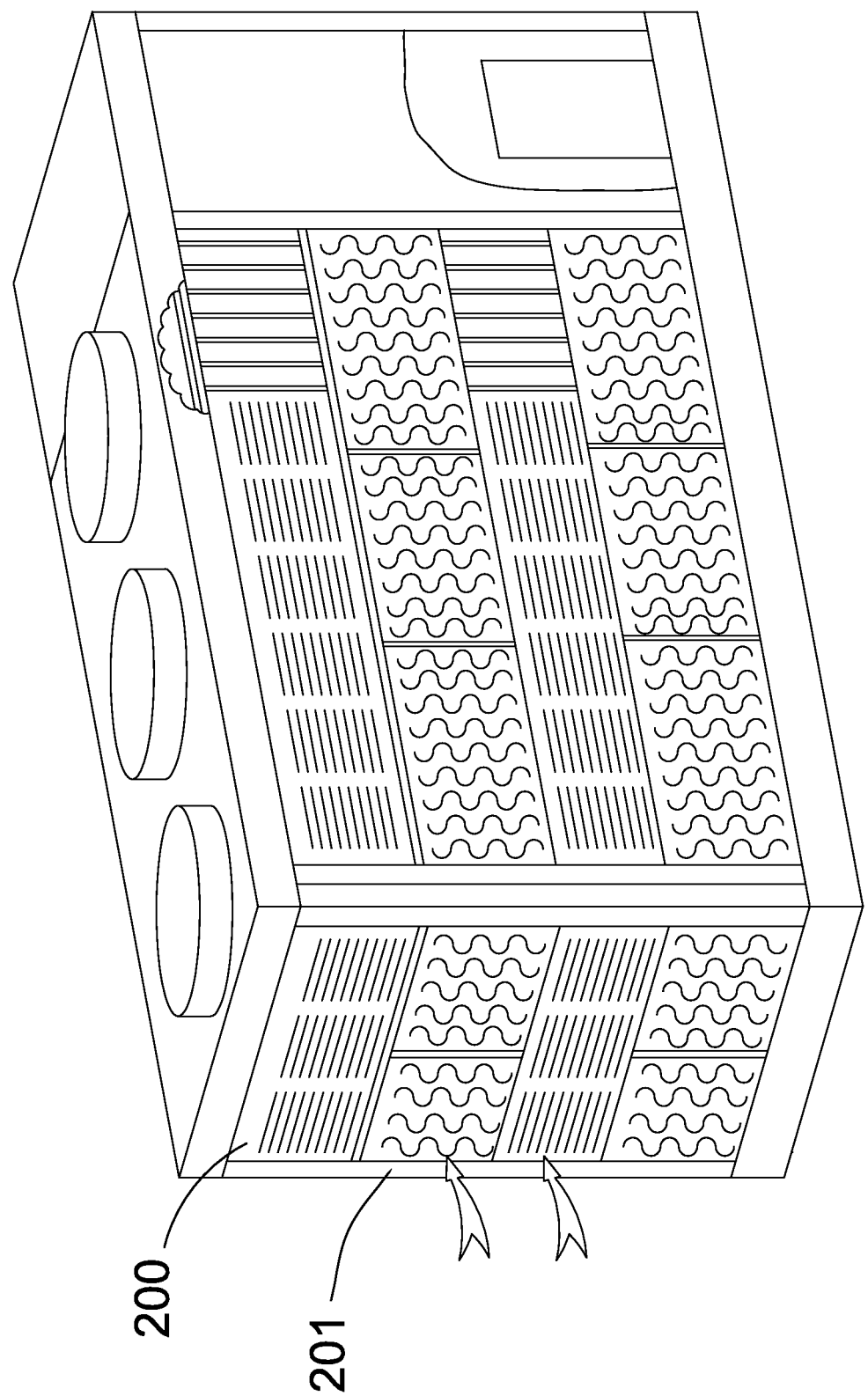
FIG. 3 is a perspective view of a multiple-effect evaporative condenser according to a preferred embodiment of the present invention.

The first water collection basin 21B is mounted in the tower housing 200 (as shown in FIG. 3) for collecting the cooling water 1 pumped from the pumping device 10. On the other hand, the first cooling unit 24B comprises a plurality of heat exchanging pipes 240B and a first fill material unit 245B, wherein the cooling water 1 collected in the first water collection basin 21B is arranged to flow through exterior surfaces of the heat exchanging pipes 240B and the first fill material unit 245B.

On the other hand, the second cooling unit 25B comprises a plurality of heat exchanging pipes 240B and a predetermined amount of second fill material unit 255B, wherein the cooling water 1 passing through the first fill material unit 245B is arranged to flow through exterior surfaces of the heat exchanging pipes of the second cooling unit 25B, and the second fill material unit 255B.

The second water collection basin 22B is positioned underneath the second cooling unit 25B for collecting the cooling water 1 flowing from the second cooling unit 25B, wherein the cooling water 1 collected in the second water collection basin 22B is arranged to be pumped back to the first water collection basin 21B by the pumping device 10, wherein the refrigerant 3 is arranged to flow through the heat exchanging pipes of the first cooling unit 24B and the second cooling unit 25B in such a manner and flow sequence that the refrigerant 3 is arranged to perform heat exchange with the cooling water 1 flowing through the multiple effect evaporative condenser 100B for lowering a temperature of the refrigerant 3, wherein the predetermined amount of air is sucked into the tower housing 200 (as shown in FIG. 3) through the air inlet 201B for performing heat exchange with the cooling water 1 flowing through the first cooling unit 24B and the second cooling unit 25B for lowering a temperature of the cooling water 1, wherein the air having absorbed the heat from the cooling water 1 is discharged out of the multiple effect evaporative condenser 100B through the air outlet 202B.

The first water collection basin 21B has a first bottom tank panel 211B, a first side tank panel 212B, a plurality of through first passage holes 213B formed on the bottom tank panel 211 B, wherein the cooling water 1 is arranged to be pumped into the first water collection basin 21 B and reach the first cooling unit 24B through the first passage holes 213B.

As shown in FIG. 19 to FIG. 20 of the drawings, the heat exchanging pipes 240B of the first cooling unit 24B and the second cooling unit 25B are spacedly extended in the tower housing 200 (as shown in FIG. 3). Moreover, the first cooling unit 24B further comprises a first refrigerant inlet pipe 248B connected to the heat exchanger 30 (as shown in FIG. 8), and a first refrigerant outlet pipe 249B, wherein the corresponding heat exchanging pipes 240B are extended between the first refrigerant inlet pipe 248B and the first refrigerant outlet pipe 249B. Similarly, the second cooling unit 25B further comprises a second refrigerant inlet pipe 258A connected to the heat exchanger 30 (as shown in FIG. 8), and a second refrigerant outlet pipe 259A, wherein the corresponding heat exchanging pipes 240B are extended between the second refrigerant inlet pipe 258B and the second refrigerant outlet pipe 259B.

The refrigerant 3 leaving the compressor 40 (as shown in FIG. 8) first enters the first refrigerant inlet pipe 248A, which is connected to the heat exchanging pipes 240B (i.e. the first through fifth heat exchanging pipes 241B, 242B, 243B, 244B, 245B as shown in FIG. 20) of the first cooling unit 24B. As shown in FIG. 20 of the drawings, the refrigerant 3 is then guided to flow into the first heat exchanging pipe 241 B and the second heat exchanging pipe 242B and reaches the first refrigerant outlet pipe 249B, which collects the refrigerant 3 from the first heat exchanging pipe 241B and the second heat exchanging pipe 242B.

The refrigerant 3 is then guided to flow into the third heat exchange pipe 243B and the fourth heat exchanging pipe 244B and reaches the first refrigerant inlet pipe 248B. The refrigerant 3 flowing through the third heat exchange pipe 243C and the fourth heat exchanging pipe 244B is then collected at the first refrigerant inlet pipe 248B and guided to flow into the fifth heat exchanging pipe 245B. The refrigerant 3 flowing through the fifth heat exchanging pipe 245B is then collected at the first refrigerant outlet pipe 249B, and the refrigerant is guided to flow out of the first cooling unit 24B.

It is worth mentioning that each of the first refrigerant inlet pipe 248B and the first refrigerant outlet pipe 249B comprises a blocking member 2481B, 2491B mounted therein for guiding the refrigerant 3 sequentially flowing in the path described above.

In other words, the refrigerant 3 entering the first cooling unit 24B first enters the first refrigerant inlet pipe 248B and hits the blocking member 2481B provided therein. The refrigerant 3 hitting the blocking member 2481 B is guided to flow into the first heat exchanging pipe 241B and the second heat exchanging pipe 242B and reaches the first refrigerant outlet pipe 249B. The refrigerant 3 reaching the first refrigerant outlet pipe 249B is arranged to hit the blocking member 2491B provided therein and is guided to flow into the third heat exchanging pipe 243B and the fourth heat exchanging pipe 244B and reaches the first refrigerant inlet pipe 248A. The refrigerant 3 reaching the first refrigerant inlet pipe 248A is blocked by the blocking member 2481B and prevented from going back to the first heat exchanging pipe 241B and the second heat exchanging pipe 242B. The refrigerant 3 is then guided to flow into the fifth heat exchanging pipe 245B. The refrigerant 3 flowing through the fifth heat exchanging pipe 245B is prevented from flowing back into the fourth heat exchanging pipe 244B and the third heat exchanging pipe 243B by the blocking member 2491B of the first refrigerant outlet pipe 249B.

Also referring to FIG. 19 to FIG. 20 of the drawings, the refrigerant 3 leaving the first cooling unit 24B flows out of the multiple effect evaporative condenser 100B. On the other hand, refrigerant 3 from the compressor 40 (as shown in FIG. 8) or other like component of the air conditioning system is also guided to enter the second cooling unit 25B. The refrigerant 3 is guided to flow into the second refrigerant inlet pipe 258B, and then is guided to flow into the sixth heat exchanging pipe 251B and the seventh heat exchanging pipe 252B and reaches the second refrigerant outlet pipe 259B, which collects the refrigerant 3 from the sixth heat exchanging pipe 251B and the seventh heat exchanging pipe 252B.

Moreover, the refrigerant 3 is then guided to flow into the eighth heat exchange pipe 253B and the ninth heat exchanging pipe 254B and reaches the second refrigerant inlet pipe 258B. The refrigerant 3 flowing through the eighth heat exchange pipe 253B and the ninth heat exchanging pipe 254B is then collected at the second refrigerant inlet pipe 258B and guided to flow into the tenth heat exchanging pipe 255B. The refrigerant 3 flowing through the tenth heat exchanging pipe 255B is then collected at the second refrigerant outlet pipe 259B, and the refrigerant is guided to flow out of the second cooling unit 25B.

It is worth mentioning that each of the second refrigerant inlet pipe 258B and the second refrigerant outlet pipe 259B comprises a blocking member 2581B, 2591B mounted therein for guiding the refrigerant 3 sequentially flowing in the path described above.

In other words, the refrigerant 3 entering the second cooling unit 25B first enters the second refrigerant inlet pipe 258B and hits the blocking member 2581B provided therein. The refrigerant 3 hitting the blocking member 2581B is guided to flow into the sixth heat exchanging pipe 251B and the seventh heat exchanging pipe 252B, and reaches the second refrigerant outlet pipe 259B. The refrigerant 3 reaching the second refrigerant outlet pipe 259B is arranged to hit the blocking member 2591B provided therein and is guided to flow into the eighth heat exchanging pipe 253B and the ninth heat exchanging pipe 254B and reaches the second refrigerant inlet pipe 258B. The refrigerant 3 reaching the second refrigerant inlet pipe 258B is blocked by the blocking member 2581B and prevented from going back to the sixth heat exchanging pipe 251B and the seventh heat exchanging pipe 252B. The refrigerant 3 is then guided to flow into the tenth heat exchanging pipe 255B. The refrigerant 3 flowing through the tenth heat exchanging pipe 255B is prevented from flowing back into the eighth heat exchanging pipe 253B and the ninth heat exchanging pipe 254B by the blocking member 2591B of the second refrigerant outlet pipe 259B.

Figure 22:
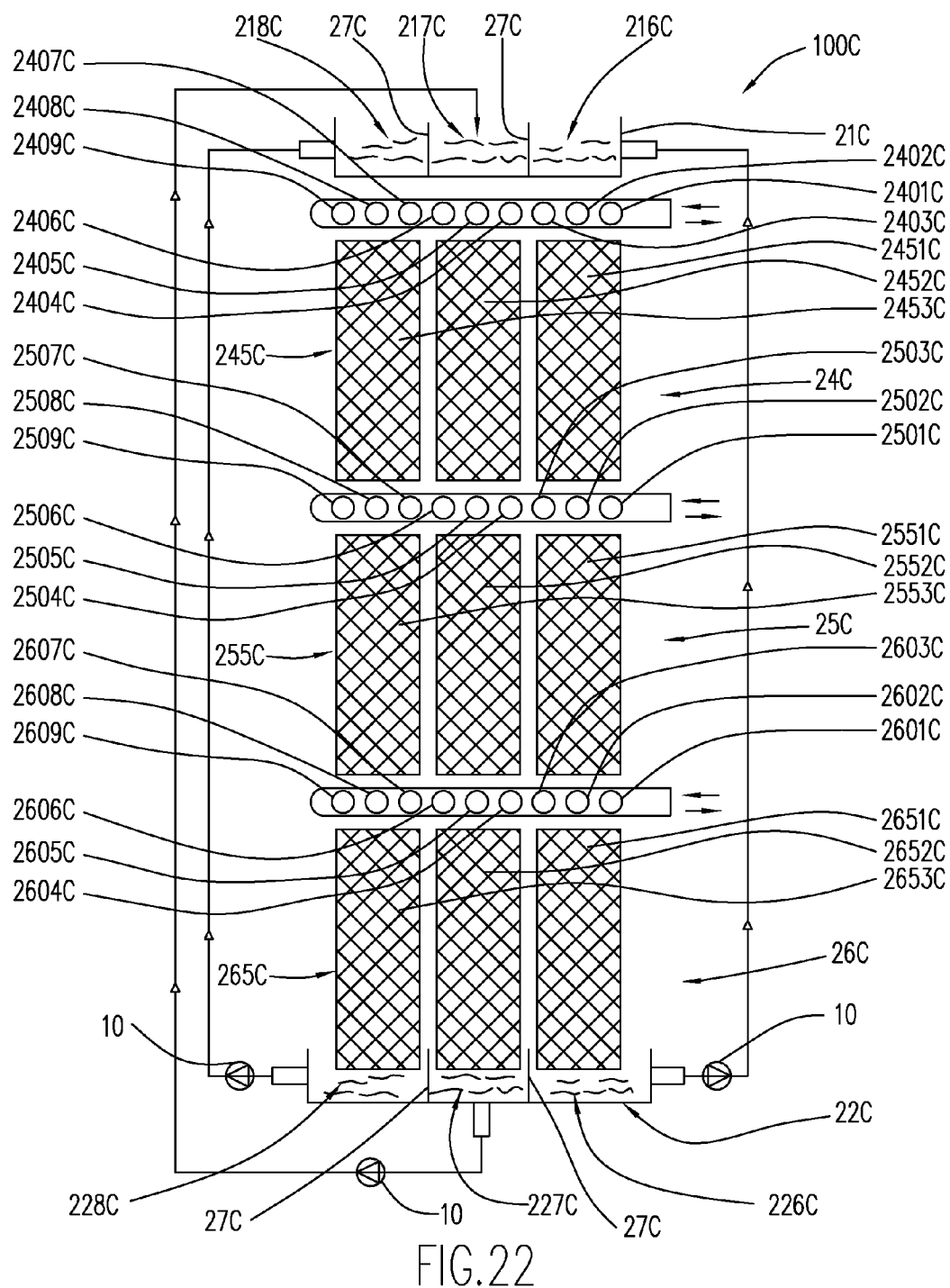
FIG. 22 is a fifth alternative mode of the multiple-effect evaporative condenser according to the above preferred embodiment of the present invention.
Figure 23:
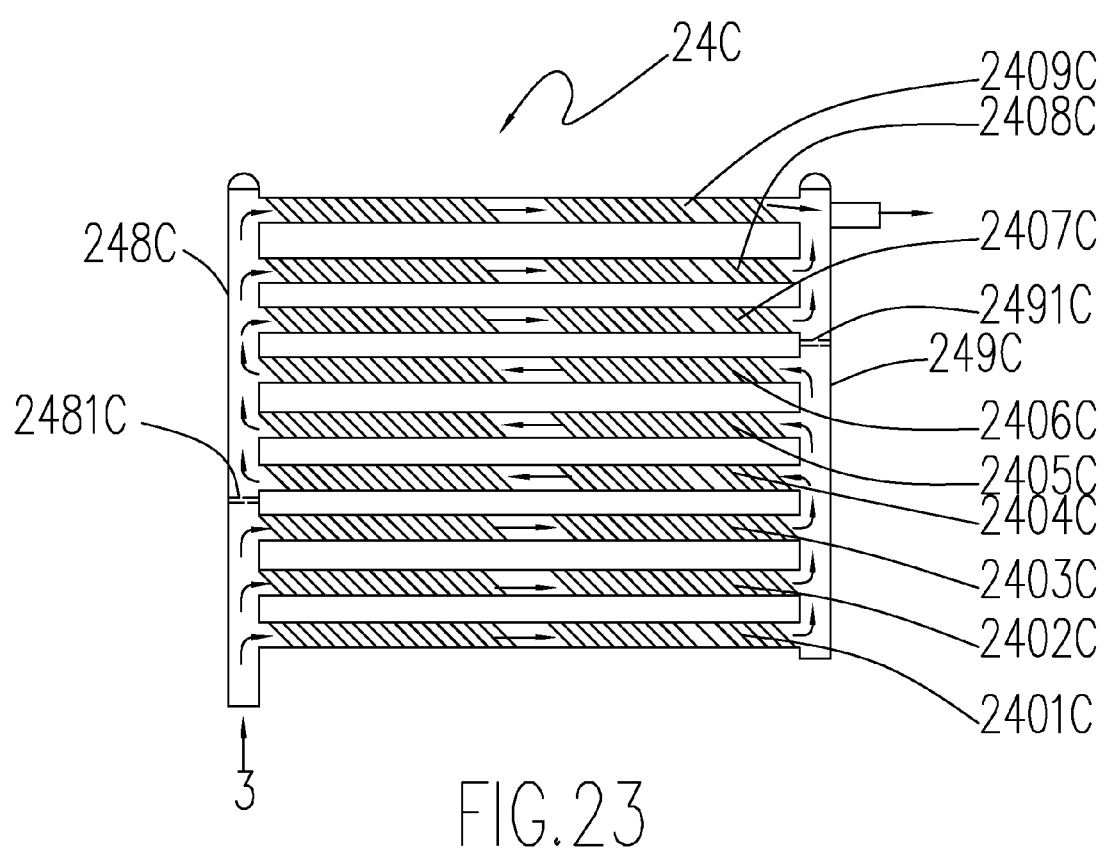
FIG. 23 is a fifth alternative mode of the multiple-effect evaporative condenser according to the above preferred embodiment of the present invention, illustrating the flow path of the refrigerant in the first cooling unit.

As shown in FIG. 22 to FIG. 23 of the drawings, a fifth alternative mode of the multiple effect evaporative condenser according to the preferred embodiment of the present invention is illustrated. The fifth alternative mode is similar to the above described alternative modes. According to the fifth alternative mode, the multiple effect evaporative condenser comprises a first cooling unit 24C, the second cooling unit 25C and a third cooling unit 26C.

Moreover, the multiple-effect evaporative condenser 100C comprises three pumping devices 10, a first water collection basin 21 C, a second water collection basin 22C, and a plurality of basin partitioning plates 27C provided in the first water collection basin 21 C and the second water collection basin 22C respectively.

The basin partitioning plates 27C spacedly provided in the first water collection basin 21C divide the first water collection basin 21C into first through third water collection compartments 216C, 217C, 218C. Similarly, the basin partitioning plates 27C provided in the second water collection basin 22C divide the second water collection basin 22C into fourth through sixth water collection compartment 226C, 227C, 228C.

In this fifth alternative mode, the first cooling unit 24C comprises a first fill material unit 245C which comprises first through third fill material pack 2451 C, 2452C, 2453C. The second cooling unit 25C comprises a second fill material unit 255C which comprises fourth through sixth fill material pack 2551 C, 2552C, 2553C. The third cooling unit 26C comprises a third fill material unit 265C which comprises seventh through ninth fill material pack 2651 C, 2652C, 2653C.

The cooling water 1 is first collected at the first water collection basin 21 C, which are partitioned into first through third water collection compartments 216C, 217C, 218C. The cooling water 1 collected in the first water collection compartment 216C is arranged to flow through the first cooling unit 24C, the second cooling unit 25C, the third cooling unit 26C and is finally collected in the fourth water collection compartment 226C of the second water collection basin 22C. Similarly, the cooling water 1 collected in the second water collection compartment 217C is arranged to flow through the first cooling unit 24C, the second cooling unit 25C, the third cooling unit 26C and is finally collected in the fifth water collection compartment 227C of the second water collection basin 22C. Moreover, the cooling water 1 collected in the third water collection compartment 218C is arranged to flow through the first cooling unit 24C, the second cooling unit 25C, the third cooling unit 26C and is finally collected in the sixth water collection compartment 228C of the second water collection basin 22C.

As shown in FIG. 22 of the drawings, each of the pumping devices 10 is arranged to pump the cooling water 1 circulating between two corresponding water collection compartments of the first water collection basin 21 C and the second water collection basin 22C.

The first cooling unit 24 comprises nine heat exchanging pipes 240C (i.e. the first through ninth heat exchanging pipe 2401C, 2402C, 2403C, 2404C, 2405C, 2406C, 2407C, 2408C, 2409C), wherein the cooling water 1 collected at the first water collection compartment 216C is arranged to flow through, sequentially, the first through third heat exchanging pipe 2401 C, 2402C, 2403C, the first fill material pack 2451 C, tenth through twelfth heat exchanging pipe 2501C, 2502C, 2503C, the fourth fill material pack 2551C, nineteenth through twenty first heat exchanging pipe 2601 C, 2602C, 2603C and the fourth water collection compartment 226C.

Similarly, the cooling water 1 collected at the second water collection compartment 217C is arranged to flow through, sequentially, the fourth through sixth heat exchanging pipe 2404C, 2405C, 2406C, the second fill material pack 2452C, thirteenth through fifteenth heat exchanging pipe 2504C, 2505C, 2506C, the fifth fill material pack 2552C, twenty second through twenty fourth heat exchanging pipe 2604C, 2605C, 2606C and the fifth water collection compartment 227C.

Furthermore, the cooling water 1 collected at the third water collection compartment 218C is arranged to flow through, sequentially, the seventh through ninth heat exchanging pipe 2407C, 2408C, 2409C, the third fill material pack 2453C, sixteenth through eighteenth heat exchanging pipe 2507C, 2508C, 2509C, the sixth fill material pack 2553C, twenty fifth through twenty seventh heat exchanging pipe 2607C, 2608C, 2609C and the sixth water collection compartment 228C.

As shown in FIG. 23 of the drawings, the first cooling unit 24C further comprises a first refrigerant inlet pipe 248C connected to the heat exchanger 30 (as shown in FIG. 8), and a first refrigerant outlet pipe 249C, wherein the corresponding heat exchanging pipes (first through ninth heat exchanging pipes 2401C, 2402C, 2403C, 2404C, 2405C, 2406C, 2407C, 2408C, 2409C) are extended between the first refrigerant inlet pipe 248C and the first refrigerant outlet pipe 249C.

Figure 24:
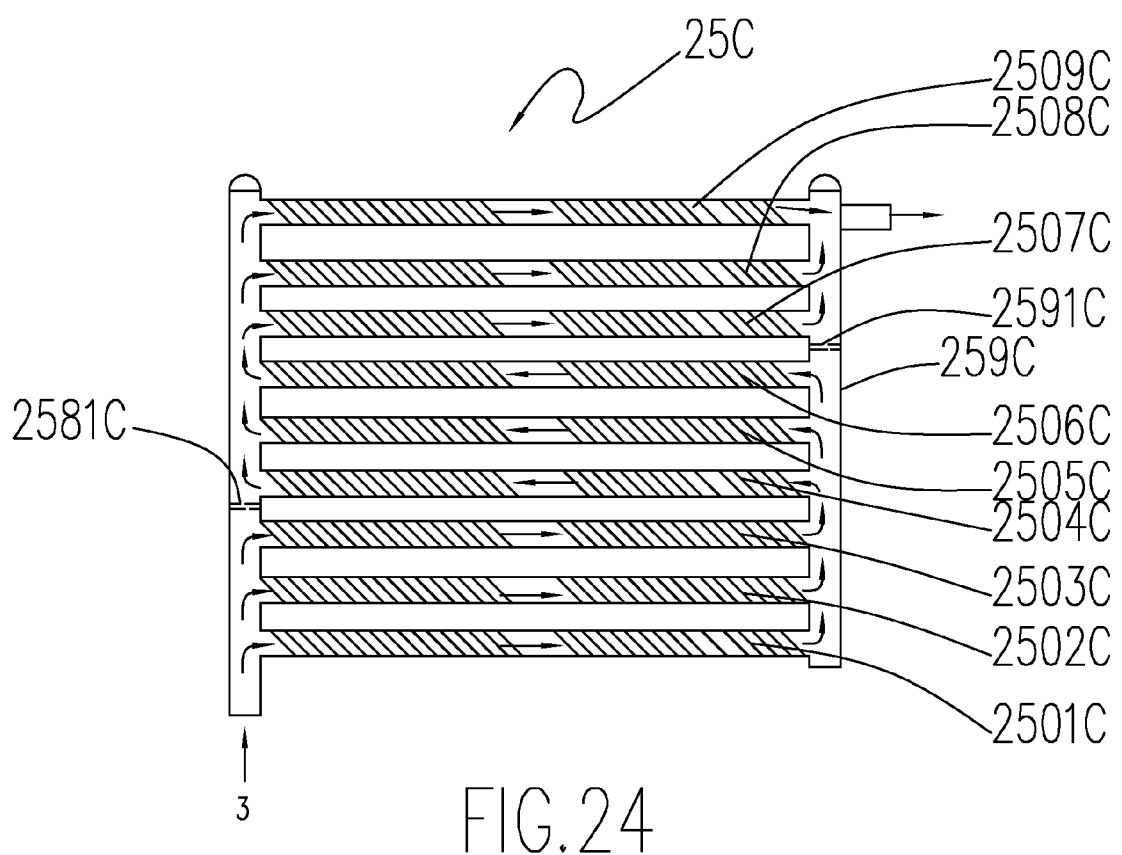
FIG. 24 is a fifth alternative mode of the multiple-effect evaporative condenser according to the above preferred embodiment of the present invention, illustrating the flow path of the refrigerant in the second cooling unit.

Similarly, as shown in FIG. 24 of the drawings, the second cooling unit 25C further comprises a second refrigerant inlet pipe 258C connected to the heat exchanger 30, and a second refrigerant outlet pipe 259C, wherein the corresponding heat exchanging pipes (tenth heat through eighteenth heat exchanging pipe 2501C, 2502C, 2503C, 2504C, 2505C, 2506C, 2507C, 2508C, 2509C) are extended between the second refrigerant inlet pipe 258C and the second refrigerant outlet pipe 259C.

Figure 25:
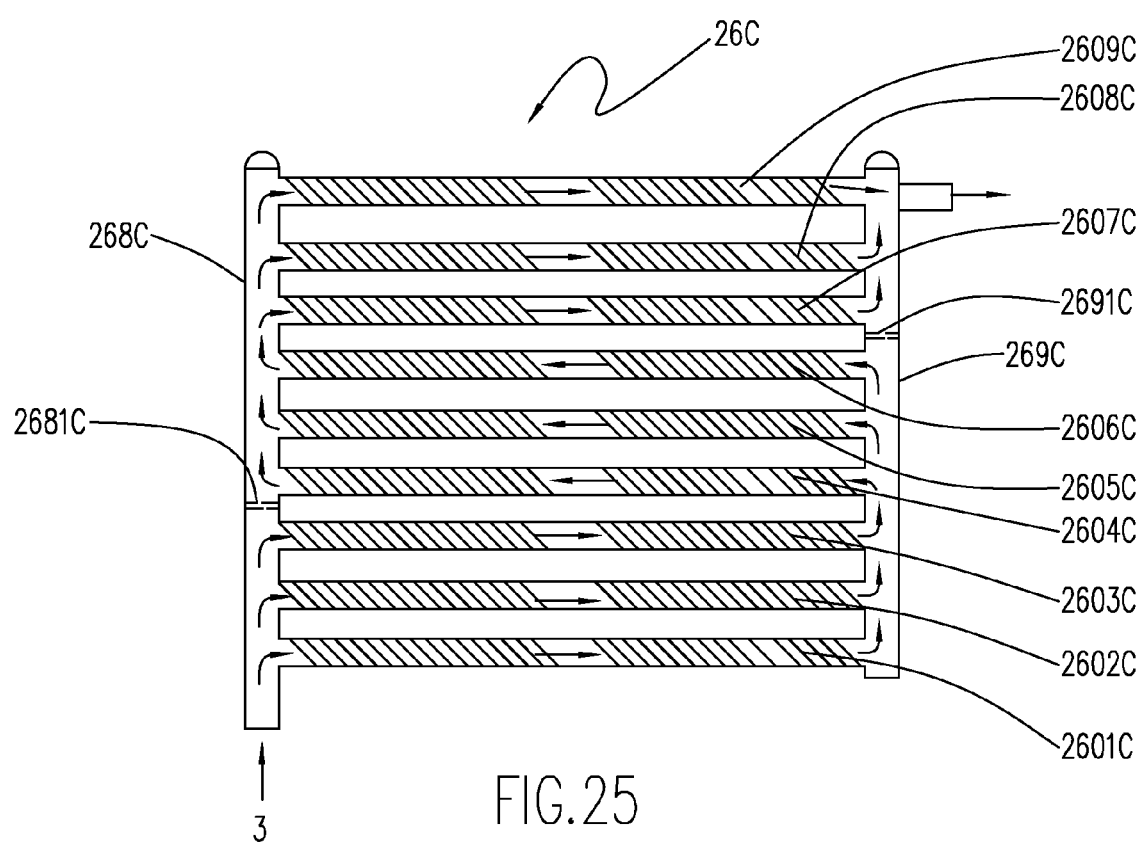
FIG. 25 is a fifth alternative mode of the multiple-effect evaporative condenser according to the above preferred embodiment of the present invention, illustrating the flow path of the refrigerant in the third cooling unit.
Figure 26A:
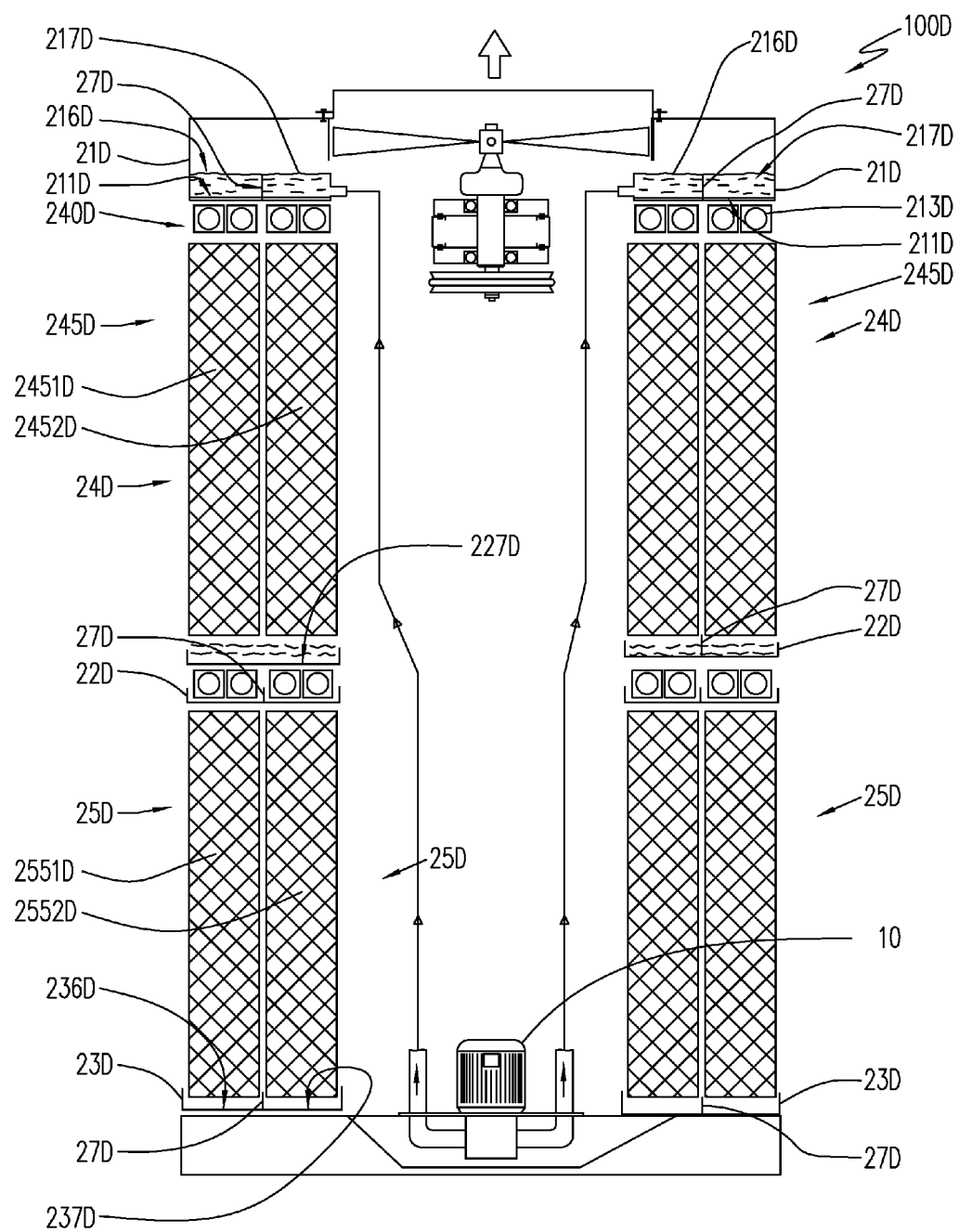
FIG. 26A to FIG. 26C are schematic diagrams of a sixth alternative mode of the multiple-effect evaporative condenser according to the above preferred embodiment of the present invention.
Figure 26B:
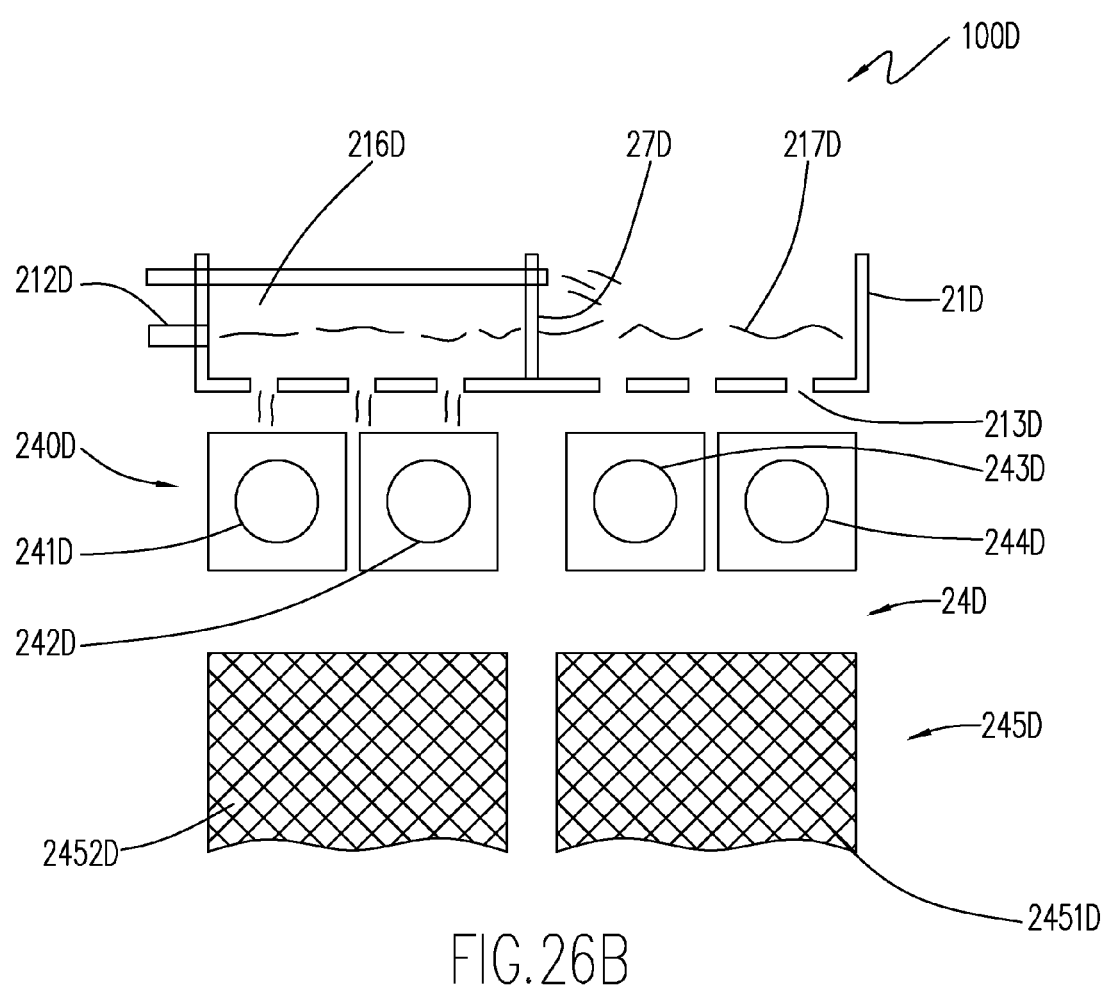
Figure 26C:
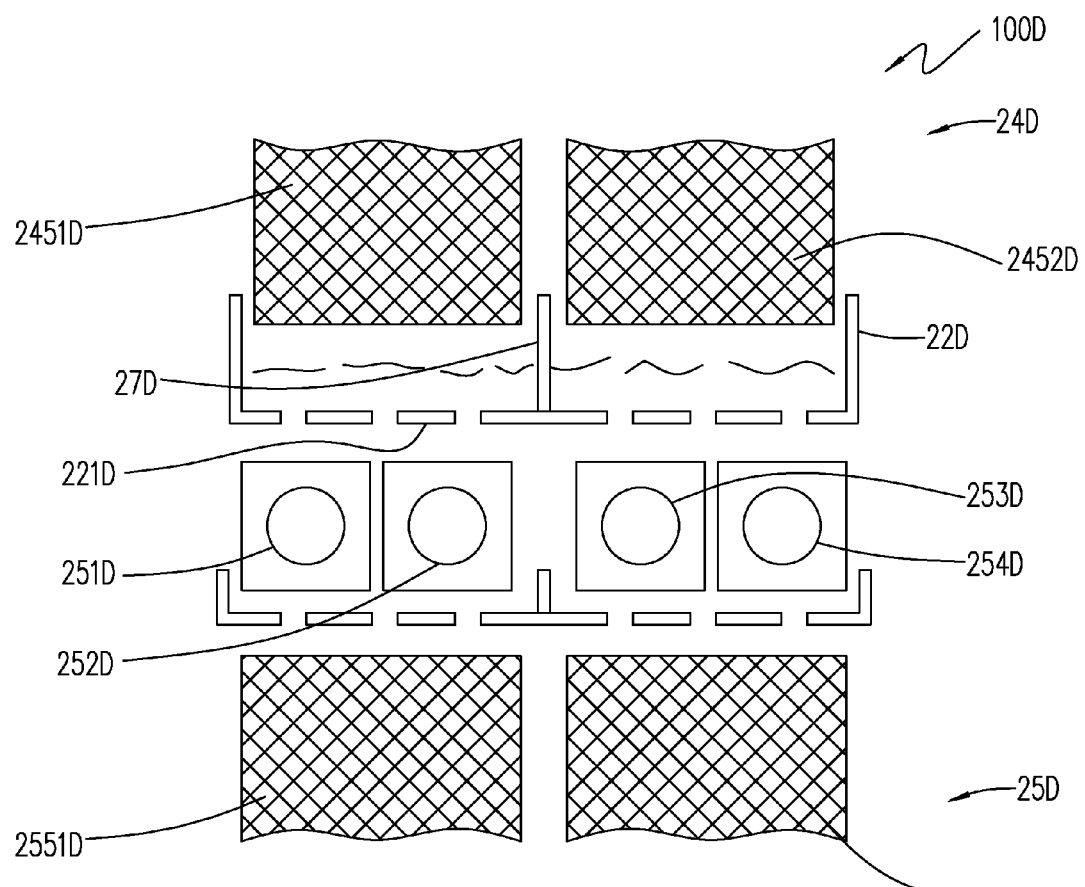

Furthermore, as shown in FIG. 25 of the drawings, the third cooling unit 26C further comprises a second refrigerant inlet pipe 268C connected also to the heat exchanger 30, and a second refrigerant outlet pipe 269C, wherein the corresponding heat exchanging pipes (nineteenth through twenty seventh heat exchanging pipe (2601C, 2602C, 2603C, 2604C, 2605C, 2606C, 2607C, 2608C, 2609C) are extended between the third refrigerant inlet pipe 268C and the third refrigerant outlet pipe 269C.

As shown in FIG. 23 of the drawings, each of the first refrigerant inlet pipe 248C and the first refrigerant outlet pipe 249C comprises a blocking member 2481B, 2491B mounted therein for guiding the refrigerant 3 sequentially flowing in the path described below.

In other words, the refrigerant 3 from the heat exchanger 30 entering the first cooling unit 24C first enters the first refrigerant inlet pipe 248C and hits the blocking member 2481C provided therein. The refrigerant 3 hitting the blocking member 2481C is guided to flow into the first heat exchanging pipe 2401C, the second heat exchanging pipe 2402C and the third heat exchanging pipe 2403C and reaches the first refrigerant outlet pipe 249C. The refrigerant 3 reaching the first refrigerant outlet pipe 249C is arranged to hit the blocking member 2491B provided therein and is guided to flow into the fourth heat exchanging pipe 2404C, the fifth heat exchanging pipe 2405C and the sixth heat exchanging pipe 2406C and reaches the first refrigerant inlet pipe 248C. The refrigerant 3 reaching the first refrigerant inlet pipe 248C is blocked by the blocking member 2481 C and the refrigerant 3 is prevented from going back to the first through third heat exchanging pipe 2401C, 2402C, 2403C. The refrigerant 3 is then guided to flow into the seventh heat exchanging pipe 2407C, the eighth heat exchanging pipe 2408C, and the ninth heat exchanging pipe 2409C and the first refrigerant outlet pipe 249C. The refrigerant 3 is then arranged to leave the first cooling unit 24C and flow back to the heat exchanger 30.

As shown in FIG. 24 of the drawings, each of the second refrigerant inlet pipe 258C and the second refrigerant outlet pipe 259C comprises a blocking member 2581C, 2591C mounted therein for guiding the refrigerant 3 sequentially flowing in the path described below.

In other words, the refrigerant 3 from the heat exchanger 30 (as shown in FIG. 8) enters the second refrigerant inlet pipe 258C, and the refrigerant 3 entering the second cooling unit 25C first enters the second refrigerant inlet pipe 258C and hits the blocking member 2581C provided therein. The refrigerant 3 hitting the blocking member 2581C is guided to flow into the tenth heat exchanging pipe 2501 C, the eleventh heat exchanging pipe 2502C and the twelfth heat exchanging pipe 2503C and reaches the second refrigerant outlet pipe 259C. The refrigerant 3 reaching the second refrigerant outlet pipe 259C is arranged to hit the blocking member 2591B provided therein and is guided to flow into the thirteenth heat exchanging pipe 2504C, the fourteenth heat exchanging pipe 2505C and the fifteenth heat exchanging pipe 2506C and reaches the second refrigerant inlet pipe 258C. The refrigerant 3 reaching the second refrigerant inlet pipe 258C is blocked by the blocking member 2581 C and the refrigerant 3 is prevented from going back to the tenth heat exchanging pipe 2501C, the eleventh heat exchanging pipe 2502C and the twelfth heat exchanging pipe 2503C. The refrigerant 3 is then guided to flow into the sixteenth heat exchanging pipe 2507C, the seventeenth heat exchanging pipe 2508C, and the eighteenth heat exchanging pipe 2509C and the second refrigerant outlet pipe 259C. The refrigerant 3 is then arranged to leave the second cooling unit 25C and flow back to the heat exchanger 30.

At the same time, the refrigerant 3 from the heat exchange 30 (as shown in FIG. 8) also enters the third refrigerant inlet pipe 268C of the third cooling unit 26C and hits the blocking member 2681 C provided therein. The refrigerant 3 hitting the blocking member 2581 C is guided to flow into the nineteenth heat exchanging pipe 2601 C, the twentieth heat exchanging pipe 2602C and the twenty first heat exchanging pipe 2603C and reaches the third refrigerant outlet pipe 269C. The refrigerant 3 reaching the third refrigerant outlet pipe 269C is arranged to hit the blocking member 2691B provided therein and is guided to flow into the twenty second heat exchanging pipe 2604C, the twenty third heat exchanging pipe 2605C and the twenty fourth heat exchanging pipe 2606C and reaches the third refrigerant inlet pipe 268C. The refrigerant 3 reaching the third refrigerant inlet pipe 268C is blocked by the blocking member 2681 C and the refrigerant 3 is prevented from going back to the nineteenth heat exchanging pipe 260 I C, the twentieth heat exchanging pipe 2602C and the twenty first heat exchanging pipe 2603C. The refrigerant 3 is then guided to flow into the twenty fifth heat exchanging pipe 2607C, the twenty sixth heat exchanging pipe 2608C, and the twenty seventh heat exchanging pipe 2609C and the third refrigerant outlet pipe 269C. The refrigerant 3 is then arranged to leave the third cooling unit 26C and is guided to flow back to the heat exchanger 30.

Note that the refrigerant 3 described above may come from any other components (not necessarily the heat exchanger 30), as long as heat exchange is necessary to lower the temperature of the refrigerant 3. This is a feature which enables the multiple effect evaporative condenser 100C to be utilized in a wide variety of technical fields (and not only air conditioning system).

Referring to FIG. 26A to FIG. 26C, FIG. 27, and FIG. 28A to FIG. 28C of the drawings, a sixth alternative mode of the multiple effect evaporative condenser 100D according to the above preferred embodiment of the present invention is illustrated. The sixth alternative mode is substantially similar to the preferred embodiment.

FIG. 26 illustrates two multiple effect evaporative condenser 100D and each of the multiple-effect evaporative condenser 100D is served by at least one (preferably two) pumping device 10. In this sixth alternative mode, each of the multiple-effect evaporative condensers 100D comprises a first water collection basin 21D, a first cooling unit 24D, a second cooling unit 25D, a second water collection basin 22D positioned between the first cooling unit 24D and the second cooling unit 25D, a third water collection basin 23D, and a plurality of basin partitioning plates 27D provided on the first water collection basin 21D, the second water collection basin 22D, and the third water collection basin 23D respectively.

The first cooling unit 24D comprise a plurality of heat exchanging pipes 240D and a first fill material unit 245D provided underneath the heat exchanging pipes 240D, wherein the cooling water 1 collected in the first water collection basin 21D is arranged to flow through exterior surfaces of the heat exchanging pipes 240D and then through the first fill material unit 245D.

The basin partitioning plates 27D provided on the first water collection basin 21D divides the first water collection basin 21D into first and second water collection compartments 216D, 217D. Similarly, the basin partitioning plate 27C provided on the second water collection basin 22D divides the second water collection basin 22D into third and fourth water collection compartment 226D, 227D. Moreover, the basin partitioning plate 27D provided on the third water collection basin 23D divides the third water collection basin 23D into fifth and sixth water collection compartment 236D, 237D.

In this sixth alternative mode, the first cooling unit 24D comprises a first fill material unit 245D which comprises first and second fill material pack 2451D, 2452D. The second cooling unit 25D comprises a second fill material unit 255D which comprises third and fourth fill material pack 2551D, 2552D.

The cooling water 1 is first collected at the first water collection basin 21D, which are partitioned into first and second water collection compartment 216D, 217D. The cooling water 1 collected in the first water collection compartment 216D is arranged to flow through the first cooling unit 24D, the third water collection compartment 226D of the second cooling unit 25D, and is finally collected in the fifth water collection compartment 236D of the third water collection basin 23D.

Similarly, the cooling water 1 collected in the second water collection compartment 217D is arranged to flow through the first cooling unit 24D, the fourth water collection compartment 227D of the second cooling unit 25D, and is finally collected in the sixth water collection compartment 237D of the third water collection basin 23D.

The refrigerant 3 is arranged to follow at least one heat exchanging route formed by the heat exchanging pipes 240D of the first cooling unit 24D and the second cooling unit 25D.

The first water collection basin 21D has a first bottom tank panel 211D, a first side tank panel 212D, a plurality of through first passage holes 213D formed in the bottom tank panel 211D, wherein the cooling water 1 is arranged to be pumped into the first water collection basin 21D by the pumping device 10 and reach the first cooling unit 24D through the first passage holes 213D.

On the other hand, the second water collection basin 22D has a second bottom tank panel 221D, a second side tank panel 222D, a plurality of through second passage holes 223D formed on the second bottom tank panel 221D, wherein the cooling water 1 dripping from the first fill material unit 245D in the manner as mentioned above is arranged to be collected at the second water collection basin 22D and reaches the second cooling unit 25D through the second passage holes 223D.

Figure 27:
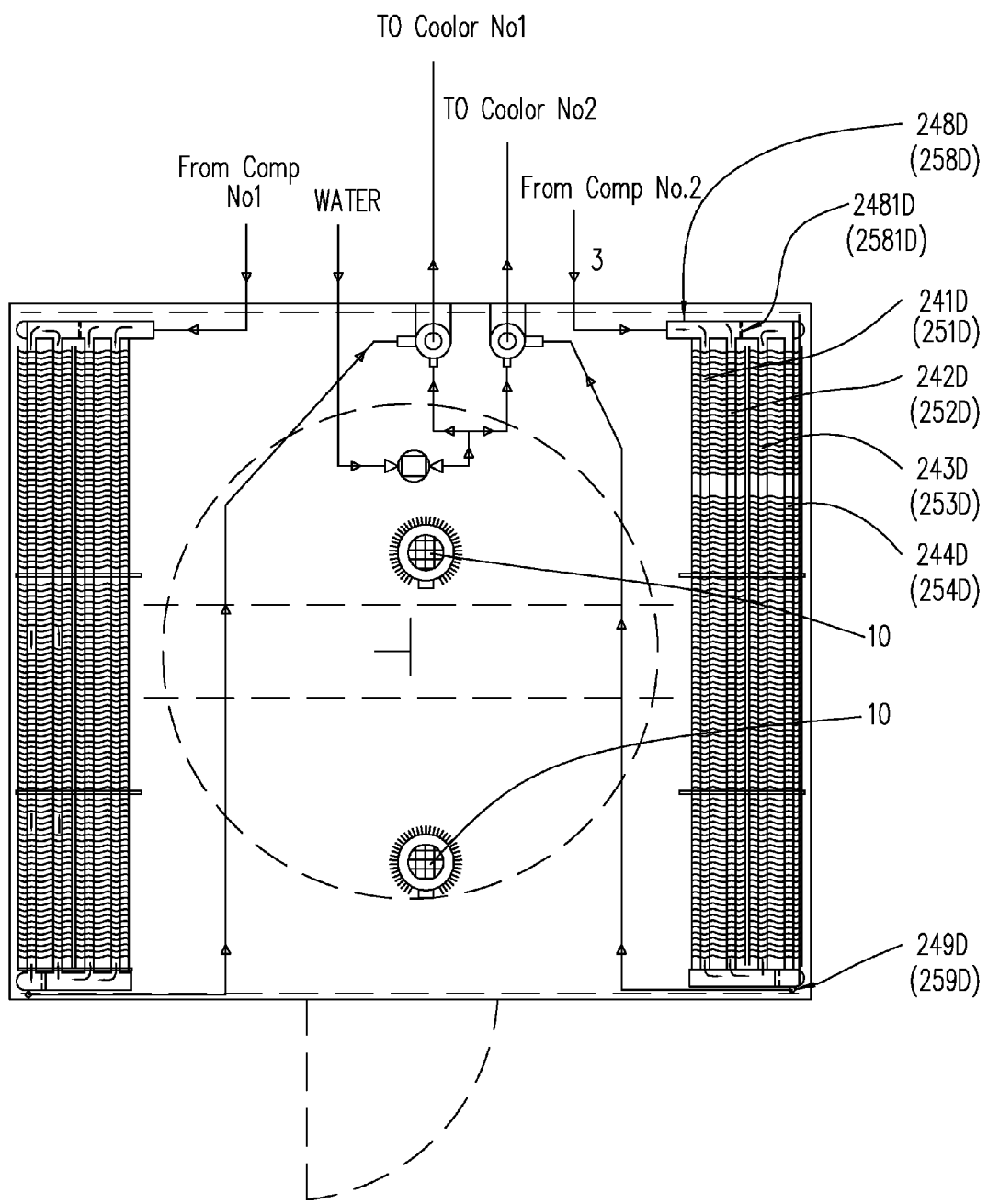
FIG. 27 is a plan view of the multiple-effect evaporative condenser according to the sixth alternative mode of the above preferred embodiment of the present invention.

FIG. 27 illustrates the flow path of the refrigerant 3. The first cooling unit 24D further comprises a first refrigerant inlet pipe 248D connected to the compressor 40 (as shown in FIG. 8), and a first refrigerant transmission pipe 249D, wherein the corresponding heat exchanging pipes (the first through fourth heat exchanging pipes 241D, 242D, 243D, 244D) are extended between the first refrigerant inlet pipe 248D and the first refrigerant transmission pipe 249D.

Similarly, the second cooling unit 25D further comprises a second refrigerant inlet pipe 258D connected to the compressor 40, and a second refrigerant transmission pipe 259D, wherein the corresponding heat exchanging pipes (the fifth through eighth heat exchanging pipe 251 C, 252C, 253C, 254C) are extended between the second refrigerant inlet pipe 258D and the second refrigerant transmission pipe 259D.

As shown in FIG. 27 of the drawings, the first refrigerant inlet pipe 248D comprises a blocking member 2481D mounted therein at a position between the second heat exchanging pipe 242D and the third heat exchanging pipe 243D for guiding the refrigerant 3 sequentially flowing in the path described below.

The refrigerant 3 entering the first cooling unit 24D first enters the first refrigerant inlet pipe 248D and hits the blocking member 2481D provided therein (please referring to the right side of FIG. 27).

The refrigerant 3 hitting the blocking member 2481D is guided to flow into the first heat exchanging pipe 241D and the second heat exchanging pipe 242D, and reaches the first refrigerant transmission pipe 249D. The refrigerant 3 reaching the first refrigerant transmission pipe 249D is arranged to be mixed and guided to flow into the third heat exchanging pipe 243D and the fourth heat exchanging pipe 244D and flow back to the first refrigerant inlet pipe 248D, which is then guided to leave the first cooling unit 24D.

The second refrigerant inlet pipe 258D comprises a blocking member 2581D mounted therein at a position between the sixth heat exchanging pipe 252D and the seventh heat exchanging pipe 253D for guiding the refrigerant 3 sequentially flowing in the path described below (please referring to the left side of FIG. 27).

The refrigerant 3 entering the second cooling unit 25D first enters the second refrigerant inlet pipe 258D and hits the blocking member 2581D provided therein. The refrigerant 3 hitting the blocking member 2581D is guided to flow into the fifth heat exchanging pipe 251D and the sixth heat exchanging pipe 252D and reaches the first refrigerant transmission pipe 259D. The refrigerant 3 reaching the second refrigerant transmission pipe 259D is arranged to be guided to flow into the seventh heat exchanging pipe 253D and the eighth heat exchanging pipe 254D and flow back to the second refrigerant inlet pipe 258D, which is then guided to leave the second cooling unit 25D.

Figure 28A:
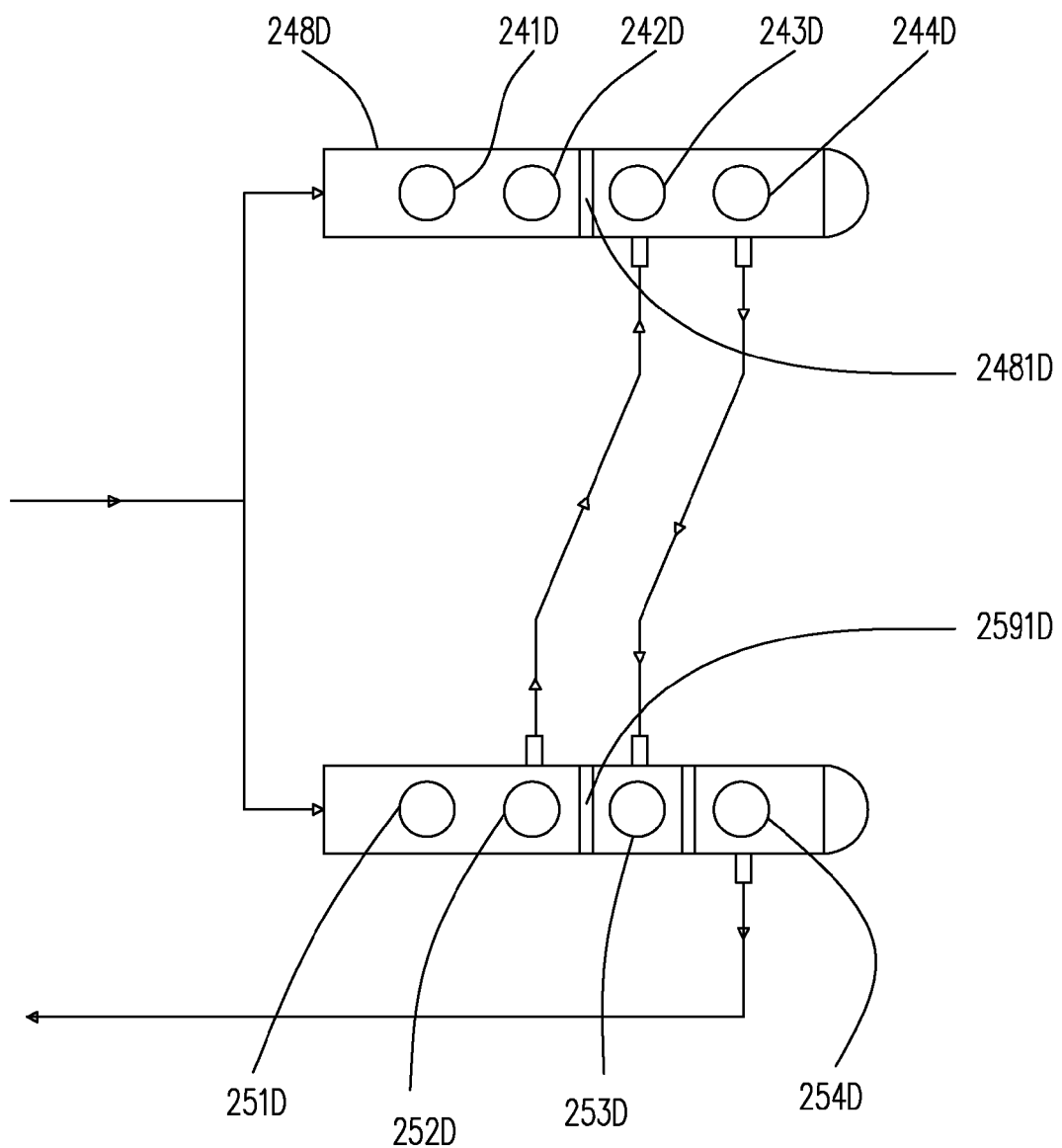
Figure 28B:
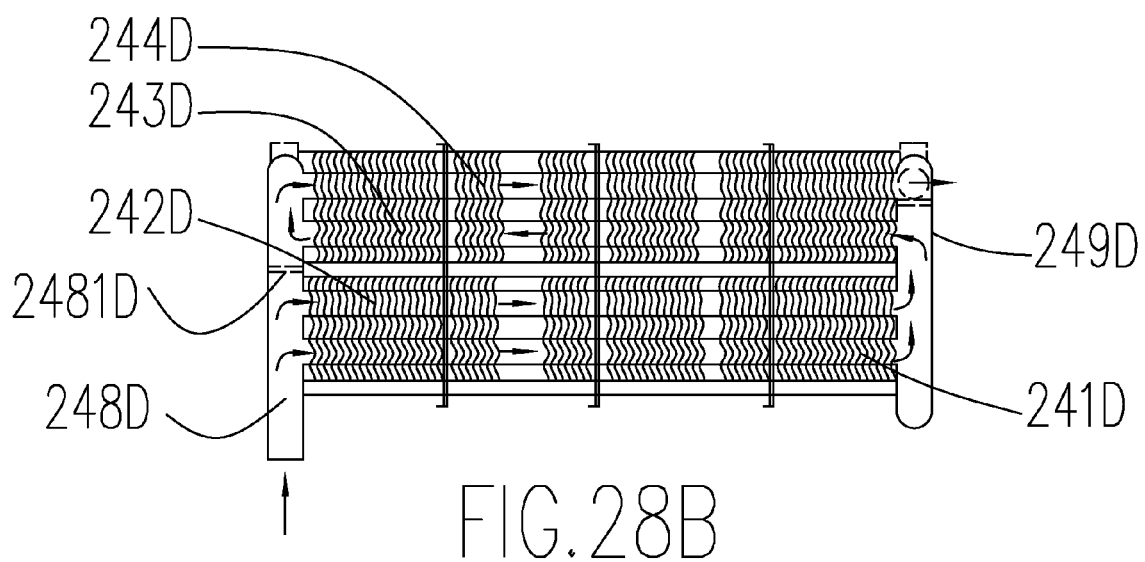
Figure 29:
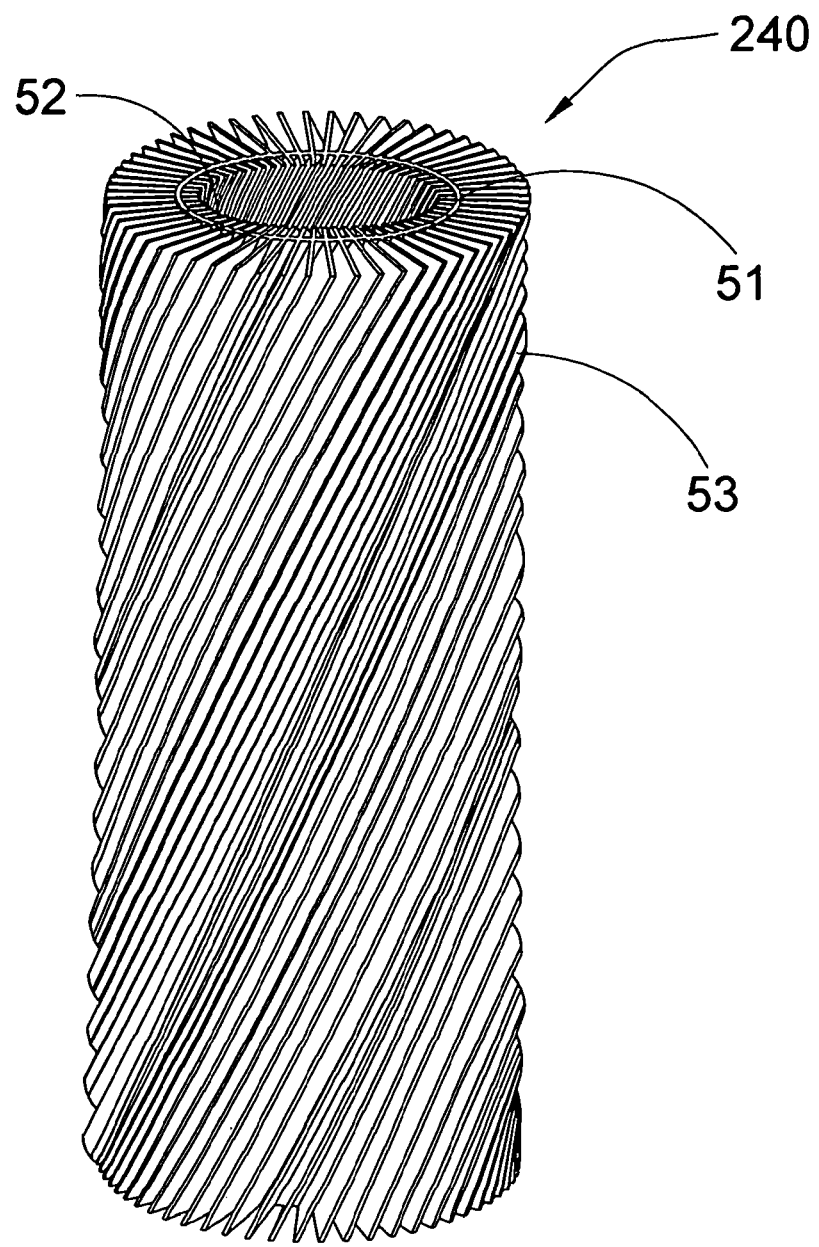
FIG. 29 is a perspective view of a heat exchanging pipe according to the above preferred embodiment of the present invention.

FIG. 28A to FIG. 28C illustrate another flow path of the refrigerant 3. It is important to mention that there exist many flow paths of the refrigerant 3 circulating in the multiple effect evaporative condenser. These are obvious alternatives to the present invention is varying flow paths should also be covered by the scope of the present invention.

Moreover, for the above mentioned multiple effect evaporative condensers, (the preferred embodiment and all of the alternatives thereof) each of the heat exchanging pipes is specifically designed and constructed in a manner described above for achieving the maximum amount of heat transfer efficiency. A preferred embodiment of the heat exchanging pipe will first be discussed and the alternatives are then elaborated.

Figure 32:
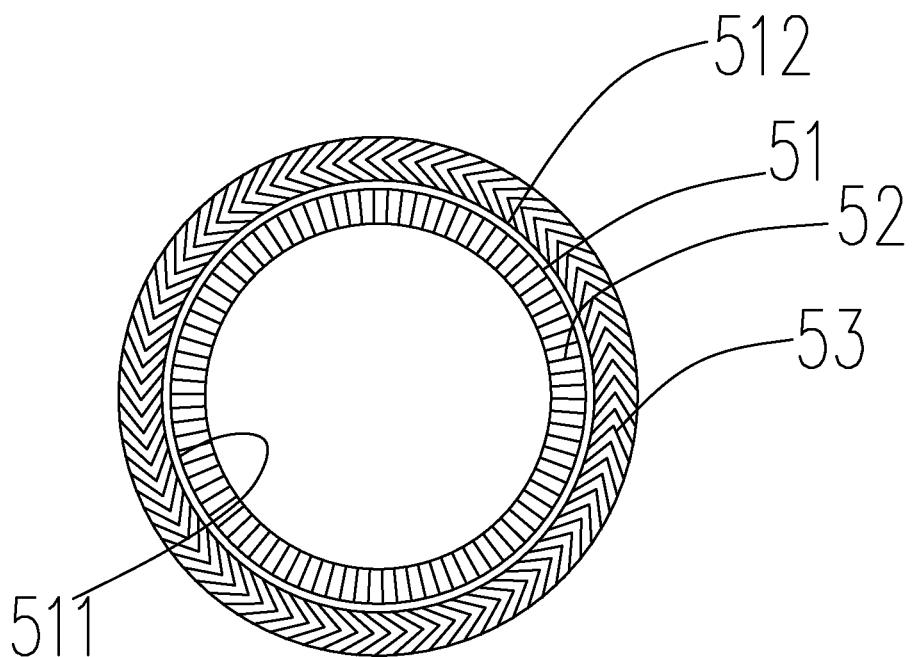
FIG. 32 is a sectional top view of the heat exchanging pipe according to the above preferred embodiment of the present invention, illustrating the sectional side view alone plane 3-3 of FIG. 30.
Figure 33:
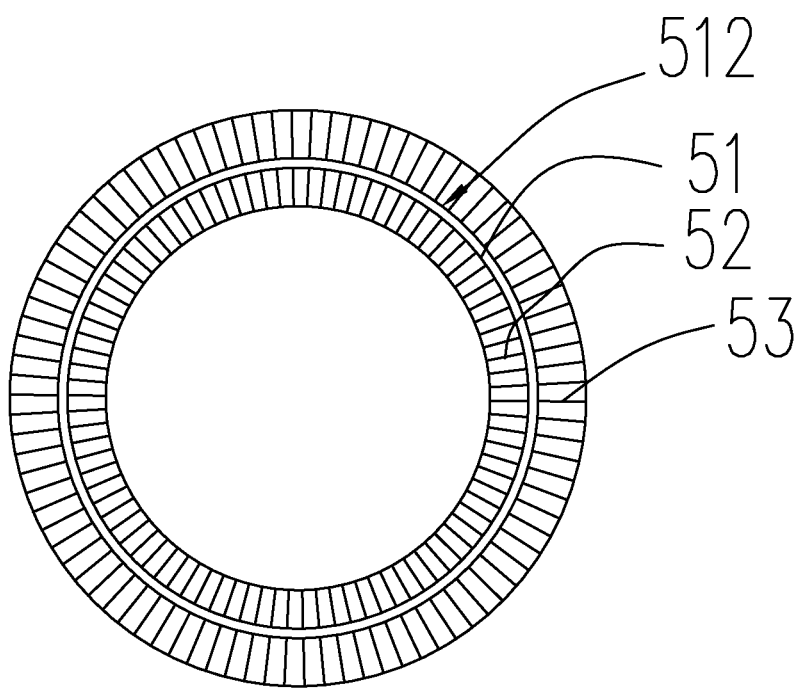
FIG. 33 is a sectional top view of the heat exchanging pipe according to the above preferred embodiment of the present invention, illustrating the inner heat exchanging fins and the outer heat exchanging fins have "I" cross sectional shape.

Referring to FIG. 29 to FIG. 33 of the drawings, a high efficiency heat exchanging pipe 240 according to a preferred embodiment of the present invention is illustrated, in which the heat exchanging pipe 240 comprises a pipe body 51, a plurality of inner heat exchanging fins 52, and a plurality of outer heat exchanging fins 53. (Please note that the dotted lines in FIGS. 32 and 33 illustrate the inner and outer heat exchanging fins 52, 53 extending continuously around the pipe body 51).

The inner heat exchanging fins 52 are spacedly and protrudedly extended along an inner surface 511 of the pipe body 51 in a spiral manner for enhancing heat exchange surface area of the corresponding heat exchanging pipe 240, and for guiding a fluid flow on the inner surface 511 of the corresponding heat exchange pipe 240 along the spiral path of the inner heat exchanging fins 52.

The outer heat exchanging fins 53 are spacedly and protrudedly extended along an outer surface 512 of the pipe body 51 for enhancing heat exchange surface area of the corresponding heat exchanging pipe 240 and for guiding a fluid flow on the outer surface 512 of the corresponding heat exchange pipe 240 along the outer heat exchanging fins 53.

It is important to mention that each of the inner heat exchanging fins 52 and the outer heat exchanging fins 53 can be embodied as having a wide variety of cross sectional shapes so as to optimally enhance a heat exchange surface area of the corresponding heat exchanging pipe 240. For example, the cross sectional shape of each of the inner heat exchanging fins 52 and the outer heat exchanging fins 53 can be embodied as "I" shape, "L" shape, "T" shape, "V" shape, "W" shape, or even "Z" shape. The different cross sectional shapes of the inner heat exchanging fins 52 and the outer heat exchanging fins 53 are further illustrated in FIG. 34A to FIG. 34I.

Figure 34A:
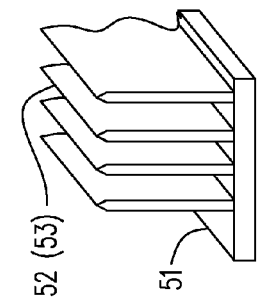
FIG. 34A to 34I illustrate the different cross sectional shapes of the heat exchanging fins according to the above preferred embodiment of the present invention.
Figure 34B:
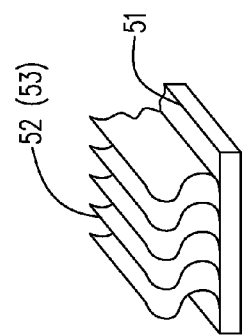
Figure 34C:
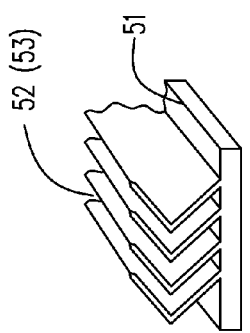
Figure 34D:
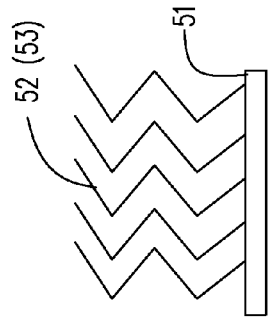
Figure 34E:
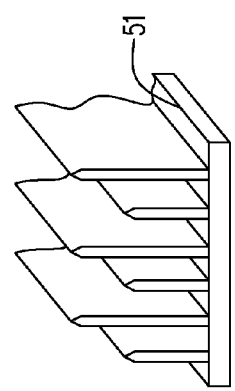
Figure 34F:
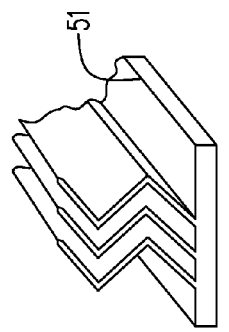
Figure 34G:
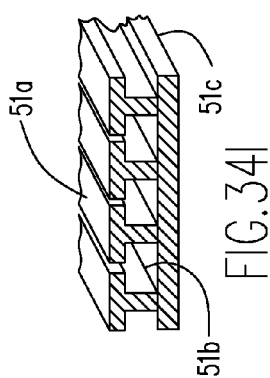
Figure 34H:
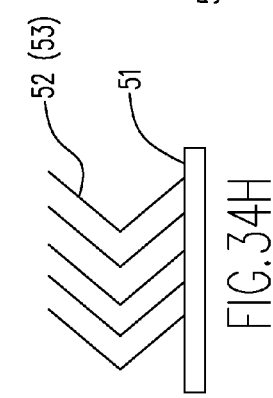
Figure 34I:
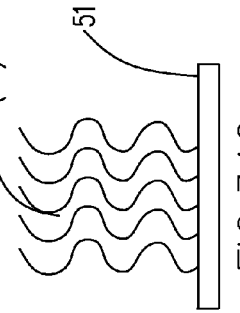

More specifically, FIG. 34A illustrates that each of the inner heat exchanging fins 52 and the outer heat exchanging fins 53 has a "V" cross sectional shape. FIG. 34B illustrates that each of the inner heat exchanging fins 52 and the outer heat exchanging fins 53 has an "S" cross sectional shape. FIG. 34D illustrates that each of the inner heat exchanging fins 52 and the outer heat exchanging fins 53 has a "Z" cross sectional shape. FIG. 34C and FIG. 34E illustrate that each of the inner heat exchanging fins 52 and the outer heat exchanging fins 53 are extended from the corresponding pipe body 51 while an outer end portion of each of these inner heat exchanging fins 52 and the outer heat exchanging fins 53 has a gradually reducing thickness so as to constitute a sharp outer end portion. FIG. 34F illustrates that each of the inner heat exchanging fins 52 and the outer heat exchanging fins 53 has a "w" cross sectional shape. FIG. 34G illustrates that each of the inner heat exchanging fins 52 and the outer heat exchanging fins 53 has a wavy cross sectional shape. FIG. 34H illustrates that each of the inner heat exchanging fins 52 and the outer heat exchanging fins 53 has a "V" cross sectional shape with very small angle of inclination. FIG. 34I illustrates that each of the inner heat exchanging fins 52 and the outer heat exchanging fins 53 has a "T" cross sectional shape.

The performance of heat exchange for a particular heat exchanging pipe 240 is determined by the heat flux density of that heat exchanging pipe 240. The law of heat conduction, generally known as the Fourier's law, states that the time rate of heat transfer through a material is proportional to the negative gradient in the temperature and to the area, at right angles to that gradient, through which the heat is flowing. Thus, in order to maximize the time rate of heat transfer, one has to maximize the area for the corresponding heat exchange process. The different shapes of the inner heat exchanging fins 52 and the outer heat exchanging fins 53 are used for maximizing the surface area through which heat transfer takes place.

Moreover, in order to facilitate easy cleaning of the heat exchanging pipes 240, each of the inner heat exchanging fins 52 and the outer heat exchanging fins 53 are coated with a chemical layer such as a Telfon layer (PTFE) so as to facilitate easy detachment of dirt from the inner and outer heat exchanging fins 52, 53.

Figure 35A:
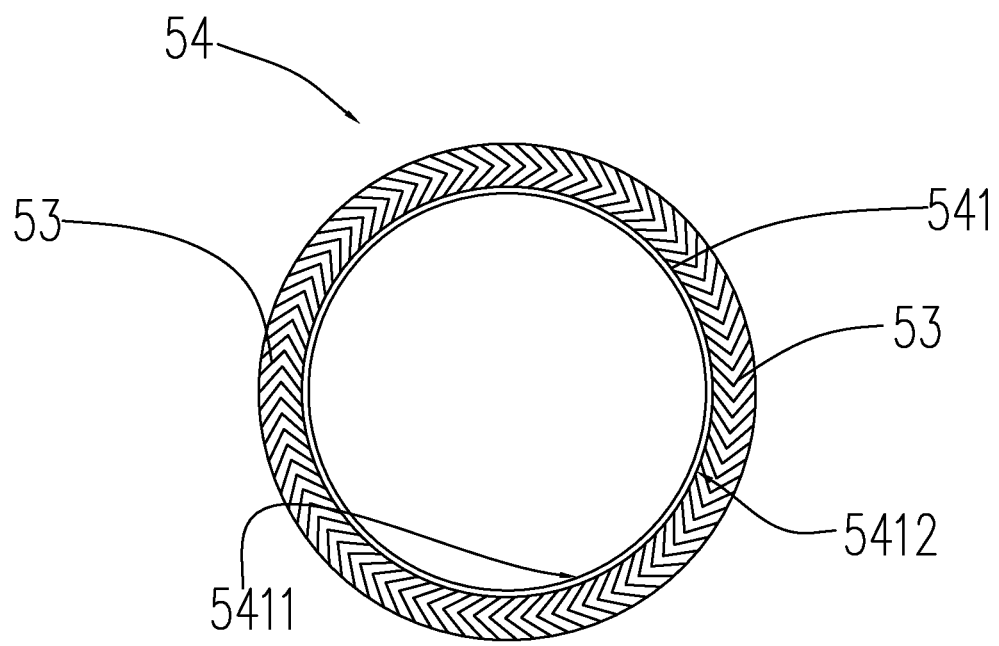
FIG. 35A and FIG. 35B are schematic diagrams of the heat exchanging pipe according to the above preferred embodiment of the present invention, illustrating that the heat exchanging pipe can be used in conjunction with an outer protective pipe.
Figure 35B:
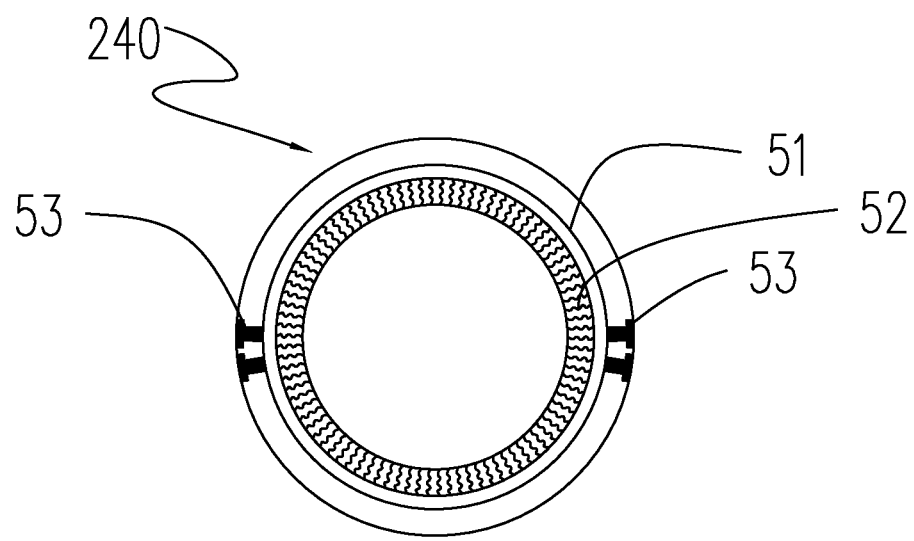
Figure 36:
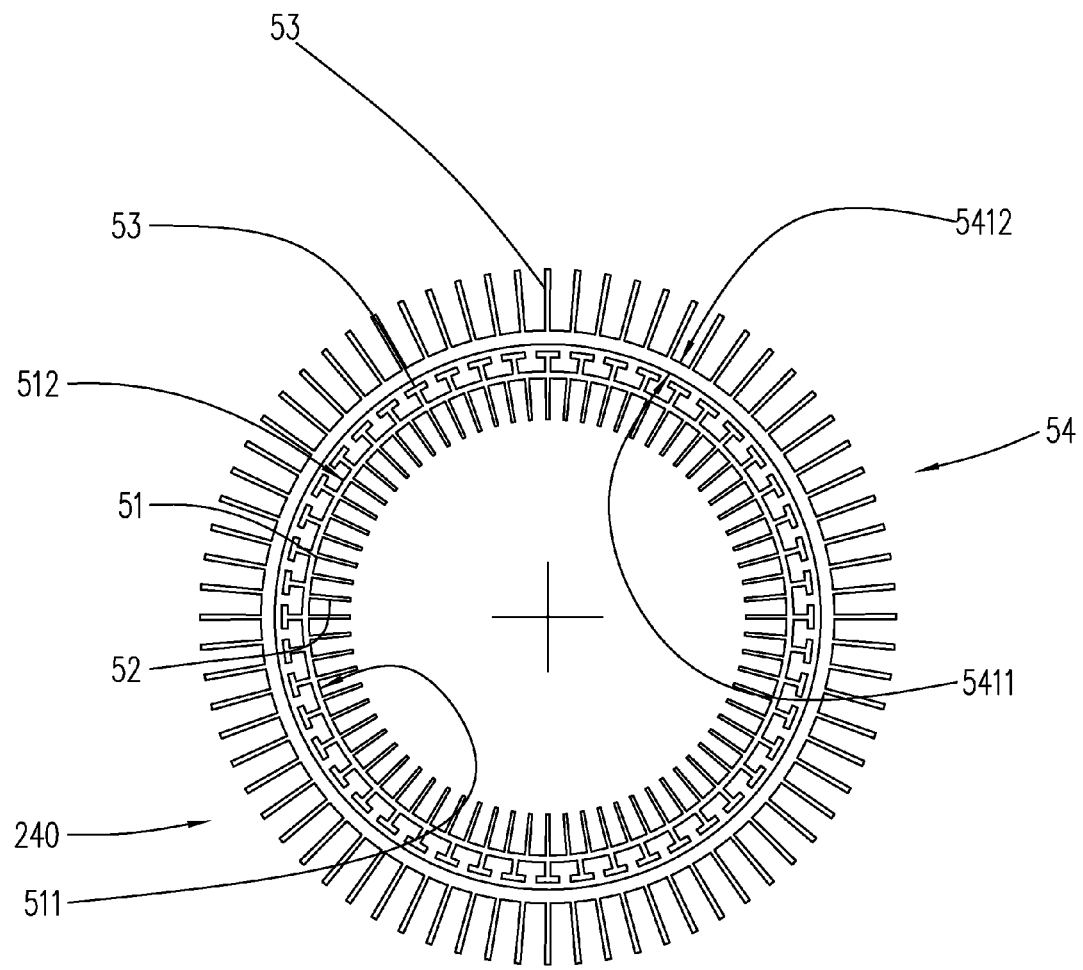
FIG. 36 is a schematic diagram of the first alternative mode of the heat exchanging pipe according to the above preferred embodiment of the present invention, illustrating that the heat exchanging pipe is embedded by the outer protective pipe.

Referring to FIG. 35A, FIG. 35B, and FIG. 36 of the drawings, each of the heat exchanging pipes 240 can be used in conjunction with an outer protective pipe 54. Thus, each of the heat exchanging pipes 240 further comprises an outer protective pipe 54 having a diameter such that the pipe body 51 and the outer heat exchange fins 53 can be inserted into the outer protective pipe 54. More specifically, the outer protective pipe 54 comprises a pipe member 541 and a plurality of the outer heat exchanging fins 53 outwardly extended from an outer surface 5412 of the pipe member 541 for performing heat exchange with the fluid flowing along an exterior of the outer protective pipe 54. (Please note that the dotted lines in FIGS. 35A and 35B illustrate the inner and outer heat exchanging fins 52, 53 extending continuously around the pipe body 51.)

Moreover, as shown in FIG. 36 of the drawings, the pipe body 51 of the heat exchanging pipe 240 is arranged to completely insert into the outer protective pipe 54, wherein fluid is allowed to flow through the pipe body 51. It is worth mentioning that the features of the outer heat exchanging fins 53 extending from the pipe member 541 are identical to that described above. In other words, they can also be embodied as having a wide variety of cross sectional shapes.

It is worth mentioning that at room temperature, an inner diameter of the outer protective pipe 54 is actually slightly smaller than an outer or radial diameter of the outer heat exchanging fins 53 of the pipe body 51, so that the pipe body 51 and the outer heat exchanging fins 53 are not capable of receiving in the outer protective pipe 54. When a manufacturer wishes to insert the pipe body 51 into the outer protective pipe 54, the manufacturer needs to heat up the outer protective pipe 54 to an elevated temperature, and the outer protective pipe 54 will expand accordingly. After the expansion, the manufacture is able to insert the pipe body 51 along with all the inner heat exchanging fins 52 and the outer heat exchanging fins 53 into the outer protective pipe 54.

When fluid passes through the exterior (i.e. the outer heat exchanging fins 53) of the outer protective pipe 54, heat is transmitted to the fluid flowing in the pipe body 51 through the pipe member 541, the outer heat exchanging fins 53 of the pipe body 51, and the inner heat exchanging fins 52 of the pipe body 51. The identical heat transmission path is also accomplished when the fluid flowing inside the pipe body 51 carries heat which is to be transmitted to the fluid flowing on the exterior of the outer protective pipe 54 (i.e. flowing across the outer heat exchanging fins 53 of the pipe member 541). The function of the outer protective pipe 54 is that when the pipe body 51 accidentally breaks, the fluid flowing through the pipe body 51 is prevented from directly mixing with the fluid through outside the heat exchanging pipe 240.

Figure 37:
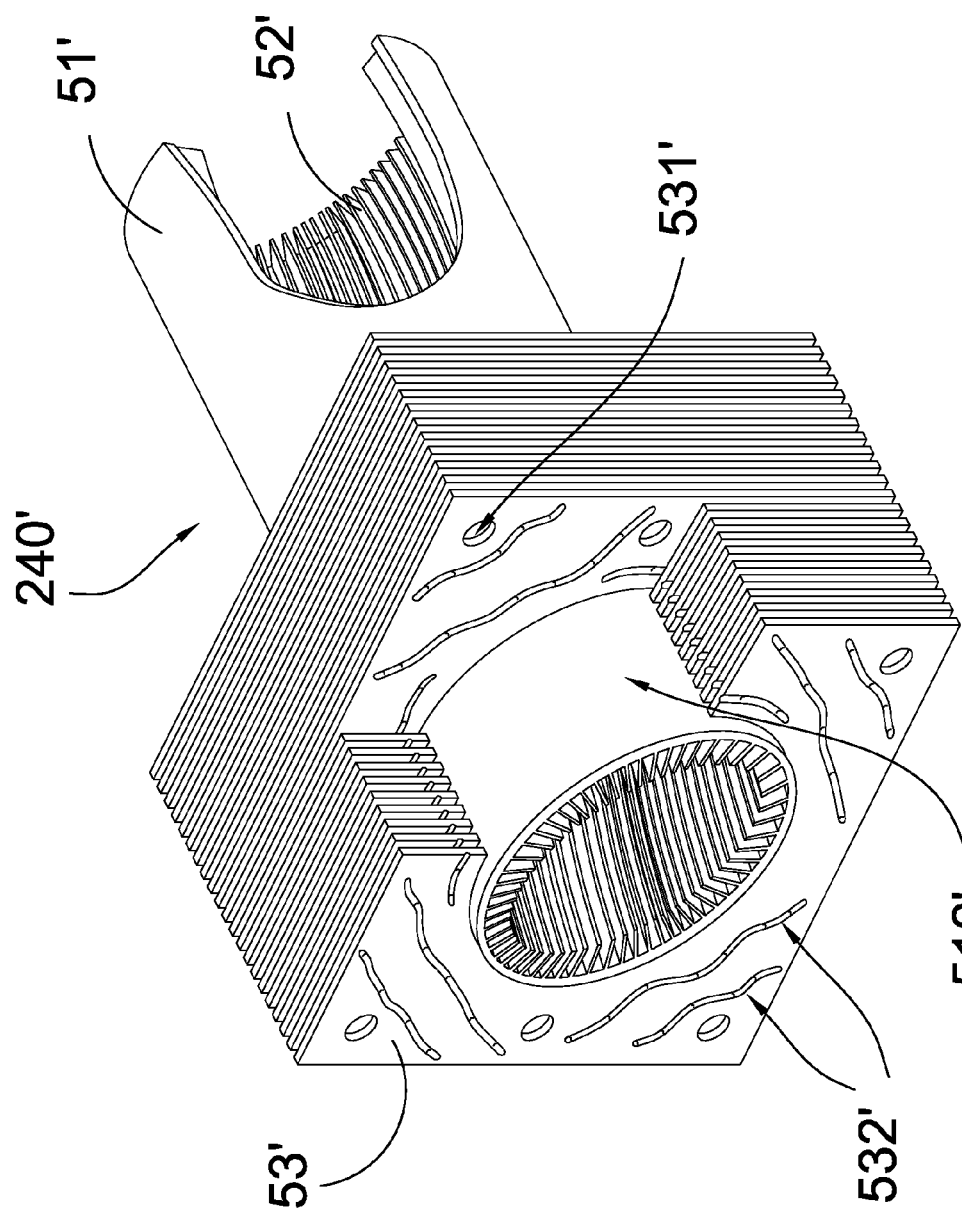
FIG. 37 is a perspective view of an alternative mode of the heat exchanging pipe according to the above preferred embodiment of the present invention.

Referring to FIG. 37 to FIG. 39 of the drawings, a first alternative mode of the heat exchanging pipe 240' according to the preferred embodiment of the present invention is illustrated. In this first alternative mode, each of the heat exchanging pipes 240' comprises a pipe body 51', a plurality of inner heat exchanging fins 52' spacedly and protrudedly extended along an inner surface 511' of the pipe body 51' in a spiral manner for enhancing heat exchange surface area of the corresponding heat exchanging pipe 240', and for guiding a fluid flow on the inner surface 511' of the corresponding heat exchange pipe 240' along the spiral path of the inner heat exchanging fins 52'. (Please also note that the dotted lines in FIG. 38 illustrate the inner heat exchanging fins 52' extending continuously around the pipe body 51').

On the other hand, each of the heat exchanging pipes 240' further comprises a plurality of outer heat exchanging fins 53' spacedly and outwardly extended from an outer surface 512' of the pipe body 51'. More specifically, each of the outer heat exchanging fins 53' is circumferentially extended from the outer surface 512' of the pipe body 51' to form a heat exchanging panel for performing heat exchange with the corresponding fluid (such as cooling water described above) flowing along the outer surface 512' of the pipe body 51'.

As shown in FIG. 37 of the drawings, each of the outer heat exchanging fins 53' further has a plurality of through guiding holes 531' spacedly provided thereon for facilitating flowing of fluid (such as the cooling water 1 described above) across the outer heat exchanging fins 53'. The fluid, such as the cooling water 1, is capable of passing through the outer heat exchanging fins 53' through the guiding holes 531'. Moreover, each of the outer heat exchanging fins 53' further has a plurality of indentions 532' formed thereon for further maximizing the surface area for heat exchange between the outer heat exchanging fins 53' and the fluid flowing across the corresponding heat exchanging pipes 240'.

It is important to mention that the cross sectional shape of each of the outer heat exchanging fins 53' can be varied so as to fit different applications of the heat exchanging pipes 240'. For example, each of the outer heat exchanging fins 53' can have a square or rectangular cross sectional shape as shown in FIG. 37 to FIG. 38 of the drawings. However, as shown in FIG. 40 of the drawings, the outer heat exchanging fin 53' may have a circular cross section for performing heat exchange with the corresponding fluid, wherein the dotted lines in FIG. 40 illustrate the inner heat exchanging fins 52' extending continuously around the pipe body 51').

It is important to mention that the outer heat exchanging fins 53' may be embodied as having a wide variety of cross sectional shapes. For example, each of the outer heat exchanging fins 53' may be embodied as having a rectangular cross sectional shape, hexagonal cross sectional shape, octagonal cross sectional shape, or any other cross sectional shapes.

Moreover, the heat exchanging pipes 240 (and all the alternatives) mentioned above can be used in the above-mentioned multiple effect evaporative condenser 100 and all of its alternatives. Furthermore, the heat exchanging pipes 240 will also be used in the heat exchanger 30 mentioned below.

Figure 41:
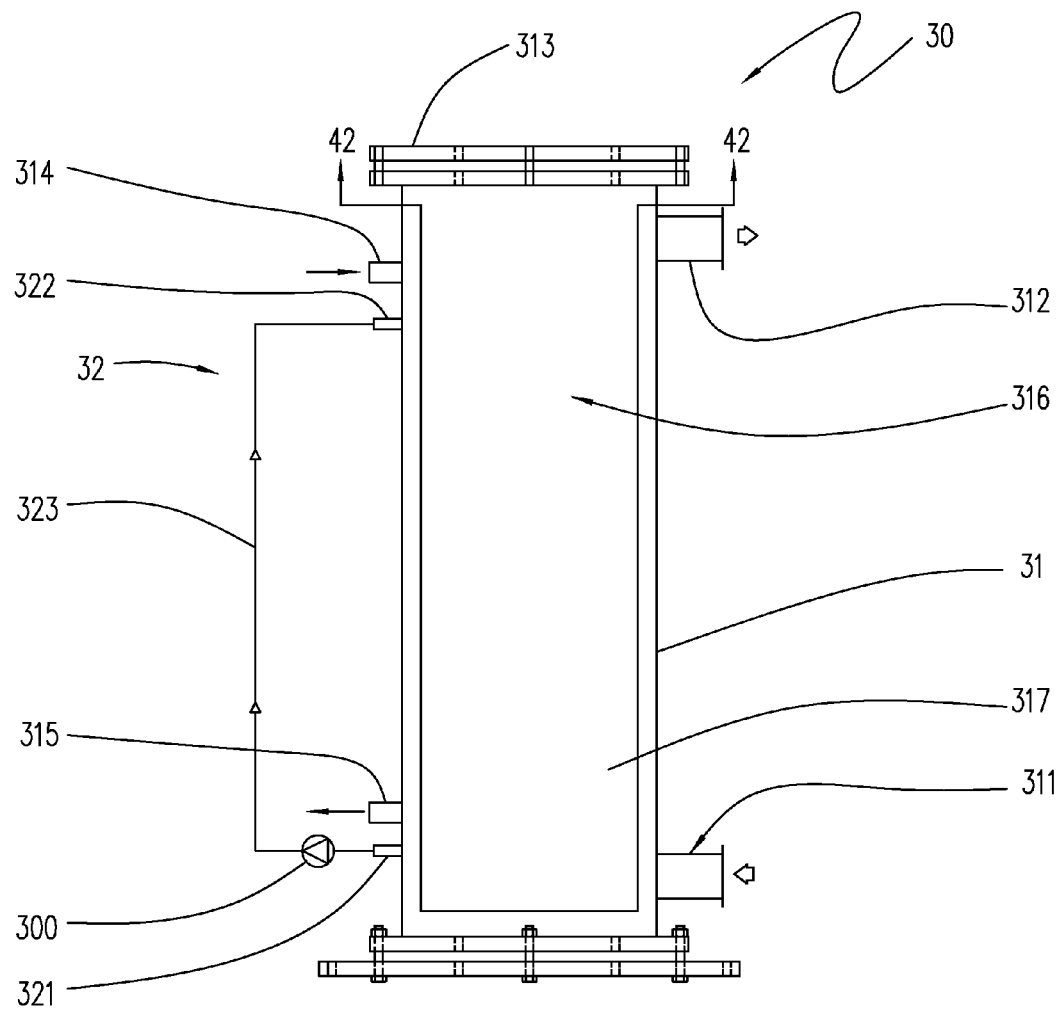
FIG. 41 is a side view of a heat exchanger according to the above preferred embodiment of the present invention.
Figure 44:
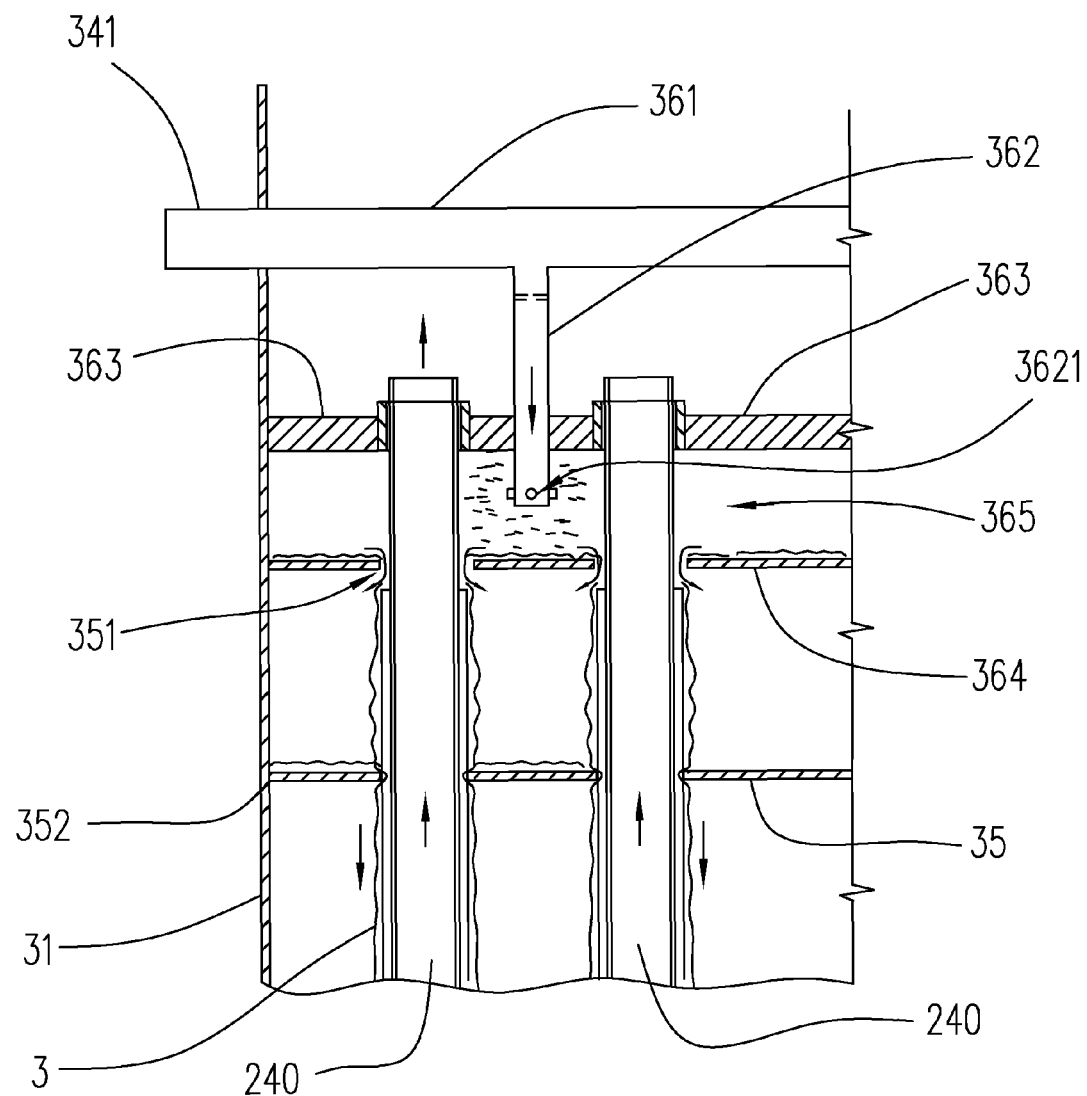
FIG. 44 is a partial schematic diagram the heat exchanger according to the above preferred embodiment of the present invention.

Referring to FIG. 41 and FIG. 44 of the drawings, a heater exchanger 30 according to the above preferred embodiment of the present invention is illustrated. According to the preferred embodiment, the heat exchanger 30 comprises a heat exchanger housing 31, an upper water chamber 33 provided on an upper portion of the heat exchanger housing 31, a lower water chamber 34 provided on a lower portion of the heat exchanger housing 31, and a feedback arrangement 32.

The heat exchanger housing 31 has a water inlet 311, a water outlet 312, a refrigerant inlet 314, a refrigerant outlet 315, and a cover 313 detachably provided on the heat exchanger housing 31.

The upper water chamber 33 is communicated with the water outlet 312, whereas the lower water chamber 34 is communicated with the water inlet 311. The heat exchanger 30 further comprises a plurality of heat exchanging pipes 240 extended between the upper water chamber 33 and the lower water chamber 34, wherein water having a relatively low temperature is arranged to enter the heat exchanger 30 through the water inlet 311 and temporarily store in the lower water chamber 34. The water is then pumped up the heat exchanger housing 31 through the heat transfer pipes 240 and temporarily store in the upper water chamber 33 and leaves the heat exchanger 30 through the water outlet 312. The pumping is accomplished by a heat exchanger pump 300.

At the same time, the refrigerant 3 is guided to enter the heat exchanger 30 through the refrigerant inlet 314 and flow through an exterior of the heat exchanging pipes 240 (i.e. along the corresponding outer heat exchanging fins 53) for performing heat exchange with the water flowing through the corresponding heat exchanging pipes 240. During the heat exchange process between the refrigerant 3 and the water, heat is absorbed by the refrigerant 3 which becomes evaporated (i.e. vapor state). The vapor of the refrigerant 3 is then guided to leave the heat exchanger 30 through the refrigerant outlet 315.

The feedback arrangement 32 comprising a feedback outlet 321, a feedback inlet 322, and a feedback pipe 323 connecting the feedback outlet 321 and the feedback inlet 322, wherein incompletely evaporated refrigerant 3 is arranged to be fed back to the heat exchanger 30 through the feedback outlet 321 and the feedback inlet 322 for performing another cycle of heat exchange so as to allow the incompletely evaporated refrigerant 3 to be fully evaporated before leaving the heat exchanger 30 and goes back to the compressor or other components of the air conditioning system.

The heat exchanger 30 further comprises a refrigerant distributor 36 provided in the upper water chamber 33 for guiding the refrigerant coming from the refrigerant inlet 314 to flow across the heat exchanging pipes 240. More specifically, the refrigerant distributor 36 comprises a main guiding pipe 361 extended form the refrigerant inlet 314, a plurality of distributing branches 362 transversely and spacedly extended from the main guiding pipe 361, wherein each of the distributing branches 362 has a spraying nozzle 3621 formed at the end portion thereof.

The refrigerant distributor 36 further comprises a division member 363 mounted in the heat exchanger housing 31 at a position above the spraying nozzles 3621, and a guider panel 364 transversely and spacedly mounted underneath the division member 363 to define a gas cavity 365 between the division member 363 and the guider panel 364, wherein the refrigerant 3 flowing through the distributing branches 362 are sprayed in the gas cavity 365 in a quasi gaseous state (i.e. partially gaseous and partially liquid state).

It is worth mentioning that the guider panel 364 has a plurality of through guider holes 3641 spacedly formed thereon, wherein the heat exchanging pipes 240 are arranged to extend between the upper water chamber 33 and the lower water chamber 34 through the guider holes 3641. However, a diameter of each of the guiding holes 3641 is slightly larger than an outer diameter (including the outer heat exchanging fins 53) of the corresponding heat exchanging pipes 240 so that refrigerant 3 in its liquid state is able to pass through the small gap between the heat exchanging pipes 240 and the corresponding sidewalls of the guiding holes 3641 and reach the lower portion of the heat exchanger housing 31 from the gas cavity 365.

Figure 42:
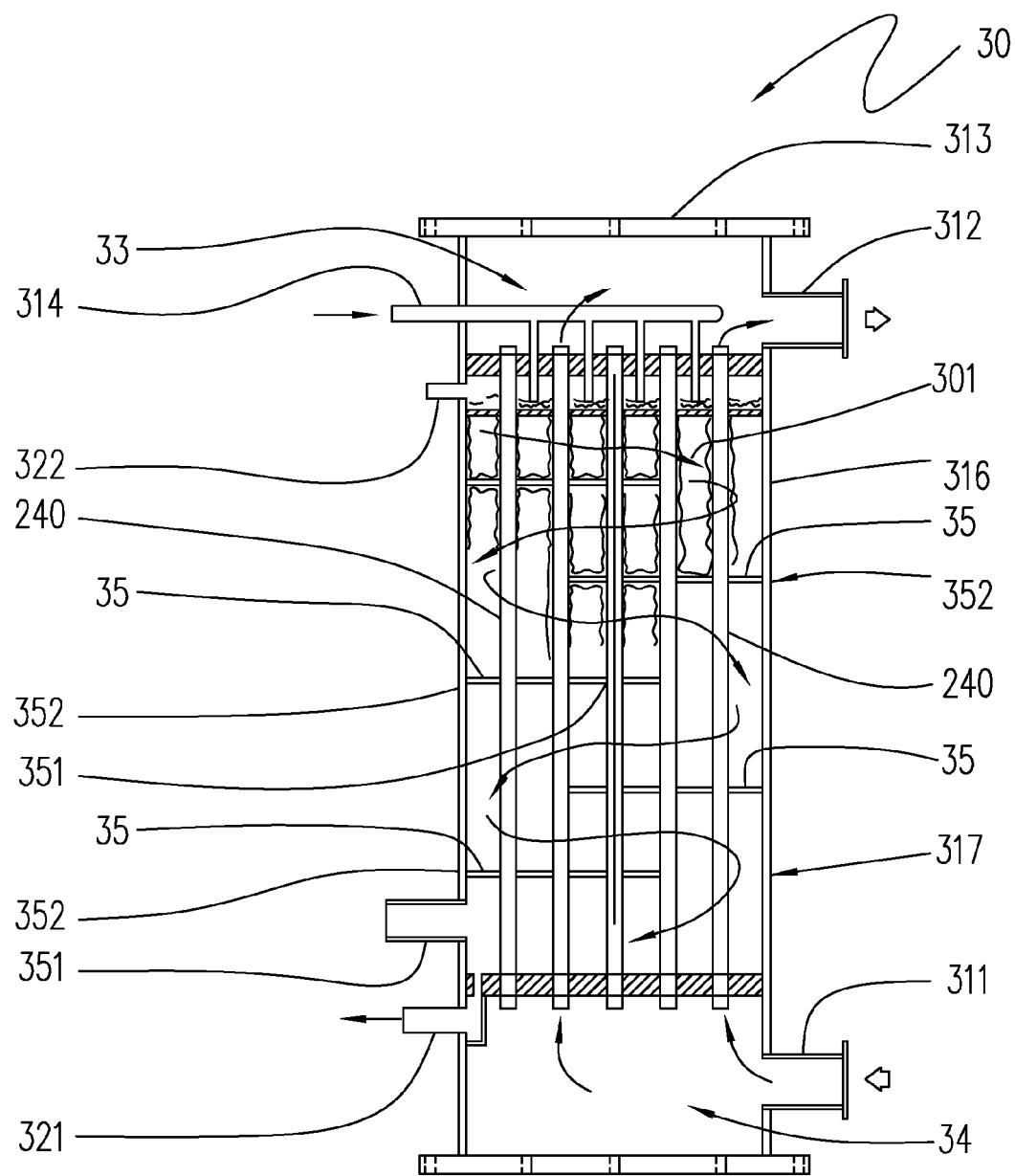
FIG. 42 is a sectional side view of a heat exchanger according to the above preferred embodiment of the present invention, wherein the sectional side view is made alone plane 10-10 of FIG. 41.
Figure 43:
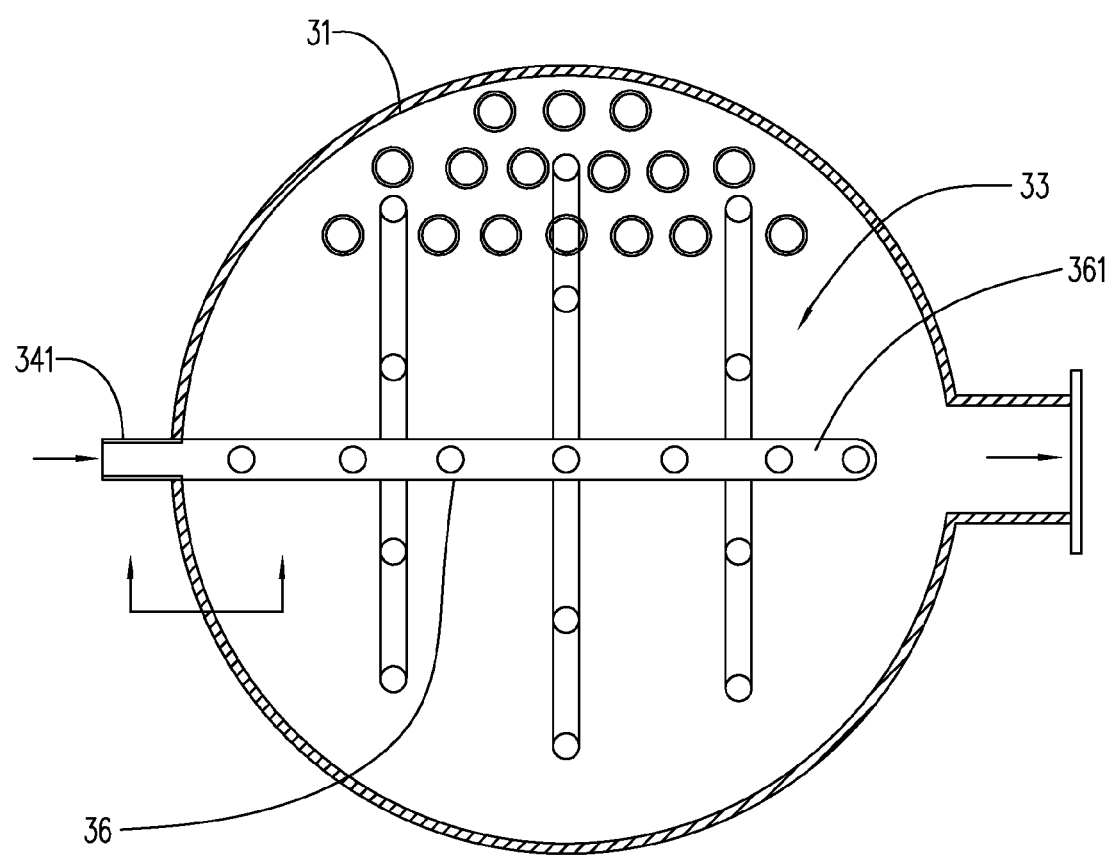
FIG. 43 is a sectional plan view of the heat exchanger according to the above preferred embodiment of the present invention, wherein the sectional side view is made alone plane 11-11 of FIG. 42.

As shown in FIG. 42 of the drawings, the heat exchanger 30 further comprises a plurality of diverting panels 35 transversely, suspendedly and spacedly mounted in the heat exchanger housing 31 at a position underneath the guider panel 364, wherein each two of the adjacent diverting panels 35 is mounted at opposite sidewalls of the heat exchanger housing 31, and a diameter of each of the diverting panels 35 is smaller than that of the heat exchanging housing 31 so as form a predetermined passage space between an inner end of the diverting panels 35 and the corresponding opposite sidewall of the heat exchanger housing 31. These passage spaces of the diverting panels 35 constitute a passage channel 301 for evaporated refrigerant 3 to flow from the upper portion 316 of the heat exchanger housing 31 to the lower portion 317 thereof, where the refrigerant outlet 315 is located.

In other words, the side edges 352 of each two adjacent diverting panels 35 are mounted to two opposite inner sidewalls of the heat exchanger housing 31 respectively such that the evaporated refrigerant 3 is arranged to move from the top portion 316 to the bottom portion 317 of the heat exchanger housing 31 in a zigzag manner until the evaporated refrigerant 3 reaches the refrigerant outlet 315.

Note also that each of the diverting panels 35 has a plurality of passage holes 351 spacedly formed thereon and is aligned with the guiding holes 3641 respectively, wherein the heat exchanging pipes 240 are arranged to pass through the passage holes 351.

Furthermore, a diameter of each of the passage holes 351 is slightly larger than an outer diameter (including the outer heat exchanging fins 53) of the corresponding heat exchanging pipes 240 so that refrigerant 3 in its liquid state is able to pass through the small gap between the heat exchanging pipes 240 and the corresponding sidewalls of the passage holes 351 and reach the lower portion 317 of the heat exchanger housing 31 along the outer heat exchanging fins 53 of the corresponding heat exchanging pipes 240.

In other words, the refrigerant 3 in the liquid state is then arranged to form a thin film flowing through the outer heat exchanging fins 53 of the heat exchanging pipes 240 for heat exchange with the water flowing through the heat exchanging pipes 240 (i.e. the interior of the heat exchanging pipes 240), and is arranged to move from the upper portion of the heat exchanging pipes 240 downwardly toward the bottom portion thereof. Moreover, a vertical distance between each two diverting panels 35 is gradually increasing from the upper most diverting panel 35 to the lowermost diverting panel 35.

When the refrigerant 3 moves from the upper portion of the heat exchanging pipes 240 to the lower portion thereof, it absorbs heat from the water and evaporated at a predetermined rate. On the other hand, the heat in the water flowing through the heat exchanging pipes 240 is extracted and temperature of the water decreases when it goes from the bottom portion of the heat exchanging pipes 240 to the upper portion thereof. By the time the refrigerant 3 reaches the lower portion of the heat exchanging pipes 240, a majority of the refrigerant 3 is evaporated and is guided to exit the heat exchanger 30 through the refrigerant outlet 315.

As shown in FIG. 42 of the drawings, the feedback arrangement 32 further comprises a residue collection chamber 324 provided at a lower portion 317 of the heat exchanger housing 31 and is communicated with the feedback outlet 321 in such a manner that un-evaporated refrigerant 3 (i.e. residue refrigerant 3) is arranged to be guided and collected in the residue collection chamber 324. The residue refrigerant 3 is then pumped back to the feedback inlet 322 through the feedback pipe 323. The feedback inlet 322 is communicated with the space formed between the guider panels 364 and the top diverting panel 35 in the evaporator housing 31, so that the residue refrigerant 3 may join the refrigerant 3 coming from the distributing branches 362 and go through the heat exchanging process one more time by passing along the heat exchanging pipes 240 again.

Figure 45:
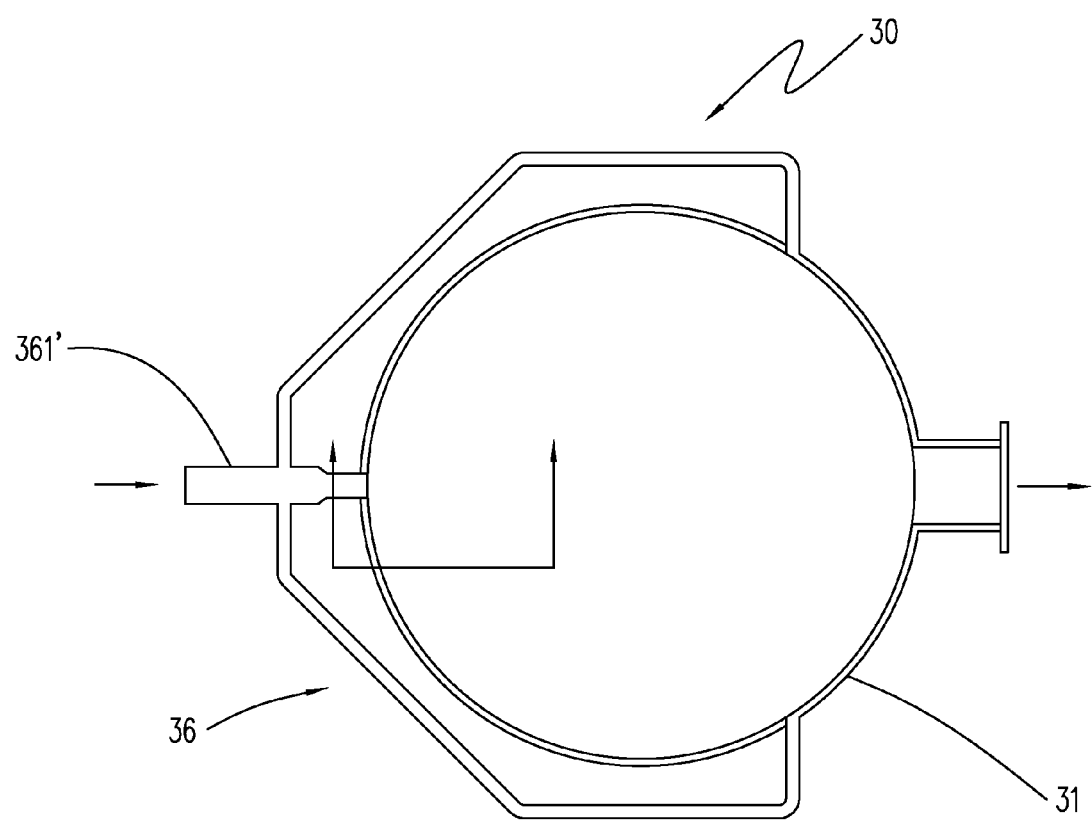
FIG. 45 is a first alternative mode of the heat exchanger according to the above preferred embodiment of the present invention.
Figure 46:
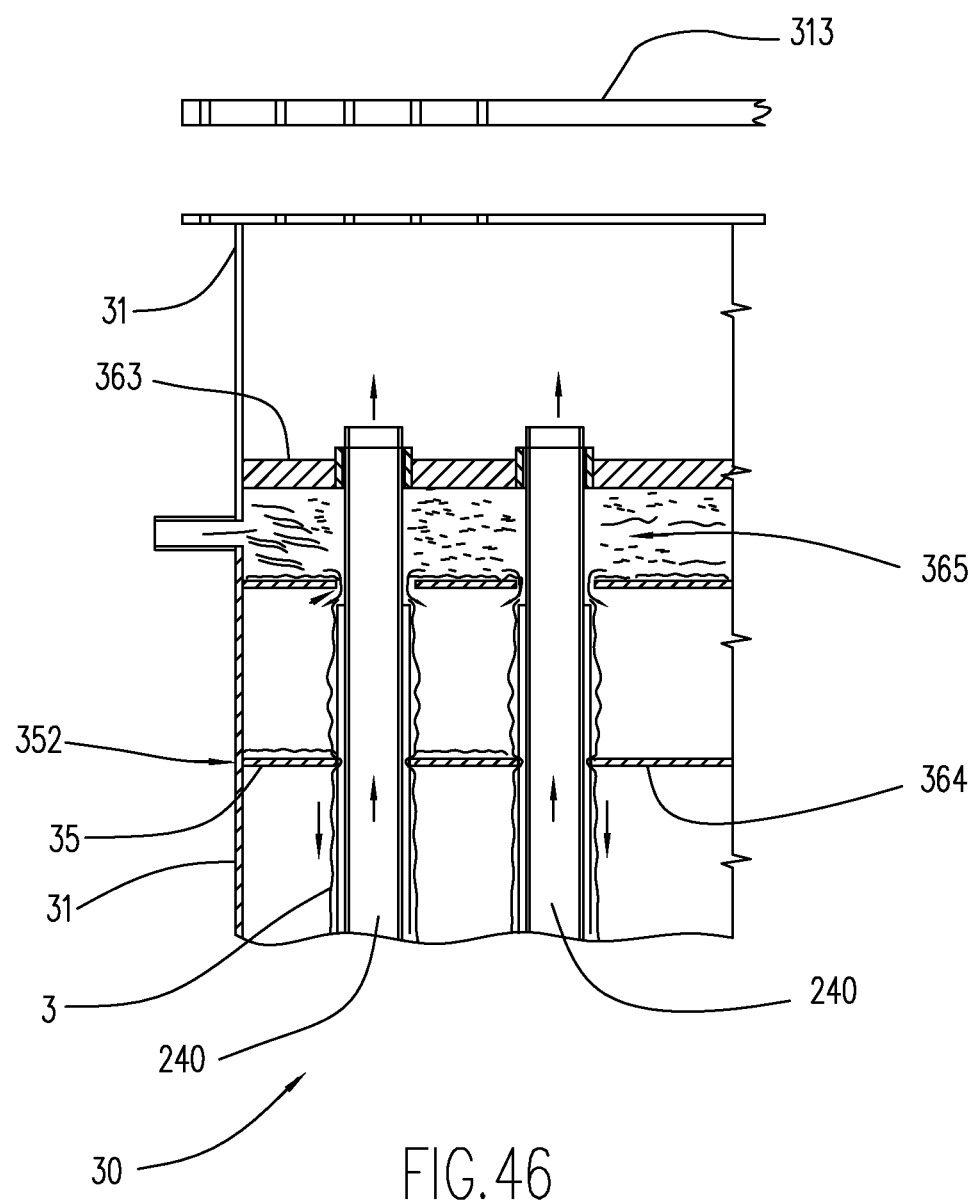
FIG. 46 is a sectional side view of the first alternative mode of the heat exchanger according to the above preferred embodiment of the present invention.

Referring to FIG. 45 and FIG. 46 of the drawings, a first alternative mode of the heat exchanger according to the preferred embodiment of the present invention is schematically illustrated. The first alternative mode of the heat exchanger 30 is similar to the preferred embodiment described above except refrigerant distributor 36'.

In this third alternative mode, the refrigerant distributor 36' guides the flow of the refrigerant 3 outside the heat exchanger housing 31. The refrigerant distributor 36' comprises the main guiding pipe 361' extended from the refrigerant inlet 314' and the distributing branches 362' are extended from the main guiding pipe 361' which are provided at an exterior of the heat exchanger housing 31, wherein each of the distributing branches 362' are directly extended to the gas cavity 365' for allowing liquid refrigerant 3 to perform heat exchange with the heat exchanging pipes 240.

Figure 47:
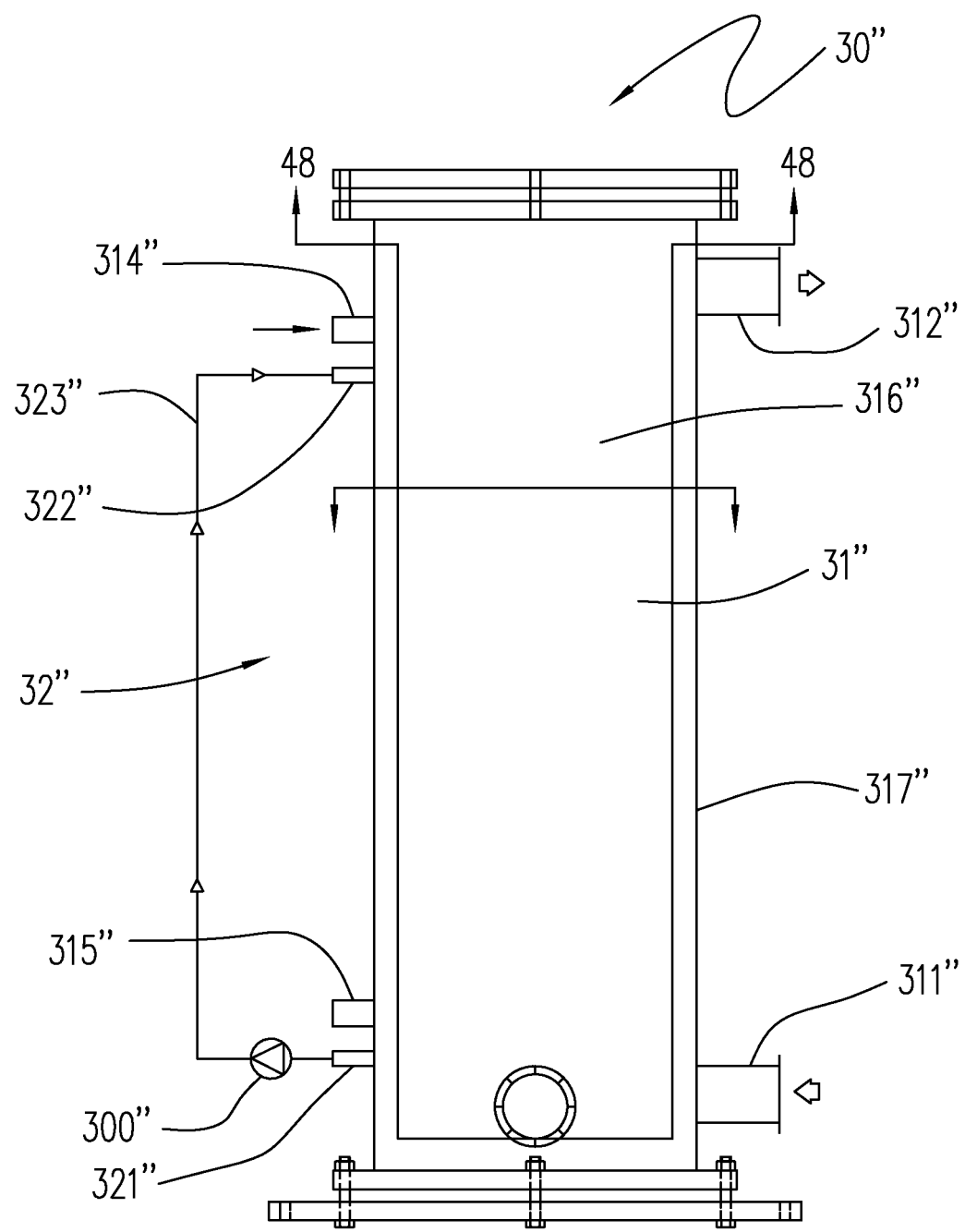
FIG. 47 is a second alternative mode of the heat exchanger according to the above preferred embodiment of the present invention.
Figure 48:
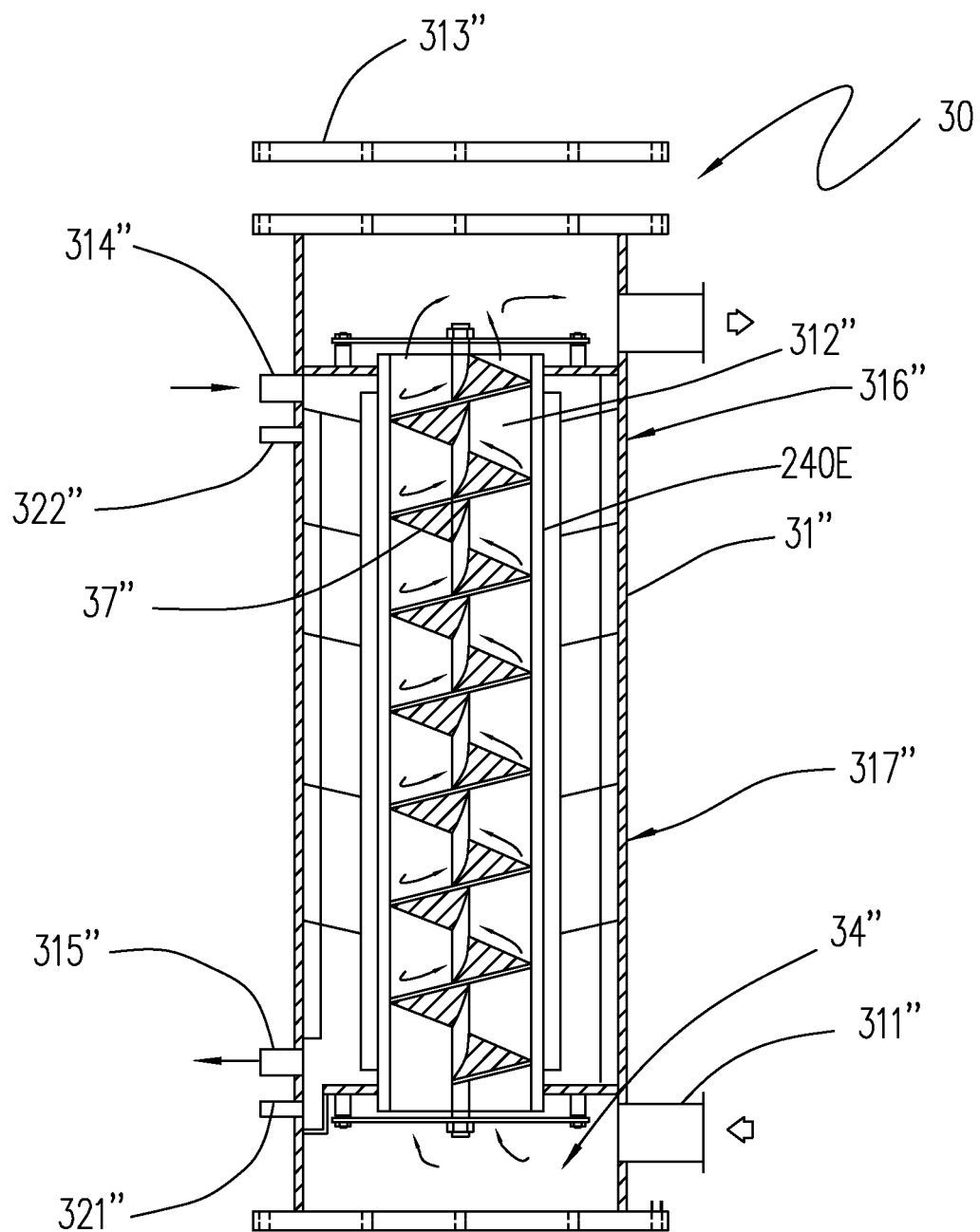
FIG. 48 is a sectional side view of the second alternative mode of the heat exchanger according to the above preferred embodiment of the present invention.
Figure 49:
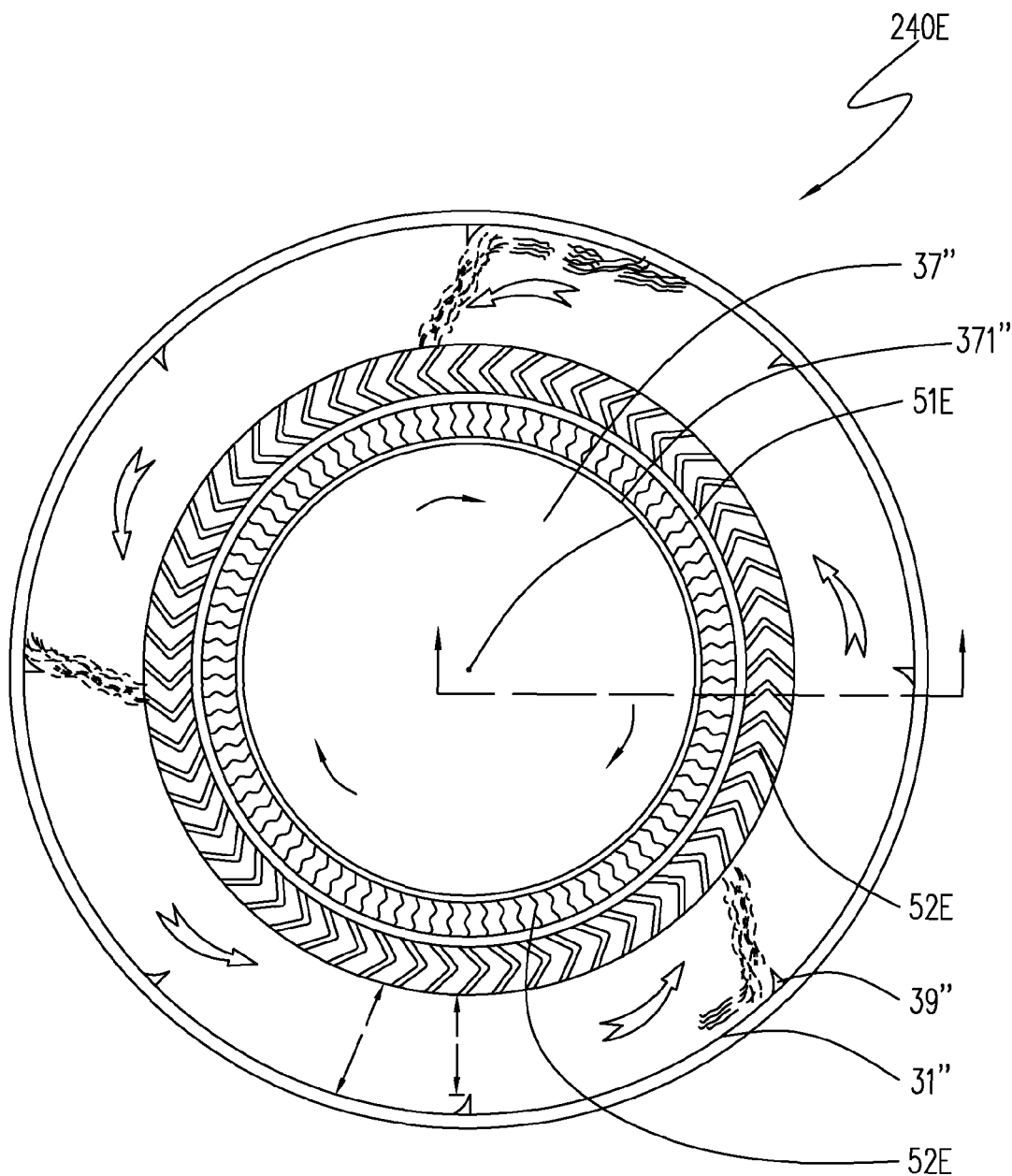
FIG. 49 is a sectional side view (along plane 17-17 of FIG. 47) of the second alternative mode of the heat exchanger according to the above preferred embodiment of the present invention.
Figure 50:
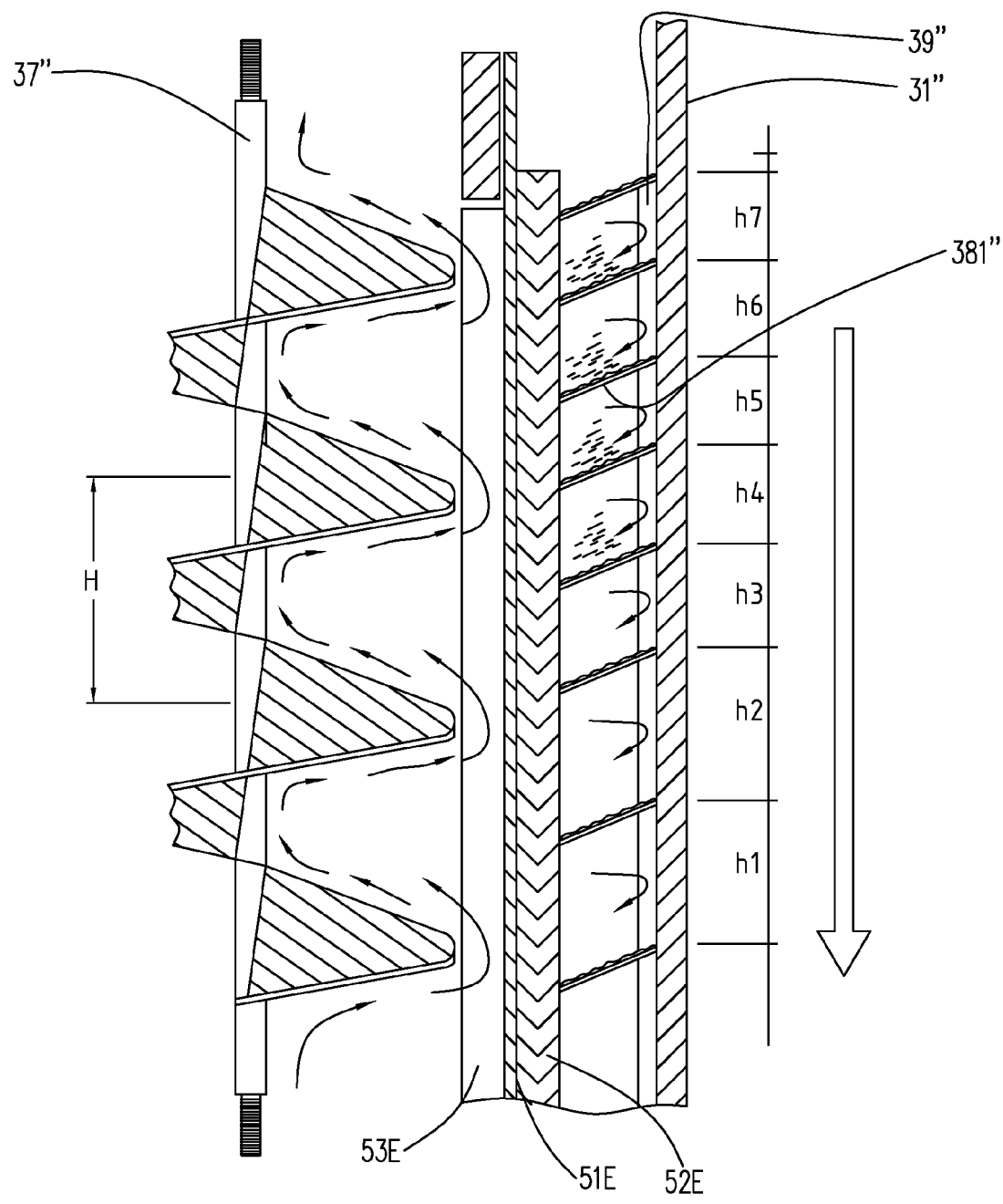
FIG. 50 is a sectional side view (along plane 18-18 of FIG. 49) of the second alternative mode of the heat exchanger according to the above preferred embodiment of the present invention.

Referring to FIG. 47 and FIG. 50 of the drawings, a second alternative mode of the heat exchanger according to the preferred embodiment of the present invention is schematically illustrated. The second alternative mode of the heat exchanger 30" is similar to the preferred embodiment described above except the heat exchanging pipe 240".

According to the second alternative mode of the heat exchanger 30", the heat exchanger 30" comprises only one heat exchanging pipe 240E for facilitating heat exchanging between the water and the refrigerant 3. More specifically, the heat exchanger 30" comprises a heat exchanger housing 31", an upper water chamber 33" provided on an upper portion 316" of the heat exchanger housing 31", a lower water chamber 34" provided on a lower portion 317" of the heat exchanger housing 31", and a feedback arrangement 32".

The heat exchanger housing 31" has a water inlet 311", a water outlet 312", a refrigerant inlet 314", a refrigerant outlet 315", and a cover 313" detachably provided on the heat exchanger housing 31".

The upper water chamber 33" is communicated with the water outlet 312", whereas the lower water chamber 34" is communicated with the water inlet 311", The heat exchanging pipe 240E is extended between the upper water chamber 33" and the lower water chamber 34", wherein water having a relatively low temperature is arranged to enter the heat exchanger 30" through the water inlet 311" and temporarily store in the lower water chamber 34", The water is then pumped up the heat exchanger housing 31" through the heat transfer pipe 240E and temporarily store in the upper water chamber 33" and leaves the heat exchanger 30" through the water outlet 312", The pumping is accomplished by a heat exchanger pump 300".

At the same time, the refrigerant 3 is guided to enter the heat exchanger 30" through the refrigerant inlet 314" and flow through an exterior of the heat exchanging pipe 240E (i.e. along the corresponding outer heat exchanging fins 53E) for performing heat exchange with the water flowing through the corresponding heat exchanging pipes 240E. During the heat exchange process between the refrigerant 3 and the water, heat is absorbed by the refrigerant 3 which becomes evaporated (i.e. vapor state), The vapor of the refrigerant 3 is then guided to leave the heat exchanger 30" through the refrigerant outlet 315".

The feedback arrangement 32" comprising a feedback outlet 321", a feedback inlet 322", and a feedback pipe 323" connecting the feedback outlet 321" and the feedback inlet 322", wherein incompletely evaporated refrigerant 3 is arranged to be fed back to the heat exchanger 30" through the feedback outlet 321" and the feedback inlet 322" for performing another cycle of heat exchange so as to allow the incompletely evaporated refrigerant 3 to be fully evaporated before leaving the heat exchanger 30" and goes back to the compressor or other components of the air conditioning system.

The refrigerant distributor is identical to what is disclosed in the preferred embodiment, except the refrigerant distributor is arranged to distribute the refrigerant 3 to flow from the refrigerant inlet 314" to the only heat exchanging pipe 240E in the heat exchanger 30".

In this second alternative mode of the heat exchanger 30", the heat exchanger 30" further comprises an inner spiral guiding member 37" mounted in the heat exchanging pipe 240E, wherein an outer diameter of the inner spiral guiding member 37" is slightly smaller than an inner diameter of the heat exchanging pipe 240E so that the inner spiral guiding member 37" does not hit the inner heat exchanging fins 52E (extended from the pipe body 51E) of the heat exchanging pipe 240E.

The inner spiral guiding member 37" further has an inner spiral guider 371" made by flexible material and is formed along an outer edge of the inner spiral guiding member 37" for preventing the inner spiral guiding member 37" from hitting the inner heat exchanging fins 52E. (Please note that the dotted lines illustrate the inner spiral guider 371" and the inner exchanging fins 52E continuously extending around the pipe body 51E.)

It is important to mention at this stage that the inner spiral guiding member 37" spirally extends along a longitudinally direction of the heat exchanging housing 31" and is arranged to be extended along a direction which is opposite to the spirally extending inner heat exchanging fins 52E of the heat exchanging pipe 240E. In other words, when the inner heat exchanging fins 52E is extended in a clockwise direction, the inner spiral guiding member 37" is extended in an anti-clockwise direction. When the water flows through the heat exchanging pipe 240E, the flow of the water is guided by the inner spiral guiding member 37". Because the spirally extending direction of the inner spiral guiding member 37" and the inner heat exchanging fins 52E are opposite, water flowing through the inner spiral guiding member 37" is guided to hit the inner heat exchanging fins 52E. Moreover, when the inner spiral guiding member 37" is mounted in the heat exchanging pipe 240E, the water flowing time in the heat exchanging pipe 240E will be maximized for maximizing the heat exchange time between the water and the refrigerant 3.

On the other hand, the heat exchanger 3~" further comprises a plurality of outer spiral guiding members 38" spirally, inwardly and inclinedly extended along an inner surface of the heat exchanger housing 31" to form a plurality of outer spiral guiders 381", wherein the vapor refrigerant 3 from the refrigerant inlet 314" is arranged to hit the spiral guiding members 38" and flow towards the outer heat exchanging fins 52E of the heat exchanging pipe 240E. The refrigerant 3 is arranged to perform heat exchange with the water through the outer heat exchanging fins 52E and the inner heat exchanging fins 53E. Furthermore, as shown in FIG. 50 of the drawings, a vertical distance between each two adjacent outer spiral guiders 381" is increasing with decreasing height of the heat exchanger housing 31".

The heat exchanger 30" further comprises an outer guider 39" provided along a longitudinal direction along an inner surface of the heat exchanger housing 31" for adjusting and guiding a flowing path of the refrigerant 3 flowing through the space between the outer heat exchanging fins 52E and the inner surface of the heat exchanging housing 31". Note that when the refrigerant 3 is guided to flow in a spiral member by the outer heat exchanging fins 52E, a centrifugal force will be developed and the refrigerant 3 will tend to flow toward the inner surface of the heat exchanger housing 31". The purpose of the outer guider 39" is to guide the refrigerant hitting thereon to flow back to the outer heat exchanging fins 52E for prolonging the time in which the refrigerant 3 contacts with the outer heat exchanging fins 52E.

Figure 51:
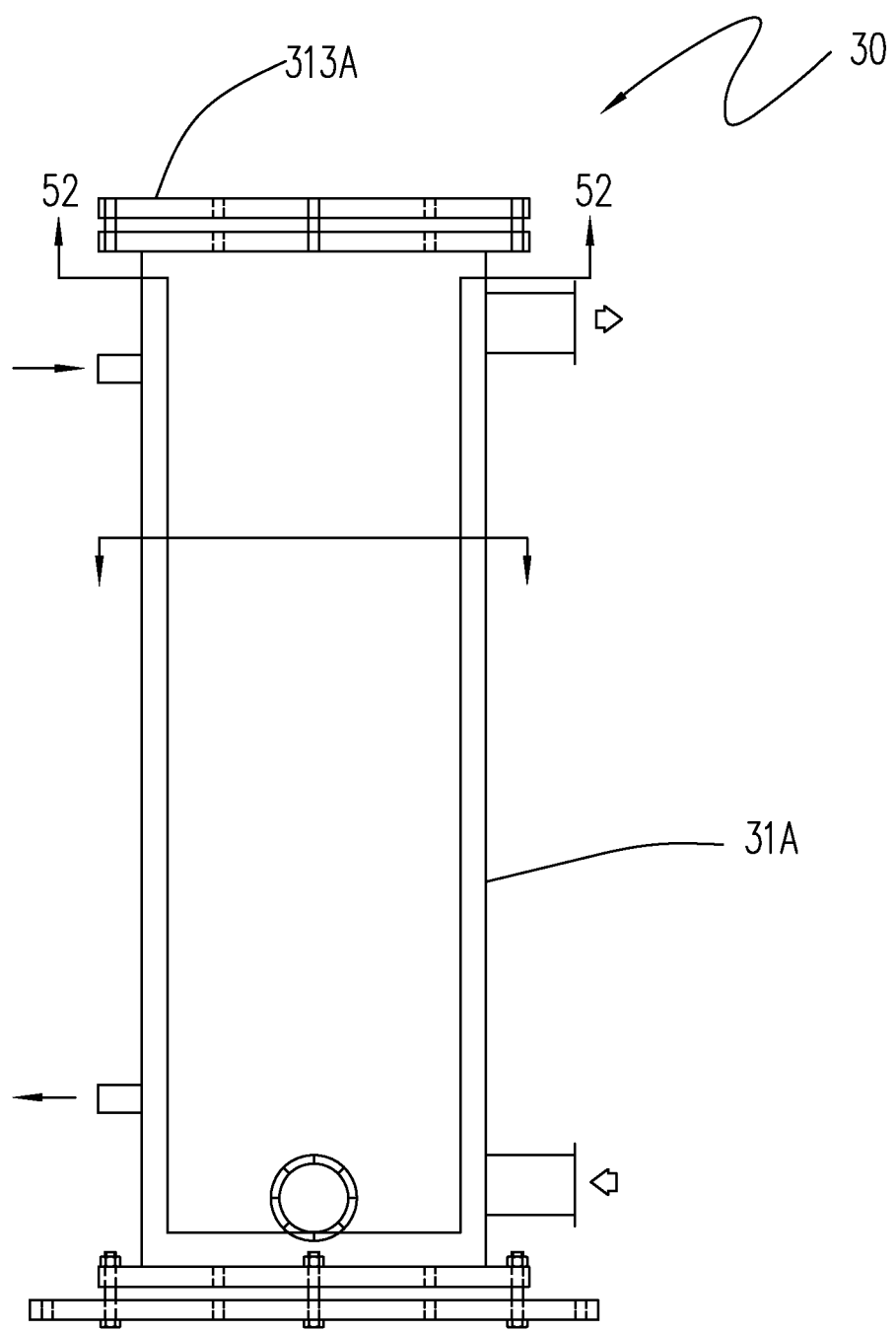
FIG. 51 is a third alternative mode of the heat exchanger according to the above preferred embodiment of the present invention.
Figure 52:
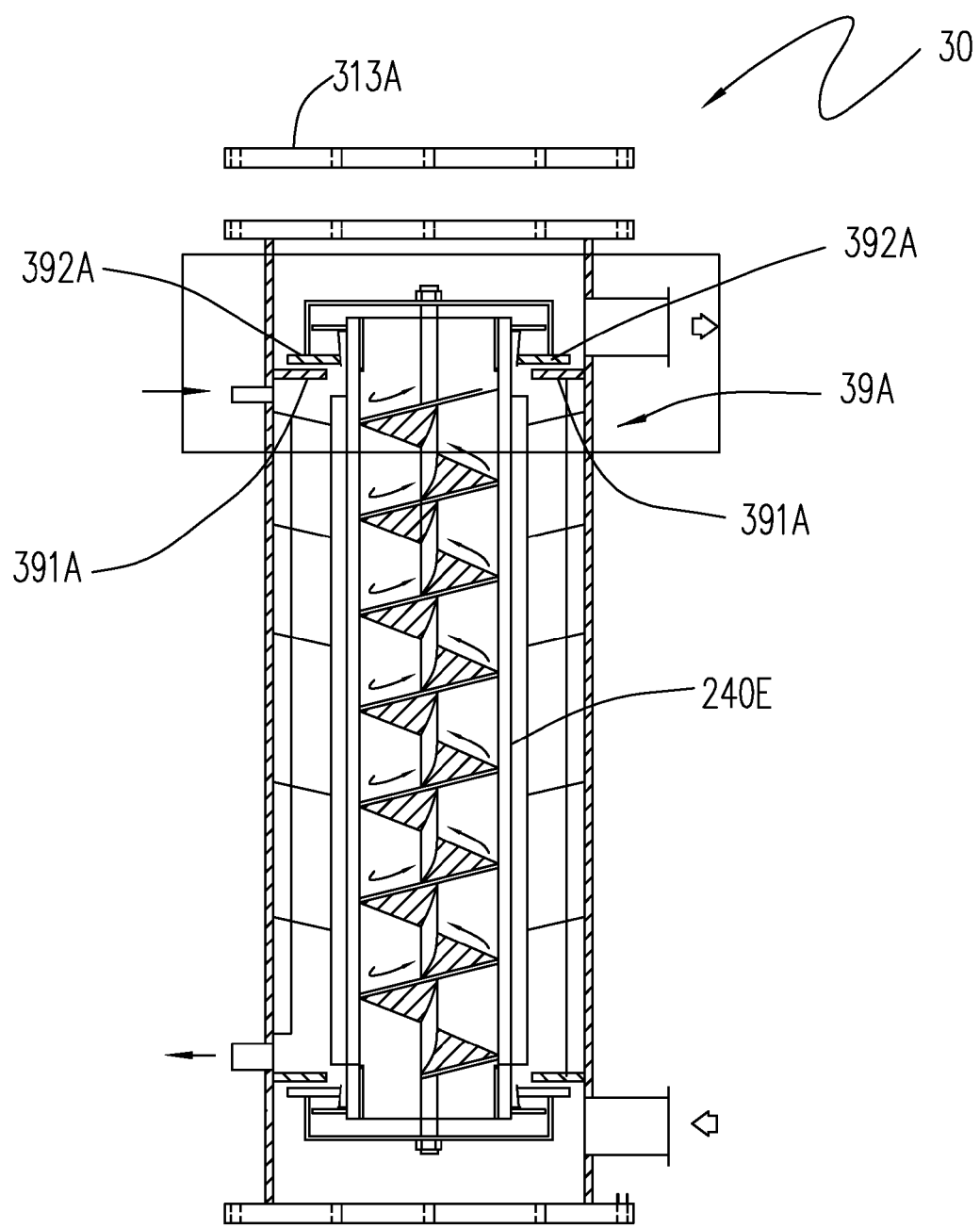
FIG. 52 is a sectional side view (along plane 20-20 of FIG. 51) of the third alternative mode of the heat exchanger according to the above preferred embodiment of the present invention.
Figure 54:
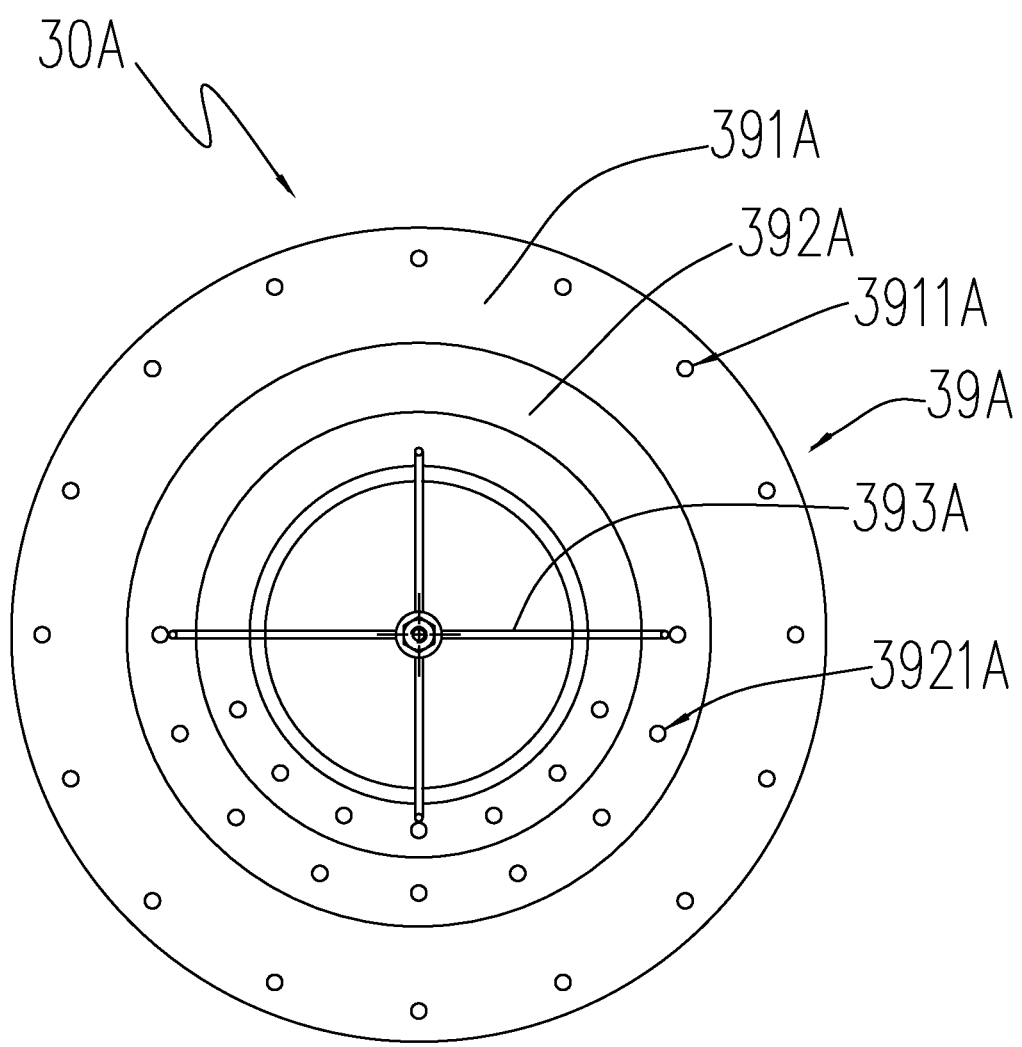
FIG. 54 is a sectional plan view of the third alternative mode of the heat exchanger according to the above preferred embodiment of the present invention.
Figure 55A:
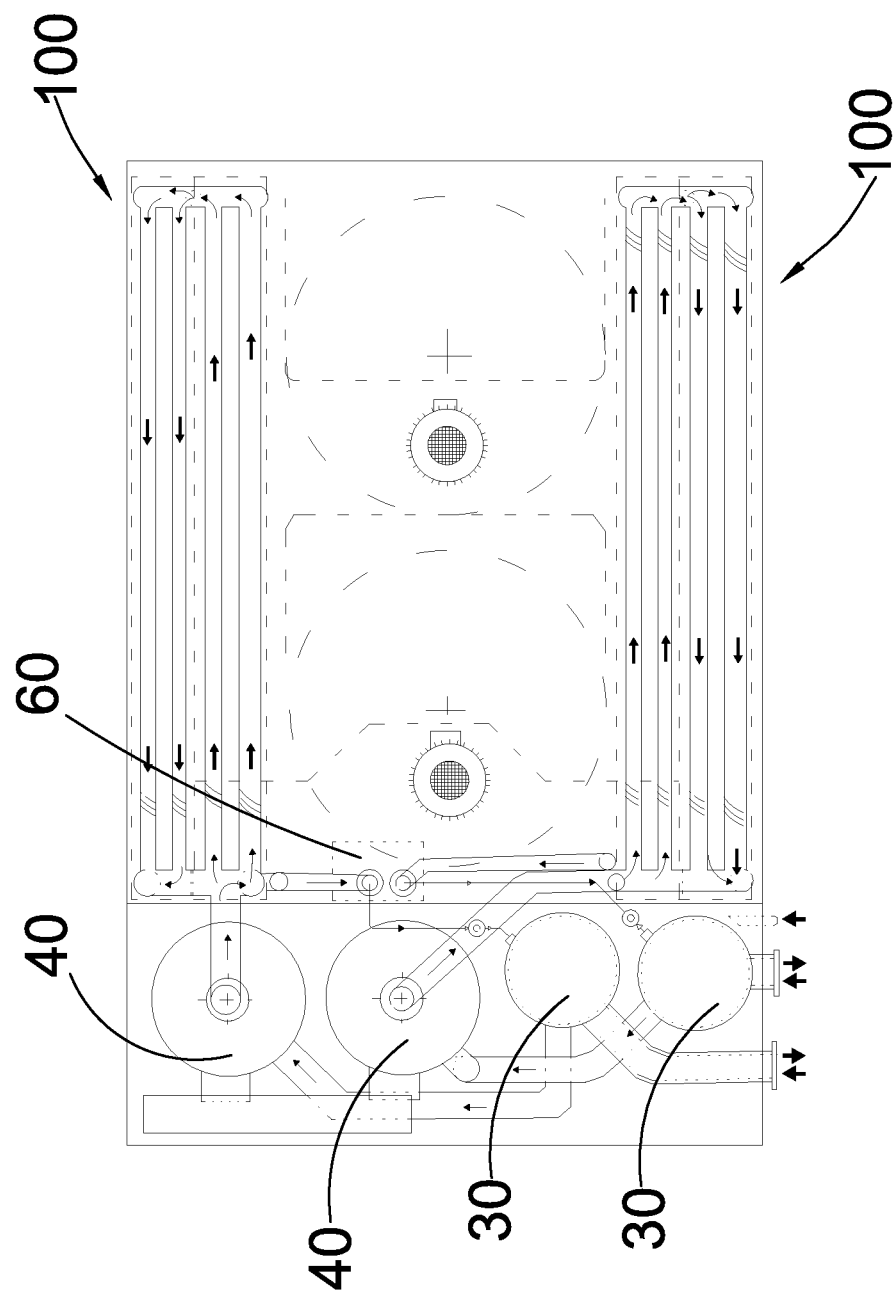
Figure 55D:
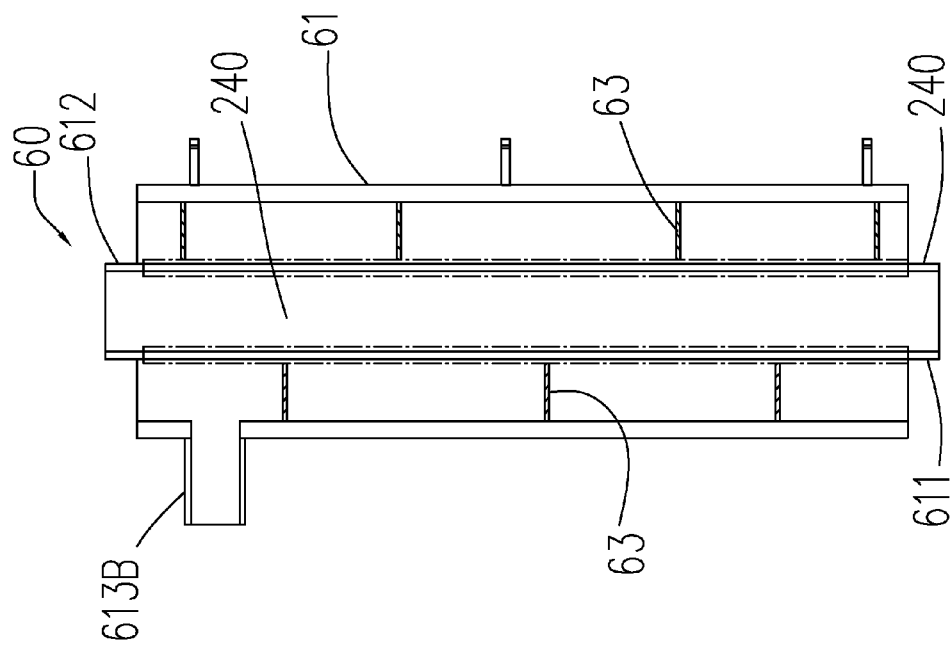
Figure 55B:
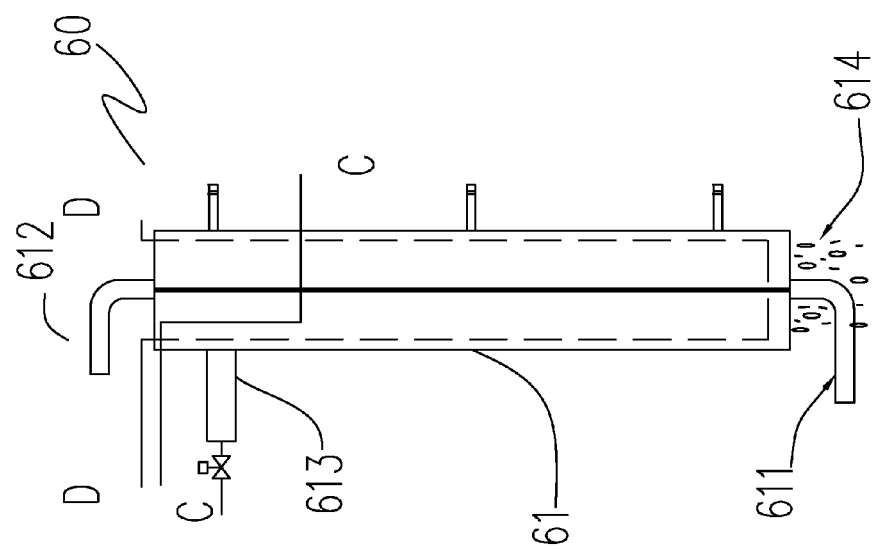

Referring to FIG. 51 and FIG. 54 of the drawings, a third alternative mode of the heat exchanger according to the preferred embodiment of the present invention is schematically illustrated. The third alternative mode of the heat exchanger 30A is similar to the second alternative mode of the heat exchange 30" described above, except the heat exchanger 30A further comprises a detachable arrangement 39A.

In this third alternative mode, the detachable arrangement 39A is provided on the heat exchanger housing 31 A for allowing the user to replace the heat exchanging pipe 240E by detaching the cover 313A from the heat exchanger housing 31A.

More specifically, the detaching arrangement 39A comprises a first flange 391A and a second flange 392A connecting the cover 313A to the heat exchanger housing 31A. The first flange 391A has a plurality of first connecting holes 3911A spacedly formed thereon, wherein the first flange 391A connects the heat exchanger housing 31A with the cover 313A through a plurality of connectors, such as screws, penetrating through the first connecting holes 3911A. On the other hand, the detaching arrangement 39A further comprises a supporting frame 393A detachably connecting the cover 313A and the heat exchanging pipe 240E.

Figure 53:
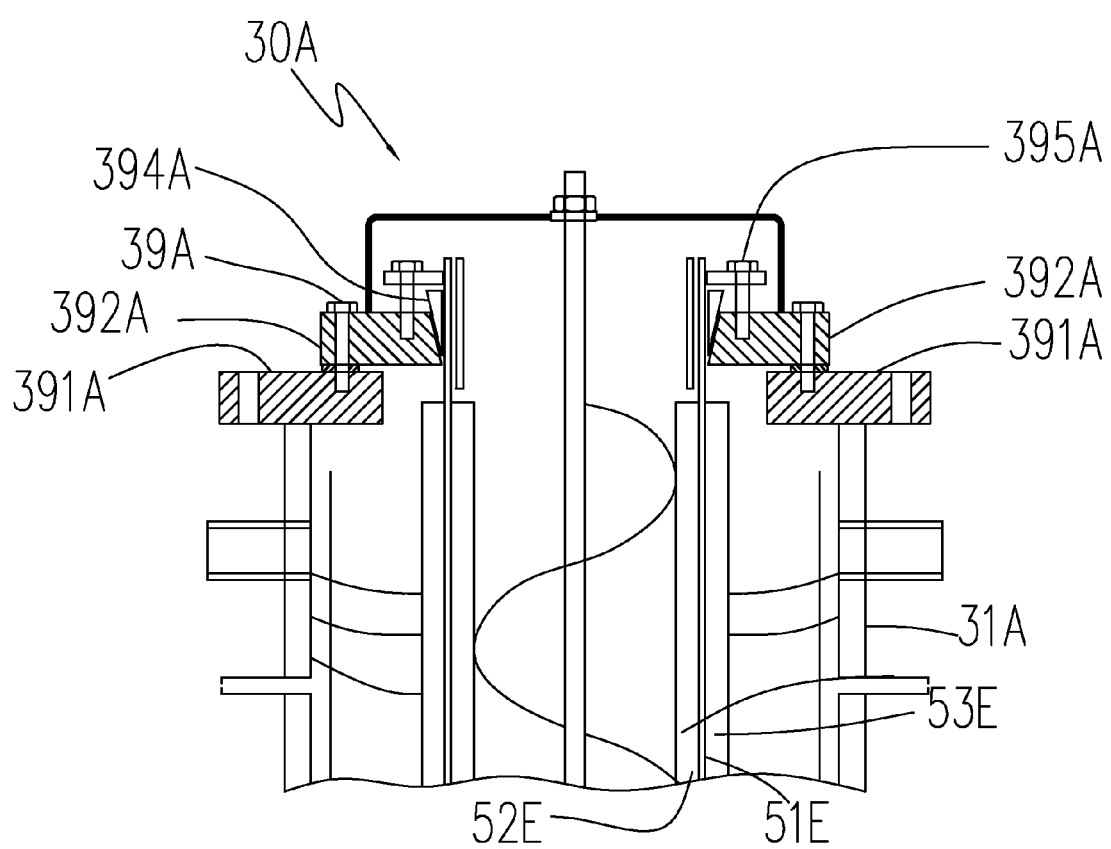
FIG. 53 is a partial zoom-in schematic diagram of the third alternative mode of the heat exchanger according to the above preferred embodiment of the present invention, illustrating the upper portion of the heat exchanger housing.

As shown in FIG. 53 of the drawings, the second flange 392A has a plurality of second connecting holes 3921A, wherein the supporting frame 393A is connected to the second flange 392A which is in turn connected to the first flange 391A through a plurality of connectors, such as screws, penetrating though the second connecting holes 3921A. Note that the second flange 392A has a diameter smaller than that of the first flange 391A, so that the cover 313A can be able to cover the second flange 392A and the heat exchanging pipe 240E when it is connected to the first flange 391A. Furthermore, the detaching arrangement 39A further comprises a sealing member 394A secured between the second flange 392A and the pip body 51E through a plurality of securing screws 395A mounted on the second flange 392A.

The supporting frame 393A comprises a first and a second supporter member 3931A, 3932A connected with each other in a cross manner for connecting with the second flange 392A.

It is worth mentioning that a user of the present invention may easily replace or take out the heat exchanging pipe 240E from the heat exchanger 30A for cleaning. The user needs only to unscrew the connectors connecting the cover 313A and the heat exchanger housing 31A and detach the cover 313A from the first flange 391A. Then, the user needs to unscrew the securing screws 395A from the second flange 392A. Afterwards, the user is able to detach the second flange 392A from the first flange 391A and take out the heat exchanging pipe 240E along with the supporting frame 393A from the heat exchanger housing 31A for cleaning or replacement.

FIG. 55A to FIG. 55F of the drawings illustrate that the air conditioning system of the present invention air conditioning system further comprises a cooling device 60 which uses a supplemental water with lower temperature to cool down the liquid refrigerant. As an example, the cooling device 60 can be connected between the expansion valve 50 (as shown in FIG. 8) and the multiple effective evaporative condenser 100, wherein the cooling device 60 is arranged to further lower the temperature of the refrigerant 3 coming out from the multiple effect evaporative condenser 100.

The cooling device 60 comprises a tubular housing 61 having a refrigerant entrance 611 formed at a bottom portion thereof, and a refrigerant exit 612 formed at a top portion of the tubular housing 61, wherein refrigerant 3 leaving the multiple effect evaporative condenser 100 is arranged to enter the tubular housing 61 through the refrigerant entrance 611 for further cooling, while the refrigerant 3 is arranged to leave the cooling device 60 through the refrigerant exit 612.

The cooling device 60 further comprises a heat exchanging pipe 240 (as described above) extended from the refrigerant entrance 611 and the refrigerant exit 612, wherein the refrigerant 3 is arranged to flow through the heat exchanging pipe 240 in the cooling device 60. Moreover, the tubular housing 61 further has a water entrance 613 provided at a top portion thereof, and a water exit 614 provided at a bottom portion of the tubular housing 61, wherein the supplemental water is arranged to flow into the tubular housing 61 through the water entrance 613 and perform heat exchange with the refrigerant 3 for further cooling the temperature of the refrigerant 3. Note that the water flowing through this cooling device 60 is collected from the multiple effect evaporative condenser so that when the water finishes absorbing heat from the refrigerant 3, the water is guided to flow back to the multiple effect evaporative condenser for cooling.

The cooling device 60 further comprises a plurality of water diverters 63 spacedly extended from inner sidewall of the tubular housing 61 in such a manner that each of the water diverters 63 is orientated such that when the water is hit therein, the water is guided to flow towards the opposite water diverter 63 at a next lower level while passing through an exterior surface of the heat exchanging pipe 240 for performing heat exchange with the refrigerant 3 flowing through the heat exchanging pipe 240. The water entering from the water entrance 613 is thus flowed in the tubular housing 61 in a zigzag path.

The tubular housing 61 comprises a first and a second housing body 615, 616 detachably attached with each other to form the tubular housing 61. As shown in FIG. 55E and FIG. 55F of the drawings, each of the first and the second housing body 615,616 has a semi-circular cross section and is detachably connected with each other through an engaging arrangement 617.

Figure 56:
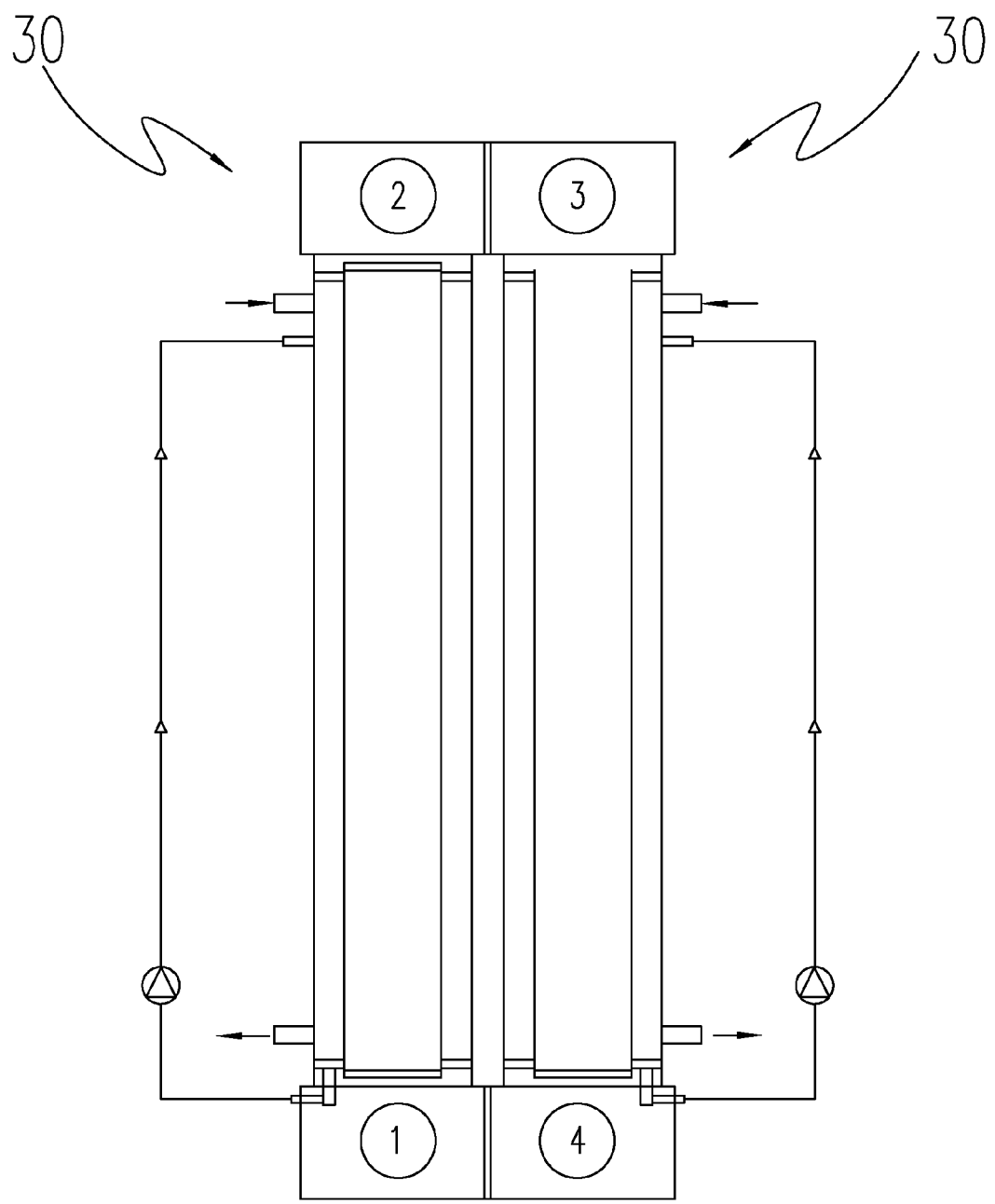
FIG. 56 is schematic diagram of two of the heat exchangers according to the above preferred embodiment of the present invention, illustrating that the two heat exchangers are connected in a side-by-side manner.
Figure 57:
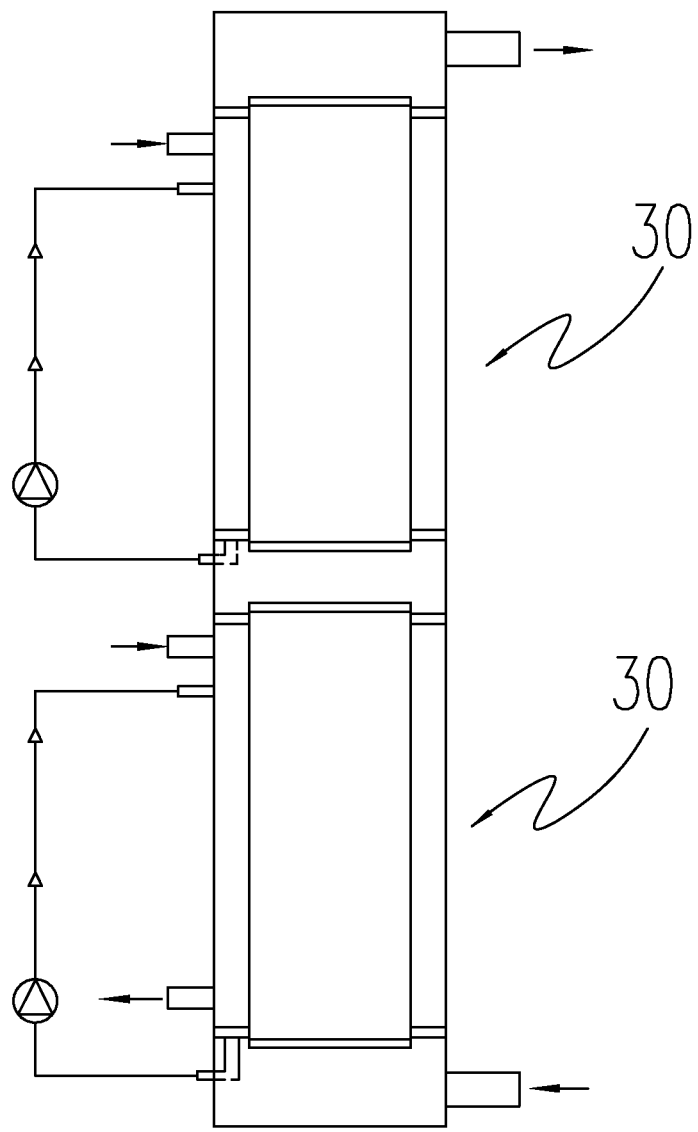
FIG. 57 is schematic diagram of two of the heat exchangers according to the above preferred embodiment of the present invention, illustrating that the two heat exchangers are connected in a series manner.

Referring to FIG. 56 to FIG. 57 of the drawings, two heat exchangers 30 (namely a first heat exchanger 30 and a second heat exchanger 30) are connected with each other in parallel and in series for further enhancing the heat exchange capacity of the present invention. FIG. 56 illustrates two heat exchangers 30 are put in a side-by-side manner, while FIG. 57 illustrates that the two heat exchangers 30 are put in a vertical configuration in a series manner. In the latter case, water leaving the first heat exchanger 30 (located at the bottom) is guided to flow into the second heat exchanger 30 (located at the top), wherein the heat exchange mechanism in each of these first and the second heat exchanger 30 is identical to those described above. In FIG. 57, the water leaving the first heat exchanger 30 is guided to flow into the second heat exchanger 30 for further extracting heat to the refrigerant 3.

One skilled in the art will understand that the embodiment of the present invention as shown in the drawings and described above is exemplary only and not intended to be limiting. It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:
1. A high efficiency heat exchanging pipe, comprising:
a pipe body;
a plurality of inner heat exchanging fins spacedly and protrudedly extended along an inner surface of said pipe body in a spiral manner for enhancing heat exchange surface area of said corresponding heat exchanging pipe, and for guiding a fluid flow on said inner surface of said corresponding heat exchange pipe along said spiral path of said inner heat exchanging fins; and
a plurality of outer heat exchanging fins spacedly and protrudedly extended along an outer surface of said pipe body for enhancing heat exchange surface area of said corresponding heat exchanging pipe and for guiding a fluid flow on said outer surface of said corresponding heat exchange pipe along said outer heat exchanging fins,
wherein each of said inner heat exchanging fins and said outer heat exchanging fins has a L-shaped cross section.

2. A high efficiency heat exchanging pipe, comprising:
a pipe body;
a plurality of inner heat exchanging fins spacedly and protrudedly extended along an inner surface of said pipe body in a spiral manner for enhancing heat exchange surface area of said corresponding heat exchanging pipe, and for guiding a fluid flow on said inner surface of said corresponding heat exchange pipe along said spiral path of said inner heat exchanging fins; and
a plurality of outer heat exchanging fins spacedly and protrudedly extended along an outer surface of said pipe body for enhancing heat exchange surface area of said corresponding heat exchanging pipe and for guiding a fluid flow on said outer surface of said corresponding heat exchange pipe along said outer heat exchanging fins,
wherein each of said inner heat exchanging fins and said outer heat exchanging fins has a T-shaped cross section.

3. A high efficiency heat exchanging pipe, comprising:
a pipe body;
a plurality of inner heat exchanging fins spacedly and protrudedly extended along an inner surface of said pipe body in a spiral manner for enhancing heat exchange surface area of said corresponding heat exchanging pipe, and for guiding a fluid flow on said inner surface of said corresponding heat exchange pipe along said spiral path of said inner heat exchanging fins; and
a plurality of outer heat exchanging fins spacedly and protrudedly extended along an outer surface of said pipe body for enhancing heat exchange surface area of said corresponding heat exchanging pipe and for guiding a fluid flow on said outer surface of said corresponding heat exchange pipe along said outer heat exchanging fins,
wherein each of said inner heat exchanging fins and said outer heat exchanging fins are coated with a chemical layer so as to facilitate easy detachment of dirt from said inner and outer heat exchanging fins.

4. A high efficiency heat exchanging pipe, comprising:
a pipe body;
a plurality of inner heat exchanging fins spacedly and protrudedly extended along an inner surface of said pipe body in a spiral manner for enhancing heat exchange surface area of said corresponding heat exchanging pipe, and for guiding a fluid flow on said inner surface of said corresponding heat exchange pipe along said spiral path of said inner heat exchanging fins; and
a plurality of outer heat exchanging fins spacedly and protrudedly extended along an outer surface of said pipe body for enhancing heat exchange surface area of said corresponding heat exchanging pipe and for guiding a fluid flow on said outer surface of said corresponding heat exchange pipe along said outer heat exchanging fins,
wherein each of said inner heat exchanging fins and said outer heat exchanging fins has an I-shaped cross section,
wherein each of said inner heat exchanging fins and said outer heat exchanging fins are coated with a chemical layer so as to facilitate easy detachment of dirt from said inner and outer heat exchanging fins.

5. The heat exchanging pipe, as recited in claim 1, wherein each of said inner heat exchanging fins and said outer heat exchanging fins are coated with a chemical layer so as to facilitate easy detachment of dirt from said inner and outer heat exchanging fins.

6. The heat exchanging pipe, as recited in claim 2, wherein each of said inner heat exchanging fins and said outer heat exchanging fins are coated with a chemical layer so as to facilitate easy detachment of dirt from said inner and outer heat exchanging fins.

7. A high efficiency heat exchanging pipe, comprising:
a pipe body;
a plurality of inner heat exchanging fins spacedly and protrudedly extended along an inner surface of said pipe body in a spiral manner for enhancing heat exchange surface area of said corresponding heat exchanging pipe, and for guiding a fluid flow on said inner surface of said corresponding heat exchange pipe along said spiral path of said inner heat exchanging fins; and
a plurality of outer heat exchanging fins spacedly and protrudedly extended along an outer surface of said pipe body for enhancing heat exchange surface area of said corresponding heat exchanging pipe and for guiding a fluid flow on said outer surface of said corresponding heat exchange pipe along said outer heat exchanging fins, wherein said high efficiency heat exchanging pipe further comprises an outer protective pipe having a diameter such that said pipe body and said outer heat exchange fins are capable of inserting into said outer protective pipe.

8. A high efficiency heat exchanging pipe, comprising:
a pipe body;
a plurality of inner heat exchanging fins spacedly and protrudedly extended along an inner surface of said pipe body in a spiral manner for enhancing heat exchange surface area of said corresponding heat exchanging pipe, and for guiding a fluid flow on said inner surface of said corresponding heat exchange pipe along said spiral path of said inner heat exchanging fins; and
a plurality of outer heat exchanging fins spacedly and protrudedly extended along an outer surface of said pipe body for enhancing heat exchange surface area of said corresponding heat exchanging pipe and for guiding a fluid flow on said outer surface of said corresponding heat exchange pipe along said outer heat exchanging fins,
wherein each of said inner heat exchanging fins and said outer heat exchanging fins has an I-shaped cross section,
wherein said high efficiency heat exchanging pipe further comprises an outer protective pipe having a diameter such that said pipe body and said outer heat exchange fins are capable of inserting into said outer protective pipe.

9. The heat exchanging pipe, as recited in claim 1, further comprising an outer protective pipe having a diameter such that said pipe body and said outer heat exchange fins are capable of inserting into said outer protective pipe.

10. The heat exchanging pipe, as recited in claim 2, further comprising an outer protective pipe having a diameter such that said pipe body and said outer heat exchange fins are capable of inserting into said outer protective pipe.

11. A high efficiency heat exchanging pipe, comprising:
a pipe body;
a plurality of inner heat exchanging fins spacedly and protrudedly extended along an inner surface of said pipe body in a spiral manner for enhancing heat exchange surface area of said corresponding heat exchanging pipe, and for guiding a fluid flow on said inner surface of said corresponding heat exchange pipe along said spiral path of said inner heat exchanging fins; and a plurality of outer heat exchanging fins spacedly and protrudedly extended along an outer surface of said pipe body for enhancing heat exchange surface area of said corresponding heat exchanging pipe and for guiding a fluid flow on said outer surface of said corresponding heat exchange pipe along said outer heat exchanging fins, wherein said outer heat exchanging fins are spacedly and outwardly extended from an outer surface of said pipe body, wherein each of said outer heat exchanging fins is circumferentially extended from said outer surface of said pipe body to form a heat exchanging panel for performing heat exchange with a corresponding heat exchange medium flowing along said outer surface of said pipe body.

12. The heat exchanging pipe, as recited in claim 11, wherein each of said outer heat exchanging fins further has a plurality of through guiding holes spacedly provided thereon for facilitating flowing of fluid across said outer heat exchanging fins.

13. The heat exchanging pipe, as recited in claim 12, wherein each of said outer heat exchanging fins further has a plurality of indentions formed thereon for further maximizing a surface area for heat exchange between said outer heat exchanging fins and said fluid flowing across said corresponding heat exchanging pipes.

14. A cooling device for cooling a predetermined amount of refrigerant, comprising:

a tubular housing having a refrigerant entrance formed at a bottom portion thereof, and a refrigerant exit formed at a top portion of said tubular housing, wherein said refrigerant is arranged to enter said tubular housing through said refrigerant entrance, while said refrigerant is arranged to leave said cooling device through said refrigerant exit, wherein said tubular housing further has a water entrance provided at a top portion thereof, and a water exit provided at a bottom portion of said tubular housing, wherein water is arranged to flow into said tubular housing through said water entrance; and a heat exchanging pipe extended from said refrigerant entrance and said refrigerant exit, wherein said refrigerant is arranged to flow through said heat exchanging pipe in said tubular housing, wherein said water flowing through said tubular housing is arranged to perform heat exchange with said refrigerant flowing through said heat exchanging pipe.

15. The cooling device, as recited in claim 14, further comprising a plurality of water diverters spacedly extended from inner sidewall of said tubular housing in such a manner that each of said water diverters is orientated such that when said water is hit thereon, said water is guided to flow towards said opposite water diverter at a next lower level while passing through an exterior surface of said heat exchanging pipe for performing heat exchange with said refrigerant flowing through said heat exchanging pipe.

16. The cooling device, as recited in claim 15, wherein said tubular housing comprises a first and a second housing body detachably attached with each other to form said tubular housing, wherein each of said first and said second housing body has a semicircular cross section and is detachably connected with each other.

17. The cooling device, as recited in claim 15, wherein each of said heat exchanging pipes comprises a pipe body, a plurality of inner heat exchanging fins spacedly and protrudedly extended along an inner surface of said pipe body in a spiral manner for enhancing heat exchange surface area of said corresponding heat exchanging pipe, and for guiding a fluid flow on said inner surface of said corresponding heat exchange pipe along said spiral path of said inner heat exchanging fins, and a plurality of outer heat exchanging fins spacedly and protrudedly extended along an outer surface of said pipe body for enhancing heat exchange surface area of said corresponding heat exchanging pipe and for guiding a fluid flow on said outer surface of said corresponding heat exchange pipe along said outer heat exchanging fins.

18. The cooling device, as recited in claim 16, wherein each of said heat exchanging pipes comprises a pipe body, a plurality of inner heat exchanging fins spacedly and protrudedly extended along an inner surface of said pipe body in a spiral manner for enhancing heat exchange surface area of said corresponding heat exchanging pipe, and for guiding a fluid flow on said inner surface of said corresponding heat exchange pipe along said spiral path of said inner heat exchanging fins, and a plurality of outer heat exchanging fins spacedly and protrudedly extended along an outer surface of said pipe body for enhancing heat exchange surface area of said corresponding heat exchanging pipe and for guiding a fluid flow on said outer surface of said corresponding heat exchange pipe along said outer heat exchanging fins.

* * * * *